United States Patent
Arnold et al.

(10) Patent No.: US 12,074,276 B2
(45) Date of Patent: Aug. 27, 2024

(54) ELECTROCHEMICAL CELLS WITH CATHOLYTE ADDITIVES AND LITHIUM-STUFFED GARNET SEPARATORS

(71) Applicant: QuantumScape Battery, Inc., San Jose, CA (US)

(72) Inventors: Thomas Arnold, San Jose, CA (US); Larry Beck, Ann Arbor, MI (US); Tiffany Ho, Fremont, CA (US); Aram Yang, Berkeley, CA (US)

(73) Assignee: QuantumScape Battery, Inc., San Jose, CA (US)

( * ) Notice: Subject to any disclaimer, the term of this patent is extended or adjusted under 35 U.S.C. 154(b) by 655 days.

(21) Appl. No.: 17/289,272

(22) PCT Filed: Nov. 5, 2019

(86) PCT No.: PCT/US2019/059779
§ 371 (c)(1),
(2) Date: Apr. 28, 2021

(87) PCT Pub. No.: WO2020/097018
PCT Pub. Date: May 14, 2020

(65) Prior Publication Data
US 2021/0399338 A1    Dec. 23, 2021

Related U.S. Application Data

(60) Provisional application No. 62/756,555, filed on Nov. 6, 2018.

(51) Int. Cl.
*H01M 10/05* (2010.01)
*H01M 4/48* (2010.01)
(Continued)

(52) U.S. Cl.
CPC ........ *H01M 10/0562* (2013.01); *H01M 4/48* (2013.01); *H01M 10/0525* (2013.01);
(Continued)

(58) Field of Classification Search
CPC ........ H01M 10/0562; H01M 10/0561; H01M 10/0564; H01M 10/0525; H01M 10/052;
(Continued)

(56) References Cited

U.S. PATENT DOCUMENTS 3,839,306 A    10/1974   Emerson et al.
4,567,031 A    1/1986    Riley
(Continued)

FOREIGN PATENT DOCUMENTS

CN    1547277 A     11/2004
CN    1 218 422 C   9/2005
(Continued)

OTHER PUBLICATIONS

International Search Report and written opinion of PCT/US2023/019468 dated Aug. 11, 2023; 14 pages.
(Continued)

*Primary Examiner* — Raymond Alejandro
(74) *Attorney, Agent, or Firm* — Squire Patton Boggs (US) LLP

(57) ABSTRACT

Set forth herein are processes for making and using electrolytes (also known as catholytes when the electrolytes are mixed with cathode active materials) for a positive electrode of an electrochemical cell. The catholytes include additives that prevent surface fluorination of lithium-stuffed garnet solid-state separators in contact with the positive electrode. Also set forth herein are electrochemical devices which include the catholytes in addition to a lithium-stuffed garnet solid-state electrolyte separator.

16 Claims, 17 Drawing Sheets

US 12,074,276 B2
Page 2

(51) Int. Cl.
  *H01M 10/0525* (2010.01)
  *H01M 10/0562* (2010.01)
  *H01M 10/44* (2006.01)
  *H01M 50/431* (2021.01)

(52) U.S. Cl.
  CPC ......... *H01M 10/44* (2013.01); *H01M 50/431* (2021.01); *H01M 2250/20* (2013.01); *H01M 2300/0071* (2013.01)

(58) Field of Classification Search
  CPC .. H01M 10/44; H01M 10/446; H01M 50/431; H01M 4/48; H01M 2250/20; H01M 2300/0071
  See application file for complete search history.

(56) References Cited

U.S. PATENT DOCUMENTS

| | | | |
|---|---|---|---|
| 5,738,957 A | 4/1998 | Amine et al. | |
| 5,783,332 A | 7/1998 | Amine et al. | |
| 6,204,219 B1 | 3/2001 | Brezny et al. | |
| 6,333,128 B1 | 12/2001 | Takuya et al. | |
| 6,420,069 B2 | 7/2002 | Amine et al. | |
| 6,589,299 B2 | 7/2003 | Missling et al. | |
| 6,613,478 B2 | 9/2003 | Munakata et al. | |
| 6,613,479 B2 | 9/2003 | Fukuzawa et al. | |
| 6,623,890 B2 | 9/2003 | Munakata et al. | |
| 6,677,082 B2 | 1/2004 | Thackeray et al. | |
| 6,680,143 B2 | 1/2004 | Thackeray et al. | |
| 6,939,383 B2 | 9/2005 | Eastin et al. | |
| 6,964,828 B2 | 11/2005 | Lu et al. | |
| 7,078,128 B2 | 7/2006 | Lu et al. | |
| 7,135,252 B2 | 11/2006 | Thackeray et al. | |
| 7,205,073 B2 | 4/2007 | Kim et al. | |
| 7,314,684 B2 | 1/2008 | Kang et al. | |
| 7,468,223 B2 | 12/2008 | Thackeray et al. | |
| 7,517,613 B2 | 4/2009 | Yuasa et al. | |
| 7,709,149 B2 | 5/2010 | Paulsen et al. | |
| 7,968,235 B2 | 6/2011 | Amine et al. | |
| 8,241,791 B2 | 8/2012 | Lu et al. | |
| 8,268,198 B2 | 9/2012 | Shin et al. | |
| 8,277,683 B2 | 10/2012 | Deng et al. | |
| 8,465,556 B2 | 6/2013 | Oladeji | |
| 8,492,030 B2 | 7/2013 | Park et al. | |
| 8,591,774 B2 | 11/2013 | Koenig et al. | |
| 8,685,565 B2 | 4/2014 | Lu et al. | |
| 8,808,405 B2 | 8/2014 | Oladeji | |
| 8,865,348 B2 | 10/2014 | Sun et al. | |
| 9,190,660 B2 | 11/2015 | Takemoto et al. | |
| 9,692,041 B2 | 6/2017 | Aihara et al. | |
| 10,141,567 B2 | 11/2018 | Choi et al. | |
| 10,199,649 B2 | 2/2019 | Beck et al. | |
| 10,923,295 B2 | 2/2021 | Raman et al. | |
| 11,342,630 B2 | 5/2022 | Roberts et al. | |
| 11,430,613 B2 | 8/2022 | Mitchell et al. | |
| 11,545,666 B2 | 1/2023 | Wang et al. | |
| 11,545,667 B2 | 1/2023 | Saidi | |
| 11,581,526 B2 | 2/2023 | Wurm et al. | |
| 11,587,741 B2 | 2/2023 | Raman et al. | |
| 2003/0042473 A1 | 3/2003 | Kloeppner et al. | |
| 2005/0164084 A1 | 7/2005 | Adamson et al. | |
| 2008/0314482 A1 | 12/2008 | Suzuki et al. | |
| 2010/0014215 A1 | 1/2010 | Zhong et al. | |
| 2010/0068376 A1 | 3/2010 | Chen et al. | |
| 2010/0151332 A1 | 6/2010 | Lopez et al. | |
| 2011/0039155 A1 | 2/2011 | Deguchi | |
| 2011/0111298 A1 | 5/2011 | Lopez et al. | |
| 2011/0260099 A1 | 10/2011 | Paulsen et al. | |
| 2012/0064395 A1 | 3/2012 | Chang et al. | |
| 2012/0129045 A1 | 5/2012 | Gin et al. | |
| 2012/0282522 A1 | 11/2012 | Axelbaum et al. | |
| 2013/0157141 A1 | 6/2013 | Zhong et al. | |
| 2013/0202502 A1 | 8/2013 | Schulz-Dobrick et al. | |
| 2014/0193714 A1 | 7/2014 | Kim et al. | |
| 2015/0050522 A1 | 2/2015 | Manthiram et al. | |
| 2015/0099169 A1 | 4/2015 | Dudney et al. | |
| 2016/0043436 A1* | 2/2016 | Coleman | H01M 10/0568 429/188 |
| 2016/0156021 A1 | 6/2016 | Aihara et al. | |
| 2016/0233549 A1* | 8/2016 | Tiruvannamalai | H01M 10/052 |
| 2016/0268586 A1 | 9/2016 | Kawakami et al. | |
| 2016/0276658 A1 | 9/2016 | Choi et al. | |
| 2017/0162901 A1 | 6/2017 | Chen et al. | |
| 2017/0179484 A1 | 6/2017 | Park et al. | |
| 2017/0321083 A1 | 11/2017 | Fenn et al. | |
| 2017/0365855 A1* | 12/2017 | Ryu | H01M 10/052 |
| 2018/0034101 A1 | 2/2018 | Lee et al. | |
| 2018/0076446 A1 | 3/2018 | Glock et al. | |
| 2019/0044146 A1 | 2/2019 | Ito et al. | |
| 2020/0066463 A1 | 2/2020 | Kinoshita et al. | |
| 2021/0193398 A1 | 6/2021 | Raman et al. | |
| 2021/0249647 A1 | 8/2021 | Wurm et al. | |
| 2021/0399338 A1 | 12/2021 | Arnold et al. | |
| 2022/0029166 A1 | 1/2022 | Hippauf et al. | |
| 2022/0029242 A1 | 1/2022 | Hippauf et al. | |
| 2022/0246977 A1 | 8/2022 | Brezesinski et al. | |
| 2022/0278362 A1 | 9/2022 | Finsy et al. | |
| 2022/0293952 A1 | 9/2022 | Brown | |
| 2023/0042207 A1 | 2/2023 | Kang et al. | |
| 2023/0343954 A1 | 10/2023 | Yu et al. | |

FOREIGN PATENT DOCUMENTS

| | | |
|---|---|---|
| CN | 102255069 A | 11/2011 |
| CN | 105 006 594 A | 10/2015 |
| CN | 110 137 561 A | 8/2019 |
| CN | 111 952 562 A | 11/2020 |
| JP | 2003059492 A | 2/2003 |
| JP | 2004047448 A | 2/2004 |
| JP | 2004193115 A | 7/2004 |
| JP | 2010-015959 A | 1/2010 |
| JP | 2013149586 A | 8/2013 |
| JP | 2013218838 A | 10/2013 |
| JP | 2016-085843 A | 5/2016 |
| KR | 20210129841 A | 10/2021 |
| WO | WO 2018/044952 | 3/2018 |
| WO | WO 2019/213159 | 11/2019 |
| WO | WO 2019/245461 A1 | 12/2019 |
| WO | WO 2020/097018 | 5/2020 |
| WO | WO 2020/097018 A1 | 5/2020 |
| WO | WO 2022056039 A1 | 3/2022 |

OTHER PUBLICATIONS

Notice of Preliminary Rejection issued on Mar. 21, 2023 for the Korean Patent Application No. 10-2022-7044508, along with its English translation.
Communication pursuant to Article 94(3) EPC for EP application No. 22851184.6 dated Jan. 25, 2024; 9 pages.
N.N.: "Wikipedia—Crystal strcuture", 2024, XP093120949, URL: https://en.wikipedia.org/wiki/Crystal structure as accessed on Jan. 18, 2024.
English translation of the office Action of JP Patent Application No. 2021-189820 Issued on Jan. 31, 2023.
Non-Final Office Action of U.S. Appl. No. 18/463,208 dated Nov. 6, 2023; 7 pages.
Written Opinion of the PCT/US2022/053080 dated Mar. 30, 2023; 9 pages.
Yang et al., "Pushing Lithium Cobalt Oxides to 4.7 V by Lattice-Matched Interfacial Engineering", Advanced Energy Materials 2022, 12, 2200197; 12 pages.
Zhan et al., "Influence of annealing atmosphere on $Li_2ZrO_3$-coated $LiNi_{0.6}Co_{0.2}Mn_{0.2}O_2$ and its high-voltage cycling performance", Electrochimica Acta, vol. 300, Jan. 18, 2019, pp. 36-44.
International Search report and written opinion of PCT/US2022/051433 dated May 15, 2023; 16 pages.
Xia et al., "Improving sulfolane-based electrolyte for high voltage Li-ion cells with electrolyte additives", Journal of Power Sources 324 (2016) 704-711.
Zhao et al., "Robust and sulfur-containing ingredient surface film to improve the electrochemical performance of LiDFOB-based high-voltage electrolyte", Electrochimica Ada 260 (2018) 536-548.

(56) References Cited

OTHER PUBLICATIONS

U.S. Appl. No. 90/012,243, filed Jul. 19, 2013, Thackeray et al.
Amaresh, S. et al., "Facile synthesis of $ZrO_2$ coated $Li_2CoPO_4F$ cathode materials for lithium secondary batteries with improved electrochemical properties," Journal of Power Sources, 244, 2013, pp. 395-402.
Amatucci, Glenn et al., "Fluoride based electrode materials for advanced energy storage devices," Journal of Fluorine Chemistry, vol. 128, Issue 4, Apr. 2007, pp. 243-262.
Amine, K. et al., "A New Three-Volt Spinel $Li_{1+x}Mn_{i1.5}Ni_{0.5}O_4$ for Secondary Lithium Batteries," J. Electrochem. Soc., vol. 143, No. 5, May 1996, pp. 1607-1613.
Ariyoshi, Kingo et al., "Structural change of $LiNi_{1/2}Mn_{1/2}O_2$ during charge and discharge in nonaqueous lithium cells," Journal of Physics and Chemistry of Solids, 69, 2008, pp. 1238-1241.
Armstrong, A. Robert et al., "Demonstrating Oxygen Loss and Associated Structural Reorganization in the Lithium Battery Cathode $Li[Ni_{0.2}Li_{0.2}Mn_{0.6}]O_2$," J. Am. Chem. Soc., 2006, vol. 128, pp. 8694-8698.
Armstrong, A. Robert et al., "Synthesis of layered $LiMnO_2$ as an electrode for rechargeable lithiu batteries," Nature, vol. 381, Jun. 6, 1996, pp. 499-500.
Armstrong, A. Robert et al., "The Layered Intercalation Compounds $Li(Mn_{1-y}Co_y)O_2$: Positive Electrode Materials for Lithium-Ion Batteries," Journal of Solid State Chemistry, 145, 1999, pp. 549-556.
Ates, Mehmet Nurullah et al., "Mitigation of Layered to Spinel Conversion of a Li-Rich Layered Metal Oxide Cathode Material for Li-Ion Batteries," Journal of the Electrochemical Society, 161 (3), 2014, pp. A290-A301.
Ates, Mehmet Nurullah et al., "A Li-Rich Layered Cathode Material with Enhanced Structural Stability and Rate Capability for Li-on Batteries," Journal of the Electrochemical Society, 161 (3), 2014, pp. A355-A363.
Aurbach, Doron et al., "Studies of Aluminum-Doped $LiNi_{0.5}Co_{0.2}Mn_{0.3}O_2$: Electrochemical Behavior, Aging, Structural Transformations, and Thermal Characteristics," Journal of the Electrochemical Society, 162 (6), (2015), pp. A1014-A1027.
Bains, J. et al., "$Li(Ni_{0.40}Mn_{0.40}Co_{0.15}Al_{0.05})O_2$: A promising positive electrode material for high-power and safe lithium-ion batteries," Journal of Power Sources, 196, 2011, pp. 8625-8631.
Bareno et al., "Local Structure of Layered Oxide Electrode Materials for Lithium-Ion Batteries," Adv. Mater., 2010, 22, pp. 1122-1127.
Bareno et al., "Long-Range and Local Structure in the Layered Oxide $Li_{1.2}Co_{0.4}Mn_{0.4}O_2$," Chem. Mater., 2011, 23, pp. 2039-2050.
Benedek, R. et al., "Theory of Overlithiation Reaction in $LiMO_2$ Battery Electrodes," Chem. Mater., 2006, 18, pp. 1296-1302.
Bettge, Martin et al., "Improving high-capacity $Li_{1.2}Ni_{0.15}Mn_{0.55}Co_{0.10}O_2$-based lithium-ion cells by modifiying the positive electrode with alumina," Journal of Power Sources, 233, 2013, pp. 346-357.
Bhattacharya, Jishnu et al., "Prediction bl Quaternary Spinel Oxides a Li-Battery Cathodes: Cation Site Preference, Metal Mixing, Voltage an Phase Stability," Journal of the Electrochemical Society, 161 (9), 2014, pp. A1440-A1446.
Borkowska et al., "Composite polyether electrolytes with Lewis acid type additives", Electrochimica Acta, vol. 46, No. 10-11, Mar. 15, 2001, pp. 1737-1746, XP004231591, ISSN: 0013-4686, DOI: 10.1016/S0013-4686.
Caldin, E.F. et al., "Kinetics and Thermodynamics of the Complex-formation of Nickel(II) and Cobalt(II) Ions with Ammonia and Pyridine-2-azodimethylaniline in Water, at Pressures from 1 bar to 2 kbar," Journal of the Chemical Society, Farady Transactions 1, vol. 68, 1972, pp. 2247-2258.
Camardese, J. et al., "Synthesis of Spherical Core-Shell $Ni(OH)_2$-$Ni_{1/2}Mn_{1/2}(OH)_2$ Particles via a Continuously Stirred Tank Reactor," Journal of the Electrochemical Society, 161 (6), 2014, pp. A890-A895.

Cheng, Ho-Ming et al., "Enhanced Cycleabity in Lithium Ion Batteries: Resulting from Atomic Layer Depostion of $Al_2O_3$ or $TiO_2$ on $LiCoO_2$ Electrodes," J. Phys. Chem. C, 2012, 116, pp. 7629-7637.
Chiang, Yet-Ming et al., "High Capacity, Temperature-Stable Lithium Aluminum Manganese Oxide Cathodes for Rechargeable Batteries," Electrochemical and Solid-State Letters, 2 (3) (1999) pp. 107-110.
Chiba, Kazuki et al., "$Na_xLi_{0.7-x}Ni_{1-y}Mn_yO_2$ as a new positive electrode material for lithiumion batteries," Journal of Power Sources, 311, 2016, pp. 103-110.
Cho, Jaephil et al., "A Breakthrough in the Safety of Lithium Secondary Batteries by Coating the Cathode Material with $AlPO_4$ Nanoparticles," Angew. Chem. Int. Ed., 2003, 42, pp. 1618-1621.
Cho, Woosuk et al., "Improved electrochemical and thermal properties of nickel rich $LiNi_{0.6}Co_{0.2}Mn_{0.2}O_2$ cathode materials by $SiO_2$ coating," Journal of Power Sources, 282, 2015, pp. 45-50.
Cho, Yonghyun et al., "A New Type of Protective Surface Layer for High-Capacity Ni-Based Cathode Materials: Nanoscaled Surface Pillaring Layer," Nano Lett., 2013, 13, pp. 1145-1152.
Cho, Yonghyun et al., Supporting Information "A New Type of Protective Surface Layer for High-Capacity Ni-Based Cathode Materials: Nanoscaled Surface Pillaring Layer," Nano Lett., 2013, 13, 16 pages.
Choi, J. et al., "Investigation of the Irreversible Capacity Loss in the Layered $LiNi_{1/3}Mn_{1/3}Co_{1/3}O_2$ Cathodes," Electrochemical and Solid-State Letters, 8 (8), 2005, pp. C102-C105.
Choi, S. et al., "Factors Influencing the Layered to Spinel-like Phase Transition in Layered Oxide Cathodes," Journal of the Electrochemical Society, 2002, 149 (9), pp. A1157-A1163.
Chung, Kyung Yoon et al., "Comparative studies between oxygen-deficient $LiMn_2O_4$ and Al-doped $LiMn_2O_4$," Journal of Power Sources, 146, 2005, pp. 226-231.
Clause, O. et al., "Preparation and Characterization of Nickel-Aluminum Mixed Oxides Obtained by Thermal Decomposition of Hydrotalcite-Type Precursors," Journal of Catalysis, 133, 1992, pp. 231-246.
Conry, Thomas E. et al., "Structural Underpinnings of the Enhanced Cycling Stability upon Al-Substitution in $LiNi_{0.45}Mn_{0.45}Co_{0.1-y}AlO_2$ Positive Electrode Materials for Li-ion Batteries," Chem. Mater. 2012, 24, pp. 3307-3317.
Delmas, C. et al. "Layered $Li(Ni, M)O_2$ Systems as the Cathode Material in Lithium-Ion Batteries," MRS Bulletin, Aug. 2002, pp. 608-612.
Deng, Haixia et al., "Nanostructured Lithium Nickel Manganese Oxides for Lithium-Ion Batteries," Journal of the Electrochemical Society, 157 (4), 2010, pp. A447-A452.
Deng, Z.Q. et al., "Influence of Cationic Substitutions on the Oxygen Loss and Reversible Capacity of Lithium-Rich Layered Oxide Cathodes," J. Phys. Chem. C, 2011, 115, pp. 7097-7103.
Doan, The Nam Long et al., "Recent developments in synthesis of $xLi_2MnO_3 \supseteq (1-x) LiMO_2$ (M=Ni, Co, Mn) cathode powders for high-energy lithium rechargeable batteries," Frontiers in Energy Research, Energy Storage, Sep. 2014, vol. 2, Article 36, pp. 1-7.
Dou, Shumei, "Review and prospect of layered lithium nickel manganese oxide as cathode materials for Li-ion batteries," J Solid State Electrochem (2013) 17, pp. 911-926.
Dyatkin, B.L. et al., "The Acidic Properties of Fluorine-Containing Alcohols, Hydroxylamines and Oximes," Tetrahedron, 1965, vol. 21, pp. 2991-2995.
El Mofid, Wassima et al., "A high performance layered transition metal oxide cathode material obtained by simultaneous aluminum and iron cationic substitution," Journal of Power Sources, 268, 2014, pp. 414-422.
Eom, Junho et al., "Dependence of Electrochemical Behavior on Concentration and Annealing Temperature of $Li_xCoPO_4$ Phase-Grown $LiNi_{0.8}Co_{0.16}Al_{0.04}O_2$ Cathode Materials," Journal of the Electrochemical Society, 155 (3), 2008, pp. A228-A233.
Fu, Chaochao et al., "Nickel-Rich Layered Microspheres Cathodes: Lithium/Nickel Disordering and Electrochemical Performance," ACS Appl Mater Interfaces, Sep. 24, 2014, 6(18), 15822-15831.

(56) References Cited

OTHER PUBLICATIONS

Fu, Xian-Zhu et al., "Nickel oxyhydroxides with various oxidation states prepared by chemicaloxidation of spherical β-Ni(OH)$_2$," Solid State Ionics, 178, 2007, pp. 987-993.

Gallagher, Kevin G. et al., "Correlating hysteresis and voltage fade in lithium- and manganese-rich layered transition-metal oxide electrodes," Electrochemistry Communications, 33, 2013, pp. 96-98.

Glaeser, Hans H. et al., "The Kinetics of Ammonia Exchange between Nickel Ammine Complexes and Ammonia in Aqueous and Anhydrous Ammonia Solutions Measured by Nuclear Magnetic Resonance of Nitrogen-14." Inorganic Chemistry, vol. 4, No. 2, Feb. 1965, pp. 206-208.

Gopalakrishnan, J., "Chimie Douce Approaches to the Synthesis of Metastable Oxide Materials," Chemistry of Materials, vol. 7, No. 7, Jul. 1995, pp. 1265-1275.

Gummow, R J et al., "Lithium Extraction From Orthorhombic Lithium Manganese Oxide and the Phase Transformation to Spinel," Mat. Res. Bull., vol. 28, 1993, pp. 1249-1256.

Gummow, R.J. et al., "Improved capacity retention in rechargeable 4 V lithium/lithiummanganese oxide (spinel) cells," Solid State Ionics, 69, 1994, pp. 59-67.

Gutierrez, A. et al., "Understanding the Effects of Cationic and Anionic Substitutions in Spinel Cathodes of Lithium-Ion Batteries," Journal of the Electrochemical Society, 160 (6), 2013, pp. A901-A905.

Han, Ah Reum et al., "Soft Chemical Dehydration Route to Carbon Coating of Metal Oxides: Its Application for Spinel Lithium Manganate," J. Phys. Chem. C, 2007, 111, pp. 11347-11352.

Hayashi, N. et al., "Cathode of LiMg$_y$Mn$_{2-y}$O$_4$ and LiMg$_y$Mn$_{2-y}$O$_4$, Spinel Phases for Lithium Secondary Batteries," Journal of the Electrochemical Society, 146 (4), 1999, pp. 1351-1354.

Hong, Jihyun et al., "Critical Role of Oxygen Evolved from Layered Li-Excess Metal Oxides in Lithium Rechargeable Batteries," Chem. Mater. 2012, 24, pp. 2692-2697.

Hou, Peiyu et al., "A high energy density Li-rich positive-electrode material with superior performances via a dual chelating agent co-precipitation route," J. Mater. Chem. A, 2015, 3, 9427-9431.

Hou, Peiyu et al., Supporting Information "A high energy density Li-rich positive-electrode material with superior performances via a dual chelating agent co-precipitation route," J. Mater. Chem. A, 2015, 3, 11 pages.

Hua, Chuanshan et al., "Study of full concentration-gradient Li(Ni$_{0.8}$Co$_{0.1}$Mn$_{0.1}$)O$_2$ cathode material for lithium ion batteries," Journal of Alloys and Compounds, 614, 2014, pp. 264-270.

Hua, Weibo et al., "Na-doped Ni-rich LiNi$_{0.5}$Co$_{0.2}$Mn$_{0.3}$O$_2$ cathode material with both high rate capability and high tap density for. lithium ion batteries," Dalton Trans., 2014, 43, pp. 14824-14832.

Hwang et al. (J. Mater. Chem., 2003, 13, 1962-1968).

Hwang, Sooyeon et al., "Investigation of Changes in the Surface Structure of Li$_x$Ni$_{0.8}$Co$_{0.15}$Al$_{0.05}$O$_2$ Cathode Materials Induced by the Initial Charge," Chem. Mater. 2014, 26, pp. 1084-1092.

Hwang, Sooyeon et al., "Using Real-Time Electron Microscopy to Explore the Effects of Transition-Metal Composition on the Local Thermal Stability in Charged Li$_x$Ni$_y$Mn$_z$Co$_{1-y-z}$O$_2$ Cathode Materials," Chem. Mater., 2015, 27 (11), pp. 3927-3935.

Hy, Sunny et al., "Understanding the Role of Ni in Stabilizing the Lithium-Rich High-Capacity Cathode Material .Li[Ni$_x$Li$_{(1-2x)/3}$Mn$_{(2-3x)/3}$]O$_2$ (0≤ x ≤0.5)," Chem. Mater. 2014, 26, pp. 6919-6927.

Irving, H. et al., "The Stability of Transition-metal Complexes," Journal of the Chemical Society, Issue 0, 1953, pp. 3192-3210.

Ito et al., "A rocking chair type all-solid-state lithium ion battery adopting Li$_2$O—ZrO$_2$ coated LiNi$_{0.8}$Co$_{0.15}$Al$_{0.05}$O$_2$ and a sulfide based electrolyte", Journal of Power Sources, vol. 248, 2014, pp. 943-950.

Jarvis, Karalee A. et al., "Atomic Structure of a Lithium-Rich Layered Oxide Material for Lithium-Ion Batteries: Evidence of a Solid Solution," Chem. Mater., 2011, 23 (16), pp. 3614-3621.

Johnson, C.S. et al. "Structural and electrochemical studies of a-manganese dioxide(α-MnO$_2$)", Journal of Power Sources 68 (1997) pp. 570-577.

Johnson, Christopher S. et al., "Structural Characterization of Layered Li$_x$Ni$_{0.5}$Mn$_{0.5}$O$_2$ (0 ≤ x≤ 2) Oxide Electrodes for Li Batteries," Chem. Mater. 2003, 15, pp. 2313-2322.

Johnson, Christopher S. et al., "Synthesis, Characterization and Electrochemistry of Lithium Battery Electrodes: XLi$_2$MnO$_3$ • (1-x)LiMn$_{0.333}$Ni$_{0.333}$Co$_{0.333}$O$_2$ (0 ≤ x ≤ 7))," Chem. Mater. 2008, 20, pp. 6095-6106.

Johnson, Christopher S. et al., "The role of Li$_2$MO$_2$ structures (M=metal ion) in the electrochemistry of (x)LiMn$_{0.5}$Ni$_{0.5}$O$_2$.(1-x)Li$_2$TiO$_3$ electrodes for lithium-ion batteries," Electrochemistry Communications, 4, 2002, pp. 492-498.

Jouanneau, S. et al., "Preparation, Structure, an Thermal Stability of New Ni$_x$Co$_{1-2x}$Mn$_x$(OH)$_2$ (0 ≤ x ≤ 1/2) Phases," Chem.Mater., vol. 15, No. 2, 2003, pp. 495-499.

Ju, Jin-Wook et al., "Optimization of Layered Cathode Material with Full Concentration Gradient for Lithium-Ion Batteries," J. Phys. Chem. C, 2014, 118, pp. 175-182.

Jung et al., "Li$_3$BO$_3$—Li$_2$CO$_3$: Rationally Designed Buffering Phase for Sulfide All-Solid-State Li-Ion Batteries", Chemistry of Materials, DOI: 10.1021/acs.chemmater.8b03321 • Publication Date (Web): Oct. 19, 2018.

Kam, Kinson C. et al., "Aliovalent titanium substitution in layered mixed Li Ni—Mn—Co oxides for lithium battery applications," J. Mater. Chem., 2011, 21, pp. 9991-9993.

Kam, Kinson C. et al., "Electrochemical and Physical Properties of Ti-Substituted Layered Nickel Manganese Cobalt Oxide (NMC) Cathode Materials," Journal of the Electrochemical Society, 159 (8), 2012, pp. A1383-A1392.

Kang, Kisuk et al., "Electrodes with High Power and High Capacity for Rechargeable Lithium Batteries," Science, vol. 311, Feb. 17, 2006, pp. 977-980.

Kang, Kisuk et al., "Factors that affect Li mobility in layered lithium transition metal oxides," Physical Review B, 74, 2006, pp. 094105-1-094195-7.

Kang, S.-H. et al., "The Effects of Acid Treatment on the Electrochemical Properties of 0.5 Li$_2$MnO$_3$ • $_{0.5}$ LiNi$_{0.44}$Co$_{0.25}$Mn$_{0.31}$O$_2$ Electrodes in Lithium Cells," Journal of the Electrochemical Society, 153 (6), 2006, pp. A1186-A1192.

Kang, Sun-Ho et al., "Enhancing the rate capability of high capacity xLi$_2$MnO$_3$ • (1-x)LiMO$_2$ (M=Mn, Ni, Co) electrodes by Li—Ni—PO$_4$ treatment," Electrochemistry Communications, 11, 2009, pp. 748-751.

Kang, Sun-Ho et al., "First-cycle irreversibility of layered Li—Ni—Co—Mn oxide cathode in Li-ion batteries," Electrochimica Acta, 54, 2008, pp. 684-689.

Kang, Sun-Ho et al., "Investigating the first-cycle irreversibility of lithium metal oxide cathodes for Li batteries," J Mater Sci (2008) 43, pp. 4701-4706.

Kim, Chunjoong et al., "Stabilization of Battery Electrode/Electrolyte Interfaces Employing Nanocrystals with Passivating Epitaxial Shells," Chem. Mater. 2015, 27, pp. 394-399.

Kim, Duho et al., "Design of Nickel-rich Layered Oxides Using d Electronic Donor for Redox Reactions," Chem. Mater. 2015, 27, pp. 6450-6456.

Kim, H.-J. et al., "Coprecipitation and Characterization of Nickel-Cobalt-Manganese Hydroxides Precursor for Battery Cathode Materials," Abstract #849, 224th ECS Meeting, 2013 the Electrochemical Society, 1 page.

Kim, Hyun-Soo et al., "Enhanced electrochemical properties of LiNi$_{1/3}$Co$_{1/3}$Mn$_{1/3}$O$_2$ cathode material by coating with LiAlO$_2$ nanoparticles," Journal of Power Sources, 161, 2006, pp. 623-627.

Kim, Jeom-Soo et al., "Electrochemical and Structural Properties of xLi$_2$M'O$_3$ .(1-x)LiMn$_{0.5}$Ni$_{0.5}$O$_2$ Electrodes for Lithium Batteries (M'=Ti, Mn, Zr; 0 ≤ v ≤ 0.3)," Chem. Mater. 2004, 16, pp. 1996-2006.

Kim, Ji Woo et al., "Unexpected high power performance of atomic layer deposition coated Li[Ni$_{1/3}$Mn$_{1/3}$Co$_{1/3}$]O$_2$ cathodes," Journal of Power Sources, 254, 2014, pp. 190-197.

Kong, Fantai et al., "Multivalent Li-Site Doping of Mn Oxides for Li-Ion Batteries," J. Phys. Chem. C, 2015, 119, pp. 21904-21912.

Kosova, N.V. et al., "Mixed layered Ni—Mn—Co hydroxides: Crystal structure, electronic state of ions, and thermal decomposition," Journal of Power Sources 174, 2007, pp. 735-740.

(56) References Cited

OTHER PUBLICATIONS

Kosova, N.V. et al., "Optimization of $Ni^{2+}/Ni^{3+}$ ratio in layered Li(Ni,Mn,Co)$O_2$ cathodes for better electrochemistry," Journal of Power Sources, 174, 2007, pp. 965-969.

Kovanda, Frantisek et al., "Mixed oxides obtained from Co and Mn containing layered double hydroxides: Preparation, characterization, and catalytic properties," Journal of Solid State Chemistry, 179, 2006, pp. 812-823.

Kovanda, FrantiSek et al., "Thermal behaviour of Ni—Mn layered double hydroxide and characterization of formed oxides," Solid State Sciences, 5, 2003, pp. 1019-1026.

Koyama, Yukinori et al., "Crystal and electronic structures of superstructural $Li_{1-x}[Co_{1/3}Ni_{1/3}Mn_{1/3}]O_2$ ($0 \leq x \leq 1$)," Journal of Power Sources 119-121, 2003, pp. 644-648.

Kang, Sun-Ho et al., "Effects of Li Content on Structure an Electrochemical Properties of 0.5 Li2MnO3 Electrodes in Lithium Ce115 (1.0-4.8 V)," Journal of the Electrochemical Society, 154 (4), 2007, pp. A268-A274.

Lee, D.-K. et al., "High capacity $Li[Li_{0.2}Ni_{0.2}Mn_{0.6}]O_2$ cathode materials via a carbonate co-precipitation method," Journal of Power Sources 162, 2006, pp. 1346-1350.

Lee, Jyh-Tsung et al., "Low-temperature atomic layer deposited $Al_2O_3$ thin film on layer structure cathode for enhanced cycleability in lithium-ion batteries," Electrochimica Acta 55, 2010, pp. 4002-4006.

Lee, M.-H. et al., "Synthetic optimization of $Li[Ni_{1/3}Co_{1/3}Mn_{1/3}]O_2$ via co-precipitation," Electrochimica Acta, 50, 2004, pp. 939-948.

Levasseur et al., "Oxygen Vacancies and Intermediate Spin Trivalent Cobalt Ions in Lithium-Overstoichiometric $LiCoO_2$", Chemistry of Materials, Jan. 1, 2003, vol. 15, No. 1, pp. 348-354, XP055474666.

Li, Jinfeng et al., "Improve First-Cycle Efficiency and Rate Performance of Layered-Layered $Li_{1.2}Mn_{0.6}Ni_{0.2}O_2$ Using Oxygen Stabilizing Dopant," ACS Appl. Mater. Interfaces, 2015, 7, pp. 16040-16045.

Li, Jing et al., "Synthesis and Characterization of the Lithium-Rich Core-Shell Cathodes with Low Irreversible Capacity and Mitigated Voltage Fade," Chem. Mater. 2015, 27, pp. 3366-3377.

Li, Y. Y et al., "Understanding Long-Term Cycling Performance of $Li_{1.2}Ni_{0.15Mn0.55}Co_{0.1}O_2$-Graphite Lithium-Ion Cells," Journal of the Electrochemical Society, 160 (5), 2013, pp. A3006-A3019.

Li, Zheng et al., "Stability and Rate Capability of Al Substituted Lithium-Rich High-Manganese Content Oxide Materials for Li-Ion Batteries," Journal of the Electrochemical Society, 159 (2), 2012, pp. A116-A120.

Liang, Jianbo et al., "Topochemical Synthesis, Anion Exchange, and Exfoliation of Co—Ni Layered Double Hydroxides: A Route to.Positively Charged Co—Ni Hydroxide Nanosheets with Tunable Composition," Chem. Mater. 2010, 22, pp. 371-378.

Liao, Jin-Yun et al., "Surface-modified concentration-gradient Ni-rich layered oxide cathodes for high-energy lithium-ion batteries," Journal of Power Sources, 282, 2015, 429-436.

Lim, Jae-Hwan et al., "Electrochemical characterization of $Li_2MnO_3$—$Li[Ni_{1/3}Co_{1/3}Mn_{1/3}]O_2$—$LiNiO_2$ cathode synthesized via co-precipitation for lithium secondary batteries," Journal of Power Sources, 189, 2009, pp. 571-575.

Lin, Feng et al., "Surface reconstruction and chemical evolution of stoichiometric layered cathode materials for lithium-ion batteries," Nature Communications, Mar. 27, 2014, pp. 1-9.

Liu, H. H et al., "Electrochemical performance of $LiFePO_4$ cathode material coated with $ZrO_2$ nanolayer," Electrochemistry Communications 10 (2008), pp. 165-169.

Liu, Hao-Han et al., "Structure Evolution and Electrochemical Performance of $Al_2O_3$-coated $LiNi_{0.4}Co_{0.2}Mn_{0.4}O_2$ During Charge-discharge Cycling," Chem. Res. Chinese Universities 2012, 28(4), pp. 686-690.

Liu, Jun et al. "Spherical nanoporous $LiCoPO_4/C$ composites as high performance cathode materials for rechargeable lithium-ion batteries," J. Mater. Chem., 2011, 21, pp. 9984-9987.

Liu, Jun et al., "Carbon-coated high capacity layered $Li[Li_{0.2}Mn_{0.54}Ni_{0.13}Co_{0.13}]O_2$ cathodes," Electrochemistry Communications 12 (2010), pp. 750-753.

Liu, Jun et al., "Conductive Surface Modification with Aluminum of High Capacity Layered $Li[Li_{0.2}Mn_{0.54}Ni_{0.13}Co_{0.13}]O_2$ Cathodes," J. Phys. Chem. C 2010, 114, pp. 9528-9533.

Liu, Jun et al., "Understanding the Improvement in the Electrochemical Properties of Surface Modified 5 V $LiMn_{142}Ni_{042}Co_{016}O_4$ Spinel Cathodes in Lithium-ion Cells," Chem. Mater. 2009, 21, pp. 1695-1707.

Liu, Lijun et al., "Electrochemical and in Situ Synchrotron XRD Studies on $Al_2O_3$-Coated $LiCoO_2$ Cathode Material," Journal of the Electrochemical Society, 2014, 151 (9), A1344-A1351.

Liu, Shuang et al., "Long cycle life lithium ion battery with lithium nickel cobalt manganese oxide (NCM) cathode," Journal of Power Sources, 261, 2014, pp. 285-291.

Liu, Wen et al., "Nickel-Rich Layered Lithium Transitional-Metal Oxide for High-Energy Lithium-Ion Batteries," Angew. Chem. Int. Ed. 2015, 54, pp. 4440-4458.

Liu, Xizheng et al., "Study on the capacity fading of pristine and $FePO_4$ coated $LiNi_{1/3}Co_{1/3}Mn_{1/3}O_2$ by Electrochemical and Magnetical techniques," Electrochimica Acta 148, 2014, pp. 26-32.

Liu, Zhaoping et al., "Synthesis, Anion Exchange, and Delamination of Co—Al Layered Double Hydroxide: Assembly of the Exfoliated Nanosheet/Polyanion Composite Films and Magneto-Optical Studies," J. Am.

Liu, Yi et et., "$Li_3V_2(PO_4)_3$-coated $Li_{1.17}Ni_{0.2}Co_{0.05}Mn_{0.58}O_2$ as the cathode materialswith high rate capability for Lithium ion batteries," Electrochimica Acta 147, 2014, pp. 696-703.

Luo, Wenbin et al., "Can Zr be Substituted for Co in $Co_{1-z}Zr_z(OH)_2$ and $LiCo_{1-z}Zr_zO_2$?," Journal of the Electrochemical Society, 158, (2), 2011, pp. A110-A114.

Luo, Wenbin et al., "Preparation of $Co_{1-z}Al_z(OH)_2(NO_3)_z$ Layered Double Hydroxides and $Li(Co_1-zAl_z)O_2$," Chem. Mater. 2009, 21, pp. 56-82.

Luo, Wenbin et al., "Synthesis, Characterization, and Thermal Stability of $LiNi_{1/3}Mn_{1/3}Co_{1/3}$-zMgzO$_2$, $LiNi_{1/3-z}Mn_{1/3}Co_{1/3}$ MgzO$_2$, and $LiNi_{1/3}Mn_{1/3-z}Co_{1/3}MgzO_2$," Chem. Mater., 2010, 22, pp. 1164-1172.

Luo, Wenbin et al., "The Impact of Zr Substitution on the Structure, Electrochemical Performance and Thermal Stability of $Li[Ni_{1/3}Mn_{1/3-z}Co_{1/3}Zr_z]O_2$," Journal of the Electrochemical Society, 158 (4), 2011, pp. A428-A433.

Ma, Jin et al., "A highly homogeneous nanocoating strategy for Li-rich Mn-based layered oxides based on chemical conversion," Journal of Power Sources, 277, 2015, pp. 393-402.

Ma, Miaomiao et al., "Structural and electrochemical behavior of $LiMn_{0.4}Ni_{0.4}Co_{0.2}O_2$ ," Journal of Power Sources, 165, 2007, pp. 517-534.

Makimura, Yoshinari et al., "Lithium insertion material of $LiNi_{1/2}Mn_{1/2}O_2$ for advanced lithium-ion batteries," Journal of Power Sources, 119-121, 2003, pp. 156-160.

Manthiram, Arumugam, "Materials Challenges and Opportunities of Lithium Ion Batteries," J. Phys. Chem. Lett., 2011, 2, pp. 176-184.

Markus, Isaac M. et al., "Computational and Experimental Investigation of Ti Substitution in $Li_1(Ni_xMn_xCo_{1-2x-y}Ti_y)$ O for Lithium Ion Batteries," J. Phys. Chem. Lett. 2014, 5, pp. 3649-3655.

McCalla, E. E et al., "Formation of Layered-Layered Composites in the Li—Co—Mn Oxide Pseudoternary System during Slow Cooling," Chem. Mater. 2013, 25, pp. 912-918.

McCalla, E. et al., "How Phase Transformations during Cooling Affect Li—Mn—Ni—O Positive Electrodes in Lithium Ion Batteries," Journal of the Electrochemical Society, 160 (8), 2013, pp. A1134-A1138.

McCalla, E. et al., "Lithium loss mechanisms during synthesis of layered $Li_xNi_{2-x}O_2$ for lithium ion batteries," Solid State Ionics 219, 2012, pp. 11-19.

McCalla, E. et al., "Structural Study of the Li—Mn—Ni Oxide Pseudoternary System of Interest for Positive Electrodes of Li-Ion Batteries," Chem. Mater., 2013, 25, pp. 989-999.

(56) References Cited

OTHER PUBLICATIONS

McCalla, E. et al., "The Role of Metal Site Vacancies in Promoting Li—Mn—Ni-0 Layered Solid Solutions," Chem. Mater., 2013, 25, pp. 2716-2721.

McCalla, E. et al., "The spinel and cubic rocksalt solid-solutions in the Li—Mn—Ni oxide pseudo-ternary system," Solid State Ionics, 242, 2013, pp. 1-9.

Meng, Ying S. et al., "Combining Ab Initio Computation with Experiments for Designing New Electrode Materials for Advanced Lithium Batteries: LiNi$_{1/3}$Fe$_{1/6}$Co$_{1/6}$Mm$_{1/3}$O$_2$," Journal of the Electrochemical Society, 151 (8), 2004, pp. A1134-A1140.

Mohanty, Debasish et al., "Structural transformation of a lithium-rich Li1.2Co0.1Mn0.55Ni0.15O2 cathode during high voltage cycling resolved by in situ X-ray diffraction," Journal of Power Sources, 229, 2013, pp. 239-248.

Mueller-Neuhaus, J.R. et al., "Understanding Irreversible Capacity in Li$_x$Ni$_{1-y}$Fe$_y$O$_2$ Cathode Materials," Journal of the Electrochemical Society, 147 (10), 2000, pp. 3598-3605.

Mulder, Grietus et al., "Comparison of commercial battery cells in relation to material properties," Electrochimica Acta, 87, 2013, pp. 473-488.

Myung, Seung-Taek et al., "Progress in High-Capacity Core-Shell Cathode Materials for Rechargeable Lithium Batteries," J. Phys. Chem. Lett., 5, 2014, pp. 671-679.

Nagash, A.R. et al., "Effect of oxygen non-stoichiometry on the electrochemical performance of lithium manganese oxide spinels," Journal of Power Sources, 102, 2001, pp. 68-73.

Nie et al., "Some Lewis acid-base adducts involving boron trifluoride as electrolyte additives for lithium ion cells", Journal of Power Sources, vol. 328, Aug. 17, 2016, pp. 433-442; DOI: 10.1016/J.JPOWSOUR.2016.08.048.

Noh, Hyung-Joo et al., "Cathode Material with Nanorod Structure—An Application for Advanced High-Energy and Safe Lithium Batteries," Chem. Mater., 2013, 25, pp. 2109-2115.

Noh, Hyung-Joo et al., "Comparison of the structural and electrochemical properties of layered Li[Ni$_x$Co$_y$Mn$_z$]O$_2$ (x=1/3, 0.5, 0.6, 0.7, 0.8 and 0.85) cathode material for lithium-ion batteries," Journal of Power Sources, 233, 2013, pp. 121-130.

Noh, Hyung-Joo et al., "Formation of a Continuous Solid-Solution Particle and its Application to Rechargeable Lithium Batteries," Adv. Funct. Mater., 2013, 23, pp. 1028-1036.

Oh, Pilgun et al., "Superior Long-Term Energy Retention and Volumetric Energy Density for Li-Rich Cathode Materials," Nano Lett., 2014, 14, pp. 5965-5972.

Oh, Pilgun et al., Supporting Information "Superior Long-Term Energy Retention and Volumetric Energy Density for Li-Rich Cathode Materials," Nano Lett. 2014, 14, 12 pages.

Ohzuku, Tsutomo et al., "Electrochemistry and Structural Chemistry of LiNiO$_2$ (R3m) for 4 Volt Secondary Lithium Cells," J. Electrochem. Soc. 140(7), 1993, pp. 1862-1870.

Ohzuku, Tsutomo et al., "High-capacity lithium insertion materials of lithium nickel manganese oxides for advanced lithium-ion batteries: toward rechargeable capacity more than 300 mA h g$^{-1}$" J. Mater. Chem., 2011.

Ohzuku, Tsutomu et al., "Synthesis and Characterization of Li[Ni$_{1/2}$Mn$_{3/2}$]O$_4$ by Two-Step Solid State Reaction," Journal of the Ceramic Society of Japan, 110 [5], 2002, pp. 501-505.

Oishi, Masatsugu et al., "Direct observation of reversible charge compensation by oxygen ion in Li-rich manganese layered oxide . positive electrode material, Li$_{1.16}$Ni$_{0.15}$Co$_{0.19}$Mn$_{0.50}$O$_2$," Journal of Power Sources, 276, 2015, pp. 89-94.

Oka, Y. Y et al., "High-Temperature Cycling Performance of LiNi$_{1/3}$Co$_{1/3}$Mn$_{1/2}$O$_2$ Cathode with DLC Protective Film," Journal of the Electrochemical Society, 162 (2), 2015, pp. A3032-A3037.

Okada, Shigeto et al., "Fluoride Phosphate Li2COPO4F as a High Voltage Cathode in Li-ion Batteries," Journal of Power Sources, 146, 2005, pp. 565-569.

Okamoto, Kaoru et al., "X-Ray Absorption Fine Structure Study on Layered LIMO$_2$ (M=Ni, Mn, Co) Cathode Materials," Journal of the Electrochemical Society, 153(6), 2006, pp. A1120-A1127.

Paik, Younkee et al., "Lithium and Deuterium NMR Studies of Acid-Leached Layered Lithium Manganese Oxides," Chem. Mater., 2002, 14, pp. 5109-5115.

Palacin, M.R. et al., "Electrochemical and structural study of the 3.3 V reduction step in defective Li$_x$Mn$_2$O$_4$ and LiMn$_2$O$_{(4-y)}$Fy compounds," Journal of Power Sources 81-82, 1999, pp. 627-631.

Palacin, M.R. et al., "On the role of defects in decreasing the extra 3.3/3.95 and 4.5 V redox steps in Li—Mn—O spinels," Journal of Power Sources, 97-98, 2001, pp. 398-401.

Pan, Cheng-chi et al., "Recent development of LiNi$_x$Co$_y$Mn$_z$O$_2$: Impact of micro/nano structures for imparting improvements in lithium batteries," Trans. Nonferrous Met. Soc. China, 23, 2013, pp. 108-119.

Park, B.-C., et al., "Improvement of structural and electrochemical properties of AlF$_3$-coated Li[Ni$_{1/3}$Co$_{1/3}$Mn$_{1/3}$]O$_2$ cathode materials on high voltage region," Journal of Power Sources, 178, 2008, pp. 826-831.

Park, Joong Sun et al., "Amorphous Metal Fluoride Passivation Coatings Prepared by Atomic Layer Deposition on LiCoO$_2$ for Li-Ion Batteries," Chem. Mater. 2015, 27, pp. 1917-1920.

Park, S.-H. et al., "Lithium-manganese-nickel-oxide electrodes with integrated layered-spinel structures for lithium batteries," Electrochemistry Communications, 9, 2007, pp. 262-268.

Paulsen, J. J M. et al., "Layered Li—Mn-Oxide with the 02 Structure: A Cathode Material for Li-Ion Cells Which Does Not Convert to Spinel", Journal of the Electrochemical Society, 146 (10), 1991, pp. 3560-3565.

Pouillerie, C. et al., "The Li$_x$Ni$_{1-y}$Mg$_y$O$_2$ (y=0.05, 0.10) system: structural modifications observed upon cycling," Solid State Ionics, 132, 2000, pp. 15-29.

Prasad, R. et al., "Dopant-induced stabilization of rhombohedral LiMnO$_2$ against Jahn-Teller distortion," Physical Review B 71, 2005, 134111-1-134111-11.

Qian, Danna et al., "Uncovering the roles of oxygen vacancies cation migration in lithium excess layered oxides," Phys. Chern. Chern. Phys., 2014, 16, pp. 14665-14668.

Rashid, Muhammad et al., "Effect of Relaxation Periods over Cycling Performance of a Li-Ion Battery," Journal of the Electrochemical Society, 162 (2), 2015, pp. A3145-A3153.

Riley, Leah A., "Electrochemical effects of ALD surface modification on combustion synthesized LiNi$_{1/3}$Mn$_{1/3}$Co$_{1/3}$O$_2$ as a layered-cathode material," Journal of Power Sourcesm, 196, 2011, pp. 3317-3324.

Robert, Rosa et al., "Enhancement of the high potential specific charge in layered electrode materials for lithium-ion batteries," J. Mater. Chem. A, 2014, 2, pp. 8589-8598.

Rowe, Aaron W. et al., "Positive Electrode Materials in the Li—Mn—Ni—O System Exhibiting Anomalous Capacity Growth during Extended Cycling," Journal of the Electrochemical Society, 161 (3), 2014, pp. A308-A317.

Saavedra-Arias, Jose J. et al., "Synthesis and electrochemical properties of Li(Ni$_{0.8}$Co$_{0.1}$Mn$_{0.1}$)O$_2$ cathode material: Ex situ structural analysis by Raman scattering and X-ray diffraction at various stages of charge-discharge process," Journal of Power Sources, 183, 2008, pp. 761-765.

Sekizawa, Oki et al., "Crystal and electronic structure change determined by various method for delithiation process of Li$_x$(Ni,Mn)O$_2$-based cathode material," Journal of Power Sources, 196, 2011, pp. 6651-6656.

Shen, Chong-Heng et al., "Facile Synthesis of the U-Rich Layered Oxide Li$_{1.23}$Ni$_{0.009}$Co$_{0.12}$Mn$_{0.56}$O$_2$ with Superior Lithium Storage Performance and New Insights into Structural Transformation of the Layered Oxide Material during Charge-Discharge Cycle: In Situ XRD Characterization," ACS Appl. Mater. Interfaces, 2014, 6, pp. 5516-5524.

Shunmugasundaram, Ramesh et al., "High Capacity Li-Rich Positive Electrode Materials with Reduced First-Cycle Irreversible Capacity Loss," Chem. Mater. 2015, 27, pp. 757-767.

Son, In Hyuk et al., "Self-Terminated Artificial SEI Layer for Nickel-Rich Layered Cathode Material via Mixed Gas Chemical Vapor Deposition," Chem. Mater. 2015, 27, pp. 7370-7379.

(56) References Cited

OTHER PUBLICATIONS

Song, Jie et al., "Role of Oxygen Vacancies on the Performance of Li[Ni$_{0.5-x}$Mn$_{1.5+x}$]O$_4$ (x=0, 0.05, and 0.08) Spinel Cathodes for Lithium-Ion Batteries," Chem. Mater., 2012, 24 (15), pp. 3101-3109.

Sun, Yang-Kook et al., "High-energy cathode material for long-life and safe lithium batteries," Nature Materials, vol. 8, Apr. 2009, pp. 320-324.

Sun, Yang-Kook et al., "Nanostructured high-energy cathode materials for advanced lithium batteries," Nature Materials, vol. 11, 2012, pp. 942-947.

Sun, Yang-Kook et al., "Synthesis and Characterization of Li[(Ni$_{0.8}$Co$_{0.1}$Mn$_{0.1}$)$_{0.8}$(Ni$_{0.5}$Mn$_{0.5}$)$_{0.2}$]O$_2$ with the Microscale Core-Shell Structure as the Positive Electrode Material for Lithium Batteries," J. Am. Chem. Soc., 2005, 127, pp. 13411-13418.

Sun Yang-Kook et al., "The Role of AlF$_3$ Coatings in Improving Electrochemical Cycling of Li-Enriched Nickel-Manganese Oxide Electrodes for Li-Ion Batteries," Adv. Mater. 2012, 24, pp. 1192-1196.

Sun, Yang-Kook, "Concentration-Gradient Materials," Energy Storage & Conversion Material Laboratory, Hanyang University, (0305-30), 14 pages.

Tan, ShuangYuan et al., "Highly enhanced low temperature discharge capacity of LiNi$_{1/3}$Co$_{1/3}$Mn$_{1/3}$O$_2$ with lithium boron oxide glass modification," Journal of Power Sources, 277, 2015, pp. 139-146.

Tarascon, J.M. et al., "Synthesis Conditions and Oxygen Stoichiometry Effects on Li Insertion into the Spinel LiMn$_2$O$_4$," J. Electrochem. Soc., vol. 141, No. 6, Jun. 1994, pp. 1421-1431.

Tarascon, J.M. et al., "The Spinel Phase of LiMn$_2$O$_4$ as a Cathode in Secondary Lithium Cells," J. Electrochem. Soc., vol. 138, No. 10, Oct. 1991, pp. 2859-2864.

Thackeray, M. M. et al., "Advances in manganese-oxide 'composite' electrodes for lithium-ion batteries," J. Mater. Chem., 2005, 15, pp. 2257-2267.

Thackeray, M. M. et al., "ZrO$_2$- and Li$_2$ZrO$_3$-stabilized spinel and layered electrodes for lithium batteries," Electrochemistry Communications, 5, 2003, pp. 752-758.

Thackeray, M. M., "Structural Considerations of Layered and Spinel Lithiated Oxides for Lithium Ion Batteries," J. Electrochem. Soc., vol. 142, No. 8, Aug. 1995, pp. 2558-2563.

Thackeray, M.M. et al., "Comments on the structural complexity of lithium-rich Li$_{1+x}$M$_{1-x}$O$_2$ electrodes (M=Mn, Ni, Co) for lithium batteries," Electrochemistry Communications 8 (2006), pp. 1531-1538.

Thackeray, Michael M. et al., "Li$_2$MnO$_3$-stabilized LiMO$_2$ (M=Mn, Ni, Co) electrodes for lithium-ion batteries," J. Mater. Chem., 2007, 17, pp. 3112-3125.

Van Bommel, Andrew et al., "Analysis of the Growth Mechanism of Coprecipitated Spherical and Dense Nickel, Manganese, and Cobalt-Containing Hydroxides in the Presence of Aqueous Ammonia," Chem. Mater., 2009, 21, pp. 1500-1503.

Van Bommel, Andrew et al., "Synthesis of Spherical and Dense Particles of the Pure Hydroxide Phase Ni$_{1/3}$Mn$_{1/3}$Co$_{1/3}$(OH)$_2$," Journal of the Electrochemical Society, 156 (5), 2009, pp. A362-A365.

Van Der Ven, A., et al. "Lithium Diffusion in Layered Li$_x$CoO$_2$," Electrochemical and Solid-State Letters, 3 (7) (2000), pp. 301-304.

Wang, Dapeng et al., "Synthesis of high capacity cathodes for lithium-ion batteries by morphology-tailored hydroxide co-precipitation," Journal of Power Sources, 274, 2015, pp. 451-457.

Wang, Dapeng et al., "Synthesis of Lithium and Manganese-Rich Cathode Materials via an Oxalate Co-Precipitation Method," Journal of the Electrochemical Society, 160 (5), 2013, pp. A3108-A3112.

Wang, Q. Y. et al., "High capacity double-layer surface modified Li[Li$_{0.2}$Mn$_{0.54}$Ni$_{0.13}$Co$_{0.13}$]O$_2$ cathode with improved rate capability," J. Mater. Chem., 2009, 19, pp. 4965-4972.

Wang, Tao et al., "Synthesis optimization of Li$_{1+x}$[Mn$_{0.45}$Co$_{0.40}$Ni$_{0.15}$]O$_2$ with different spherical sizes via co-precipitation," Powder Technology, 187, 2008, pp. 124-129.

Wei et al. "Improved electrochemical performances of nanocrystalline Li[Li$_{0.2}$Mn$_{0.54}$Ni$_{0.13}$Co$_{0.13}$]O$_2$ cathode material for Li-ion batteries", RSC Advances, 2012, 2, pp. 3423-3429.

Wei, Yi et al., "Kinetics Tuning of Li-ion Diffusion in Layered U(Ni$_x$Mn$_y$Co$_z$)O$_2$," J. Am. Chem. Soc., 2015, 137, pp. 8364-8367, together with Supporting Information, 48 pages.

Wilcox, James D. et al., "The Impact of Aluminum and Iron Substitution on the Structure and Electrochemistry of Li(Ni$_{0.4}$Co$_{0.2-y}$M$_y$Mn$_{0.4}$)O$_2$ Materials," Journal of the Electrochemical Society, 156 (12) 2009, pp. A1011-A1018.

Wilcox, James et al., "Structure and Electrochemistry of LiNi$_{1/3}$Co$_{1/3-y}$M$_y$Mn$_{1/3}$O$_2$ (M=Ti, Al, Fe) Positive Electrode Materials," Journal of the Electrochemical Society, 156 (3), 2009, pp. A192-A198.

Wolf-Goodrich, Silas et al., "Tailoring the surface properties of LiNi$_{0.4}$Mn$_{0.4}$Co$_{0.2}$O$_2$ by titanium substitution for improved high voltage cycling performance," Phys.Chem.Chem.Phys., 2015, 17, pp. 21778-21781.

Woo, S-W, et al. "Improvement of electrochemical and thermal properties of Li[Ni$_{0.8}$Co$_{0.1}$Mn$_{0.1}$]O$_2$ positive electrode materials by multiple metal (Al, Mg) substitution," Electrochimica Acta, 54, 2009, pp. 3851-3856.

Wu, Feng et al., "Effect of Ni$^{2+}$ Content on Lithium/Nickel Disorder for Ni-Rich Cathode Materials," ACS Appl. Mater. Interfaces 2015, 7, pp. 7702-7708.

Wu, Kuichen et al., "Effect of precursor and synthesis temperature on the structural and electrochemical properties of Li(Ni$_{0.5}$Co$_{0.2}$Mn$_{0.3}$)O$_2$," Electrochimica Acta, 75, 2012, pp. 393-398.

Wu, Xiaobiao et al., "Sol-gel Synthesis of Li$_2$CoPO$_4$F/C Nanocomposite as a High-Power Cathode Material for Lithium Ion Batteries," Journal of Power Sources, 220, 2012, pp. 122-129.

Wu, Y. et al. "Structural stability of chemically delithiated layered (1-z)Li[Li$_{1/3}$Mn$_{2/3}$]O$_2$-zLi[Mn$_{0.5-y}$Ni$_{0.5-y}$CO$_{2y}$]O$_2$ solid solution cathodes," Journal of Power Sources, 183, 2008, pp. 749-754.

Xiang, Xingde et al., "Understanding the Effect of Co$^{3+}$ Substitution on the Electrochemical Properties of Lithium-Rich Layered Oxide Cathodes for Lithium-Ion Batteries," J. Phys. Chem. C, 2014, 118, pp. 21826-21833.

Xiong, Xunhui et al., "A modified LiF coating process to enhance the electrochemical performance characteristics of LiNi$_{0.8}$Co$_{0.1}$Mn$_{0.1}$O$_2$ cathode materials," Materials Letters, 110, 2013, pp. 4-9.

Xu, Bo et al., "Identifying surface structural changes in layered Li-excess nickel manganese oxides in high voltage lithium ion batteries: A joint experimental and theoretical study," Energy Environ. Sci., May 3, 20133, 11 pages.

Yabuuchi, Naoaki et al., "Novel lithium insertion material of LiCo$_{1/3}$Ni$_{1/3}$Mn$_{1/3}$O$_2$ for advanced lithium-ion batteries," Journal of Power Sources 119-121, 2003, pp. 171-174.

Yabuuchi, Naoki et al., "High-capacity electrode materials for rechargeable lithium batteries: Li$_3$NbO$_4$-based system with cation-disordered rocksalt structure," PNAS, vol. 112, No. 25, Jun. 23, 2015, pp. 7650-7655.

Yan, Jianhua et al., "Recent progress in Li-rich layered oxides as cathode materials for Li-ion batteries," RSC Adv., 2014, 4, pp. 63268-63284.

Yan, Pengfei et al., "Atomic-Resolution Visualization of Distinctive Chemical Mixing Behavior of Ni, Co, and Mn with Li in Layered Lithium Transition-Metal Oxide Cathode Materials," Chem. Mater., 2015, 27 (15), pp. 5393-5401.

Yang, Feifei et al., "Nanoscale Morphological and Chemical Changes of High Voltage Lithium-Manganese Rich NMC Composite Cathodes with Cycling," Nano Lett., 2014, 14, pp. 4334-4341.

Yang, Xiao-Qing et al., "Crystal structure changes of LiMn$_{0.5}$Ni$_{0.5}$O$_2$ cathode materials during charge and discharge studied by synchrotron based in situ XRD," Electrochemistry Communications, 4, 2002, pp. 649-654.

Yang, Yuan et al., "A membrane-free lithium/polysulfide semi-liquid battery for large-scale energy storage," Energy Environ. Sci., 2013, 6, pp. 1552-1558.

(56) References Cited

OTHER PUBLICATIONS

Yano, Akira et al., "Surface Structure and High-Voltage Charge/Discharge Characteristics of Al-Oxide Coated $LiNi_{1/3}Co_{1/3}Mn_{1/3}O_2$ Cathodes," Journal of the Electrochemical Society, 162 (2), 2015, pp. A3137-A3144.

Ye, Delai et al., "Ni-induced stepwise capacity increase in Ni-less Li-rich cathode materials for high performance lithium ion batteries," Nano Research, 8(3), Feb. 2014, pp. 808-820.

Yin, S -C et al. X-ray/Neutron Diffraction and Electrochemical Studies of Lithium De/Re-Intercalation in $Li_{1-x}Co_{1/3}Ni_{1/3}Mn1/3\ O_2$ ($x=0 \rightarrow 1$), Chem. Mater. 2006, 18, pp. 1901-1910.

Yoon, Sung-Jun et al., "Improved Performances of $Li[Ni_{0.65}Co_{0.08}Mn_{0.27}]O_2$ Cathode Material with Full Concentration Gradient for Li-Ion Batteries," Journal of the Electrochemical Society, 162 (2), 2015, pp. A3059-A3063.

Yoon, Won-Sub et al. "Investigation of the Charge Compensation Mechanism on the Electrochemically Li-Ion Deintercalated $Li_{1-x}Co_{1/3}Ni_{1/3}Mn_{1/3}O_2$ Electrode System by Combination of Soft and Hard X-ray Absorption Spectroscopy," J. Am. Chem. Soc., 2005, 127, pp. 17479-17487.

Yoon, Won-Sub et al., "Electronic structural changes of the electrochemically Li-ion deintercalated $LiNi_{0.8}Co_{0.15}Al_{0.05}O_2$ cathode material investigated by X-ray absorption spectroscopy," Journal of Power Sources, 174, 2007, pp. 1015-1020.

Yoon, Won-Sub et al., "In Situ X-ray Absorption Spectroscopic Study on LiNi0.5Mn0.5O2 Cathode Material during Electrochemical Cycling," Chem. Mater. 2003, 15, pp. 3161-3169.

Yoon, Won-Sub et al., "Investigation of the Local Structure of the $LiNi_{0.5}Mn_{0.5}O_2$ Cathode Material during Electrochemical Cycling by X-Ray Absorption and NMR Spectroscopy," Electrochemical and Solid-State Letters, 5 (11), 2002, pp. A263-A266.

Yoon, Won-Sub et al., "Li MAS NMR and in situ X-ray studies of lithium nickel manganese oxides," Journal of Power Sources 119-121, 2003, pp. 649-653.

Yu, Haijun et al., "Study of the lithium/nickel ions exchange in the layered $LiNi_{0.42}Mn_{0.42}Co_{0.16}O_2$ cathode material for lithium ion batteries: experimental and first-principles calculations." Energy Environ. Sci.. 2014. 11 pages.

Yue, Peng et al., "A low temperature fluorine substitution on the electrochemical performance of layered $LiNi_{0.8}Co_{0.1}Mn_{0.1}O_{2-z}F_z$ cathode materials," Electrochimica Acta, 92, 2013, pp. 1-8.

Yue, Peng et al., "Effect of fluorine on the electrochemical performance of spherical $LiNi_{0.8}Co_{0.1}Mn_{0.1}O_2$ cathode materials via a low temperature method," Powder Technology, 237, 2013 pp. 623-626.

Yue, Yang et al., "Growth mechanisms for spherical mixed hydroxide agglomerates prepared by co-precipitation method: A case of $Ni_{1/3}Co_{1/3}Mn_{1/3}(OH)_2$," Journal of Alloys and Compounds, 619, 2015, pp. 846-853.

Zhang et al., "Direct Visualization of the Interfacial Degradation of Cathode Coatings in Solid State Batteries: A Combined Experimental and Computational Study", Adv. Energy Mater. 2020, 1903778 (9 pages); DOI: 10.1002/aenm.201903779.

Zhang, H.Z. et al., "Surface nitridation of Li-rich layered $Li(Li_{0.17}Ni_{0.25}Mn_{0.58})O_2$ oxide as cathode material for lithium-ion battery," J. Mater. Chem., 2012, 22, pp. 13104-13109.

Zhang, Shengmao et al., "Self-Assembled Hollow Spheres of $13-Ni(OH)_2$ and Their Derived Nanomaterials," Chem. Mater., 2009, 21, pp. 871-883.

Zhao, Yujuan et al., "Enhanced Electrochemical Performance of $Li[Li_{0.2}Ni_{0.2}Mn_{0.6}]O_2$ Modified by Manganese Oxide Coating for Lithium-Ion Batteries," Electrochemical and Solid-State Letters, 14 (1), 2011, pp. A1-A5.

Zhou, Fu et al., "Advantages of Simultaneous Substitution of Co in $Li[Ni_{1/3}Mn_{1/3}Co_{1/3}]O_2$ by Ni and Al," Electrochemical and Solid-State Letters, 12 (4), 2009, pp. A81-A83.

Zhou, Fu et al., "Coprecipitation Synthesis of $Ni_xMm1-x(OH)_2$ Mixed Hydroxides," Chem. Mater., vol. 22, No. 3, 2010, pp. 1015-1021.

Zhou, Fu et al., "Solid-State Synthesis as a Method for the Substitution of Al for Co in $LiNi_{1/3}Mn_{1/3}Co_{(1/3-z)}Al_zO_2$," Journal of the Electrochemical Society, 156 (10), 2009, pp. A796-A801.

Zhou, Fu et al., "The effect of Al substitution on the reactivity of delithiated $LiNi_{1/3}Mn_{1/3}Co_{(1/3-z)}Al_zO_2$ with non-aqueous electrolyte," Electrochemistry Communications 10 (2008), pp. 1168-1171.

Zhou, Hongming et al., "Enhanced performance of the electrolytes based on sulfolane and lithium difluoro(oxalate)borate with enhanced interfacial stability for Li $Ni_{0.5}Mn_{1.5}O_4$ cathode", Journal of Electroanalytical Chemistry, vol. 808, 2018, pp. 293-302; DOI: 10.1016/J.JELECHEM.2017.12.040.

Zhu, Ye et al., "Positive Electrode Passivation by LiDFOB Electrolyte Additive in High-Capacity Lithium-Ion Cells," Journal of the Electrochemical Society, 159 (12), 2012, pp. A2109-A2117.

Aiken et al., "A Survey of in Situ Gas Evolution during High Voltage Formation in Li-Ion Pouch Cells", Journal of the Electrochemical Society, 162 (4) A760-A767 (2015).

Burns et al., "Impedance Reducing Additives and Their Effect on Cell Performance", Journal of the Electrochemical Society, 159 (7) A1105-A1113 (2012).

Burns et al., "The Impact of Varying the Concentration of Vinylene Carbonate Electrolyte Additive in Wound Li-Ion Cells", Journal of the Electrochemical Society, 159 (2) A85-A90 (2012).

Busche et al., "Dynamic formation of a solid-liquid electrolyte interphase and its consequences for hybrid-battery concepts", Nature Chemistry, vol. 8, May 2016, pp. 426-434.

Choi et al., "Recent advances in the electrolytes for interfacial stability of high-voltage cathodes in lithium-ion Batteries", The Royal Society of Chemistry 2015, 5, 2732-2748.

Delp et al., "Importance of Reduction and Oxidation Stability of High Voltage Electrolytes and Additives", Electrochimica Acta 209 (2016) 498-510.

Fathi et al., "Ultra High-Precision Studies of Degradation Mechanisms in Aged $LiCoO_2$/Graphite Li-Ion Cells", Journal of the Electrochemical Society, 161 (10) A1572-A1579 (2014).

Han et al., "Distinct Reaction Characteristics of Electrolyte Additives for High-Voltage Lithium-Ion Batteries: Tris(trimethylsilyl) Phosphite, Borate, and Phosphate", Electrochimica Acta 215 (2016) 455-465.

Koo et al., "Vinylene carbonate and tris(trimethylsilyl) phosphite hybrid additives to improve the electrochemical performance of spinel lithium manganese oxide/graphite cells at 60° C.", Electrochimica Acta 173 (2015) 750-756.

Li et al., "Hybrid Polymer/Garnet Electrolyte with a Small Interfacial Resistance for Lithium-Ion Batteries", Angew. Chem. 2017, 129, 771-774; DOI: 10.1002/ange.201608924.

Li et al., "New electrolytes for lithium ion batteries using LiF salt and boron based anion receptors", Journal of Power Sources 184 (2008) 517-521; doi:10.1016/j.jpowsour.2008.03.016.

Liu et al., "Achieving high capacity in bulk-type solid-state lithium ion battery based on $Li_{6.75}La_3Zr_{1.75}Ta_{0.25}O_{12}$ electrolyte: Interfacial resistance", journal of Power Sources 324 (2016) 349-357.

Ma et al., "Ternary and Quaternary Electrolyte Additive Mixtures for Li-Ion Cells That Promote Long Lifetime, High Discharge Rate and Better Safety", Journal of the Electrochemical Society, 161 (9) A1261-A1265 (2014).

Ma et al., "Ternary Electrolyte Additive Mixtures for Li-Ion Cells that Promote Long Lifetime and Less Reactivity with Charged Electrodes at Elevated Temperatures", Journal of the Electrochemical Society, 162 (7) A1170-A1174 (2015).

Pires et al., "Tris(2,2,2-trifluoroethyl) phosphite as an electrolyte additive for high-voltage lithium-ion batteries using lithium-rich layered oxide cathode", Journal of Power Sources 296 (2015) 413-425; http://dx.doi.org/10.1016/j.jpowsour.2015.07.065.

Qi et al., "Lifetime limit of tris(trimethylsilyl) phosphite as electrolyte additive for high voltage lithium ion batteries", J. Name., 2013, 00, 1-3.

Schleutker et al., "On the interfacial charge transfer between solid and liquid Li+ electrolytes", Phys. Chem. Chem. Phys., 2017, 19, 26596-26605.

Song et al., "A multifunctional phosphite-containing electrolyte for 5 V-class $LiNi_{0.5}Mn_{1.5}O_4$ cathodes with superior electrochemical performance", J. Mater. Chem. A, 2014, 2, 9506-9513.

(56) References Cited

OTHER PUBLICATIONS

Song et al., "Exploiting chemically and electrochemically reactive phosphite derivatives for high-voltage spinel $LiNi_{0.5}Mn_{1.5}O_4$ cathodes", Journal of Power Sources 302 (2016) 22-30.

Wang et al., "A comparative study of Si-containing electrolyte additives for lithium ion battery: Which one is better and why is it better", Journal of Power Sources 342 (2017) 677-684.

Wang et al., "A Systematic Study of Electrolyte Additives in $Li[Ni_{1/3}Mn_{1/3}Co_{1/3}]O_2$ (NMC)/Graphite Pouch Cells", Journal of the Electrochemical Society, 161 (12) A1818-A1827 (2014).

Wang et al., "Trimethyl borate as an electrolyte additive for high potential layered cathode with concurrent improvement of rate capability and cyclic stability", Electrochimica Acta 184 (2015) 40-46.

Xia et al., "Fluorinated electrolyte for 4.5 V $Li(Ni_{0.4}Mn_{0.4}Co_{0.2})O_2$/graphite Li-ion Cells", Journal of Power Sources 307 (2016) 340-350; http://dx.doi.org/10.1016/j.jpowsour.2015.12.132.

Zhang et al., "Artificial Interface Deriving from Sacrificial Tris(trimethylsilyl)phosphate Additive for Lithium Rich Cathode Materials", Electrochimica Acta 117 (2014) 99-104.

Zheng et al., "Interface modifications by anion receptors for high energy lithium ion batteries", Journal of Power Sources 250 (2014) 313-318.

\* cited by examiner

ELECTROCHEMICAL CELLS WITH CATHOLYTE ADDITIVES AND LITHIUM-STUFFED GARNET SEPARATORS

CROSS-REFERENCE TO RELATED APPLICATIONS

This application claims priority to, and the benefit of, U.S. Provisional Patent Application No. 62/756,555, which was filed Nov. 6, 2018, the entire contents of which are herein incorporated by reference in its entirety for all purposes.

BACKGROUND

Conventional rechargeable batteries use liquid electrolytes to physically separate and thereby electrically insulate the positive and negative electrodes (i.e., cathodes and anodes, respectively). However, liquid electrolytes suffer from several problems including flammability during thermal runaway, outgassing at high voltages, and chemical incompatibility with lithium metal negative electrodes. As an alternative, solid electrolytes have been proposed for next generation rechargeable batteries. For example, $Li^+$ ion-conducting ceramic oxides, such as lithium-stuffed garnets (e.g., $Li_3La_7Zr_2O_{12}$, aka LLZO), have been considered as electrolyte separators. See, for example, US Patent Application Publication No. 2015/0099190, published Apr. 9, 2015, and filed Oct. 7, 2014, titled GARNET MATERIALS FOR LI SECONDARY BATTERIES AND METHODS OF MAKING AND USING GARNET MATERIALS; U.S. Pat. Nos. 8,658,317; 8,092,941; and 7,901,658; also US Patent Application Publication Nos. 2013/0085055; 2011/0281175; 2014/0093785; and 2014/0170504; also Bonderer, et al. "Free-Standing Ultrathin Ceramic Foils," Journal of the American Ceramic Society, 2010, 93(11):3624-3631; and Murugan, et al., *Angew Chem. Int. Ed.* 2007, 46, 7778-7781).

When LLZO is exposed to certain cathode architectures which include a liquid electrolyte in the cathode, i.e., a so-called catholyte, the interface of the cathode-LLZO may be contaminated with surface species which may negatively affect $Li^+$ ion-conductivity. This surface contamination effect may be particularly problematic when the rechargeable battery is held at a high voltage for an extended period of time.

A commercial requirement for rechargeable batteries is that they maintain a high voltage and high state of charge without losing capacity or increasing resistance. To date, this is an unmet challenge in the field to which the instant invention pertains.

There is a need for cathode architectures and catholytes useful for decreasing the interfacial resistance of LLZO electrolytes. There is a need for cathode architectures and catholytes useful for passivating the LLZO surface, with respect to surface reactions that result in surface contaminants that negatively affect $Li^+$ ion conductivity and area-specific resistance. Set forth herein are solutions to these and other problems.

SUMMARY

In one embodiment, set forth herein is a electrochemical cell that includes a positive electrode, an negative electrode, and a solid-state electrolyte therebetween. The positive electrode includes a catholyte, which includes a lithium salt; a first solvent selected from sulfolane, 1,3-propane sultone, sulfolene, thiophene, or combinations thereof; a second solvent; and a strong Lewis acid additive. The solid-state electrolyte includes lithium-stuffed garnet; and the negative electrode includes lithium metal.

In a second embodiment, set forth herein is a process for making an electrochemical cell, including (a) providing a positive electrode infiltrated with a catholyte, the catholyte including (1) a lithium salt; (2) a first solvent selected from sulfolane, 1,3-propane sultone, sulfolene, thiophene, or combinations thereof; a second solvent; and a strong Lewis acid additive. The solid-state electrolyte comprises lithium-stuffed garnet. The process includes (b) providing a sintered lithium-stuffed garnet solid-state separator; and (c) contacting the sintered lithium-stuffed garnet solid-state separator to the positive electrode.

In a third embodiment, set forth herein is a method of using an electrochemical cell set forth herein, the method including holding the electrochemical cell at a voltage of 3.9 V (v. Li) or greater. In some examples, the interfacial ASR at the interface between the lithium-stuffed garnet and the positive electrode does not increase by more than 10% over at least a day at room temperature.

BRIEF DESCRIPTIONS OF THE DRAWINGS

DETAILED DESCRIPTION

Figure 1:
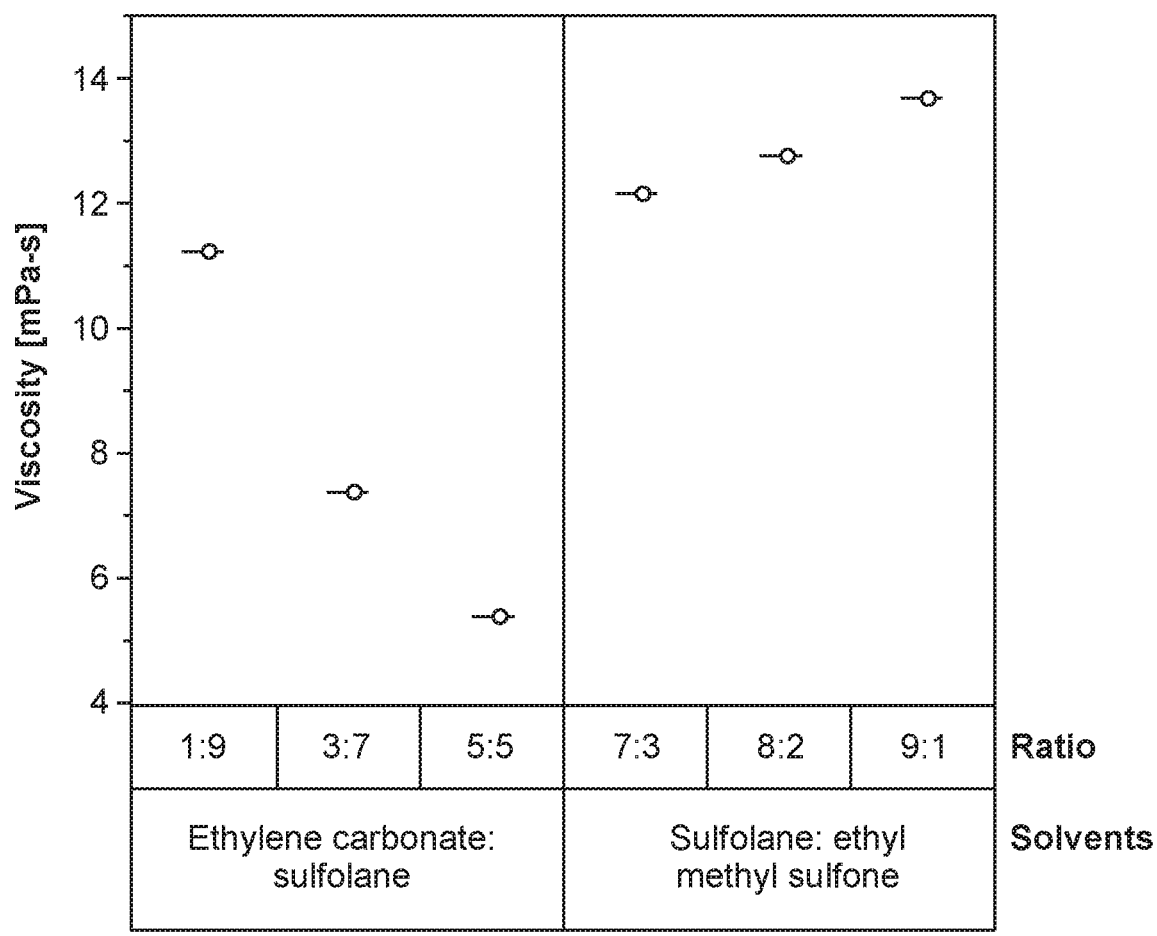
FIG. 1 shows a plot of viscosity (mPa-s) as a function of the volume ratio of ethylene carbonate:sulfolane (left side); and of sulfolane:ethyl methyl sulfone (right side).

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the inventions herein are not intended to be limited to the embodiments presented, but are to be accorded their widest scope consistent with the principles and novel features disclosed herein.

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

I. General

The instant disclosure set forth electrolytes, called catholytes, which are useful in positive electrodes (i.e., cathodes) of electrochemical cells (e.g., rechargeable batteries) that include lithium-stuffed garnet solid-state separators between the positive and negative electrodes. The catholytes set forth herein prevent and/or reduce increases in area-specific resistance (ASR) in these electrochemical cells at the interface between the lithium-stuffed garnet solid-state electrolyte separator and a positive electrode in direct contact with the lithium-stuffed garnet solid-state electrolyte. In some examples, the catholytes set forth herein prevent and/or reduce increases in area-specific resistance (ASR) in these electrochemical cells at the interface between the lithium-stuffed garnet solid-state electrolyte separator and a positive electrode in direct contact with the lithium-stuffed garnet solid-state electrolyte when the electrochemical cell is stored at high voltage (e.g., 4.2 V v. Li or higher) for an extended period of time (e.g., 1-30 days). In some examples, the catholytes set forth herein prevent and/or reduce increases in area-specific resistance (ASR) by preventing and/or reducing fluorination of the surface of the lithium-stuffed garnet solid-state separator that is in contact with the positive electrode, and the catholyte therein.

Catholytes which include ethylene carbonate (EC), sulfolane (S), and lithium hexafluorophosphate ($LiPF_6$), are suitable for use in electrochemical cells having lithium-stuffed garnet solid-state separators. However, these catholytes may react detrimentally with the surface of lithium-stuffed garnet, resulting in fluorination of that surface. This fluorination may cause high impedance to grow over time as the lithium-stuffed garnet is continually exposed to the catholyte. The instant disclosure shows that additives which getter fluorine anions or dissolve fluoride layers improve ASR stability and reduce the variability of garnet surface charge transfer impedance. The instant disclosure demonstrates, for example, that tris(trimethysilyl) phosphite and other such additives reduce interfacial ASR increases, which may result from HF contamination. The instant disclosure also demonstrates that these additives mitigate ASR growth during a voltage hold at high state of charge. In some examples, the additives include a linear sulfone co-solvent with TTSPi, and this additives improves the homogeneity of the final electrolyte solution.

Commercially viable rechargeable batteries are required to maintain a high voltage and high state of charge without losing capacity or increasing resistance. However, this is a problem for solid-state batteries which include lithium-stuffed garnet solid-state separators. The instant disclosure demonstrates low and stable ASR growth after a high voltage hold has been applied to a full electrochemical cell which included a lithium-stuffed garnet solid-state separator and a cathode with liquid electrolyte. The instant disclosure demonstrates, for example, that Lewis Acid type additives may passivate lithium-stuffed garnet surfaces which are in contact with catholytes and result in low impedance interfaces. The additives may reduce harm to the garnet surface from anion attack. $PF_6^-$, for example, can decompose thermally, at high voltage, and/or within the presence of water. The lithium-stuffed garnet surface will react with several of the decomposition by-products of $PF_6^-$. Some of the additives herein may, without being bound by theory, mitigate $PF_6^-$ decomposition by forming complexes with reactive anions, such as but not limited to $PF_6^-$ decomposition products; by stabilizing the garnet surface with an SEI-like passivating film; and by dissolving LiF or $AlF_3$ which may form on the surface of the LLZO. One example is TTSPi, which can complex with anions and passivate the garnet surface, or dissolve LiF. Borate and phosphite based strong Lewis acid additives are shown herein to have similar effects to TTSPi.

II. Definitions

As used herein, the term "about," when qualifying a number, e.g., 15% w/w, refers to the number qualified and optionally the numbers included in a range about that qualified number that includes ±10% of the number. For example, about 15% w/w includes 15% w/w as well as 13.5% w/w, 14% w/w, 14.5% w/w, 15.5% w/w, 16% w/w, or 16.5% w/w. For example, "about 75° C.," includes 75° C. as well 68° C., 69° C., 70° C., 71° C., 72° C., 73° C., 74° C., 75° C., 76° C., 77° C., 78° C., 79° C., 80° C., 81° C., 82° C., or 83° C.

As used herein, the phrase "ambient conditions," refers to room temperature and a natural atmosphere such as the atmosphere of planet Earth that includes approximately 78% $N_2$ & 21% $O_2$; and/or with moisture also present. Ambient conditions include standard temperature and pressure, with a relative humidity of at least 1%.

As used herein, the term "annealing" refers to a process wherein a sintered electrolyte thin film is heated from 200° C. to 1000° C. in a reducing atmosphere such as but not limited to Argon, hydrogen, or a combination thereof. Example anneal processes are described in U.S. Pat. No. 9,966,630 B2, which issued May 8, 2018 and is titled ANNEALED GARNET ELECTROLYTE SEPARATORS, the entire contents of which are herein incorporated by reference in its entirety for all purposes.

As used herein, the phrase "at least one member selected from the group" includes a single member from the group, more than one member from the group, or a combination of members from the group. At least one member selected from the group consisting of A, B, and C includes, for example, A, only, B, only, or C, only, as well as A and B as well as A and C as well as B and C as well as A, B, and C or any combination of A, B, and C.

As used herein, the term "ASR" refers to area specific resistance.

As used herein, the term "contaminant" refers to a chemical deviation from a pristine material. A contaminant in a lithium-stuffed garnet may include any material other than lithium-stuffed garnet such as, but not limited to, a lithium carbonate, a lithium hydroxide, a lithium oxide, a lithium peroxide, a hydrate thereof, an oxide thereof, or a combination thereof, wherein oxide and lithium oxide do not include a lithium-stuffed garnet. Contaminants of a garnet may include, but are not limited to, hydroxides, peroxides, oxides, carbonates, and combination thereof, which are not lithium-stuffed garnet.

As used herein, the term "electrolyte" refers to an ionically conductive and electrically insulating material. Electrolytes are useful for electrically insulating the positive and negative electrodes of a rechargeable battery while allowing for the conduction of ions, e.g., $Li^+$, through the electrolyte.

As used herein, the term "catholyte" refers to a liquid or gel electrolyte confined within the positive electrode space of an electrochemical cell. Catholyte also refers to a Li ion conductor that is intimately mixed with, or that surrounds and contacts, or that contacts the positive electrode active materials and provides an ionic pathway for $Li^+$ to and from the active materials. Catholytes may also be liquid, gel, semi-liquid, semi-solid, polymer, and/or solid polymer ion conductors. In some examples, the catholyte includes a gel set forth herein. In some examples, the gel electrolyte includes any electrolyte set forth herein, including a nitrile, dinitrile, organic sulfur-including solvent, or combination thereof set forth herein.

As used herein, the phrases "gel electrolyte" unless specified otherwise, refers to a suitable $Li^+$ ion conducting gel or liquid-based electrolyte, for example, those set forth in U.S. Pat. No. 5,296,318, entitled RECHARGEABLE LITHIUM INTERCALATION BATTERY WITH HYBRID POLYMERIC ELECTROLYTE. A gel electrolyte has a lithium ion conductivity of greater than $10^{-5}$ S/cm at room temperature, a lithium transference number between 0.05-0.95, and a storage modulus greater than the loss modulus at some temperature. A gel electrolyte may comprise a polymer matrix, a solvent that gels the polymer, and a lithium containing salt that is at least partly dissociated into $Li^+$ ions and anions. Alternately, a gel electrolyte may comprise a porous polymer matrix, a solvent that fills the pores, and a lithium containing salt that is at least partly dissociated into $Li^+$ ions and anions where the pores have one length scale less than 10 μm.

As used herein, the phrases "electrochemical cell" or "battery cell" shall, unless specified to the contrary, mean a single cell including a positive electrode and a negative electrode, which have ionic communication between the two using an electrolyte. In some embodiments, a battery or module includes multiple positive electrodes and/or multiple negative electrodes enclosed in one container, i.e., stacks of electrochemical cells. A symmetric cell unless specified to the contrary is a cell having two Li metal anodes separated by a solid-state electrolyte.

As used herein the phrase "electrochemical stack," refers to one or more units which each include at least a negative electrode (e.g., Li, $LiC_6$), a positive electrode (e.g., Li-nickel-manganese-oxide or $FeF_3$, optionally combined with a catholyte or a gel electrolyte), and a solid electrolyte (e.g., lithium-stuffed garnet electrolyte set forth herein) between and in contact with the positive and negative electrodes. In some examples, between the solid electrolyte and the positive electrode, there is an additional layer comprising a gel electrolyte. An electrochemical stack may include one of these aforementioned units. An electrochemical stack may include several of these aforementioned units arranged in electrical communication (e.g., serial or parallel electrical connection). In some examples, when the electrochemical stack includes several units, the units are layered or laminated together in a column. In some examples, when the electrochemical stack includes several units, the units are layered or laminated together in an array. In some examples, when the electrochemical stack includes several units, the stacks are arranged such that one negative electrode is shared with two or more positive electrodes. Alternatively, in some examples, when the electrochemical stack includes several units, the stacks are arranged such that one positive electrode is shared with two or more negative electrodes. Unless specified otherwise, an electrochemical stack includes one positive electrode, one solid electrolyte, and one negative electrode, and optionally includes a gel electrolyte layer between the positive electrode and the solid electrolyte.

As used herein, the phrase "directly contacts" refers to the juxtaposition of two materials such that the two materials contact each other sufficiently to conduct either an ion or electron current. As used herein, direct contact refers to two materials in contact with each other and which do not have any materials positioned between the two materials which are in direct contact.

As used herein, the phrase "electrochemical device" refers to an energy storage device, such as, but not limited to a Li-secondary battery that operates or produces electricity or an electrical current by an electrochemical reaction, e.g., a conversion chemistry reaction such as $3Li+ FeF_3 \leftrightarrow 3LiF+Fe$.

As used herein, the phrase "film" or "thin film" refers to a thin membrane of less than 0.5 mm in thickness and greater than 10 nm in thickness. A thin film is also greater than 5 mm in a lateral dimension. A "film" or "thin-film" may be produced by a continuous process such as tape-casting, slip casting, or screen-printing.

As used herein, the phrase "film thickness" refers to the distance, or median measured distance, between the top and bottom faces of a film. As used herein, the top and bottom faces refer to the sides of the film having the largest surface area. As used herein, thickness is measured by cross-sectional scanning electron microscopy.

As used herein, the term "pellet" refers to a small unit of bulky material compressed into any of several shapes and sizes, e.g., cylindrical, rectangular, or spherical. The compressed material is disc-shaped and may be 5-20 cm in diameter and 0.5 to 2 cm in height. Typically, the compressed material is disc-shaped and 10 cm in diameter and 1 cm in height. Pellets may also include additional agents to help bind the material compressed into the pellet. In some examples, these additional agents are referred to as binding agents and may include, but are not limited to, polymers such as poly(ethylene)oxide. In some examples, polyvinyl butyral is used as a binding agent. Pellets are typically made by pressing a collection of powder materials in a press. This pressing makes the powder materials adhere to each other and increases the density of the collection of powder material when compared to the density of the collection of powder material before pressing. In some instances, the powder material is heated and/or an electrical current is passed through the powder material during the pressing.

As used herein, the term "pressed pellet" refers to a pellet having been submitted to a pressure (e.g., 5000 PSI) to further compress the pellet.

As used herein, the phrase "lithium stuffed garnet" refers to oxides that are characterized by a crystal structure related to a garnet crystal structure. U.S. Patent Application Publication No. U.S. 2015/0099190, which published Apr. 9, 2015 and was filed Oct. 7, 2014 as Ser. No. 14/509,029, is incorporated by reference herein in its entirety. This application describes Li-stuffed garnet solid-state electrolytes used in solid-state lithium rechargeable batteries. These Li-stuffed garnets generally having a composition according to $Li_A La_B M'_C M''_D Zr_E O_F$, $Li_A La_B M'_C M''_D Ta_E O_F$, or $Li_A La_B M'_C M''_D Nb_E O_F$, wherein $4<A<8.5$, $1.5<B<4$, $0 \leq C \leq 2$, $0 \leq D \leq 2$; $0 \leq E < 2.5$, $10<F<13$, and M' and M" are each, independently in each instance selected from Ga, Al, Mo, W, Nb, Sb, Ca, Ba, Sr, Ce, Hf, Rb, and Ta, or $Li_a La_b Zr_c Al_d Me''_e O_f$, wherein $5<a<8.5$; $2<b<4$; $0<c \leq 2.5$; $0 \leq d<2$; $0 \leq e<2$, and $10<f<13$ and Me" is a metal selected from Ga, Nb, Ta, V, W, Mo, and Sb and as otherwise described in U.S. Patent Application Publication No. U.S. 2015/0099190. As used herein, lithium-stuffed garnets, and garnets, generally, include, but are not limited to, $Li_{7.0}La_3(Zr_{t1}+Nb_{t2}+Ta_{t3})O_{12}+0.35Al_2O_3$; wherein (t1+t2+t3=2) so that the La:(Zr/Nb/Ta) ratio is 3:2. Also, garnets used herein include, but are not limited to, $Li_x La_3 Zr_2 O_F+yAl_2O_3$, wherein x ranges from 5.5 to 9; and y ranges from 0.05 to 1. In these examples, subscripts x, y, and F are selected so that the garnet is charge neutral. In some examples x is 7 and y is 1.0. In some examples, x is 5 and y is 1.0. In some examples, x is 6 and y is 1.0. In some examples, x is 8 and y is 1.0. In some examples, x is 9 and y is 1.0. In some examples x is 7 and y is 0.35. In some examples, x is 5 and y is 0.35. In some examples, x is 6 and y is 0.35. In some examples, x is 8 and y is 0.35. In some examples, x is 9 and y is 0.35. In some examples x is 7 and y is 0.7. In some examples, x is 5 and y is 0.7. In some examples, x is 6 and y is 0.7. In some examples, x is 8 and y is 0.7. In some examples, x is 9 and y is 0.7. In some examples x is 7 and y is 0.75. In some examples, x is 5 and y is 0.75. In some examples, x is 6 and y is 0.75. In some examples, x is 8 and y is 0.75. In some examples, x is 9 and y is 0.75. In some examples x is 7 and y is 0.8. In some examples, x is 5 and y is 0.8. In some examples, x is 6 and y is 0.8. In some examples, x is 8 and y is 0.8. In some examples, x is 9 and y is 0.8. In some examples x is 7 and y is 0.5. In some examples, x is 5 and y is 0.5. In some examples, x is 6 and y is 0.5. In some examples, x is 8 and y is 0.5. In some examples, x is 9 and y is 0.5. In some examples x is 7 and y is 0.4. In some examples, x is 5 and y is 0.4. In some examples, x is 6 and y is 0.4. In some examples, x is 8 and y is 0.4. In some examples, x is 9 and y is 0.4. In some examples x is 7 and y is 0.3. In some examples, x is 5 and y is 0.3. In some examples, x is 6 and y is 0.3. In some examples, x is 8 and y is 0.3. In some examples, x is 9 and y is 0.3. In some examples x is 7 and y is 0.22. In some examples, x is 5 and y is 0.22. In some examples, x is 6 and y is 0.22. In some examples, x is 8 and y is 0.22. In some examples, x is 9 and y is 0.22. Also, garnets as used herein include, but are not limited to, $Li_x La_3 Zr_2 O_2+yAl_2O_3$. In one embodiment, the Li-stuffed garnet herein has a composition of $Li_7 Li_3 Zr_2 O_{12}$. In another embodiment, the Li-stuffed garnet herein has a composition of $Li_7 Li_3 Zr_2 O_{12} \cdot Al_2 O_3$. In yet another embodiment, the Li-stuffed garnet herein has a composition of $Li_7 Li_3 Zr_2 O_{12} \cdot 0.22 Al_2 O_3$. In yet another embodiment, the Li-stuffed garnet herein has a composition of $Li_7 Li_3 Zr_2 O_{12} \cdot 0.35 Al_2 O_3$. In certain other embodiments, the Li-stuffed garnet herein has a composition of $Li_7 Li_3 Zr_2 O_{12} \cdot 0.5 Al_2 O_3$. In another embodiment, the Li-stuffed garnet herein has a composition of $Li_7 Li_3 Zr_2 O_{12} \cdot 0.75 Al_2 O_3$.

As used herein, garnet does not include YAG-garnets (i.e., yttrium aluminum garnets, or, e.g., $Y_3 Al_5 O_{12}$). As used herein, garnet does not include silicate-based garnets such as pyrope, almandine, spessartine, grossular, hessonite, or cinnamon-stone, tsavorite, uvarovite and andradite and the solid solutions pyrope-almandine-spessarite and uvarovite-grossular-andradite. Garnets herein do not include nesosilicates having the general formula $X_3 Y_2(SiO_4)_3$ wherein X is Ca, Mg, Fe, and, or, Mn; and Y is Al, Fe, and, or, Cr.

As used herein, the phrase "lithium interfacial resistance" refers to the interfacial resistance of a material towards the incorporation of $Li^+$ ions. A lithium interfacial ASR (AS-$R_{interface}$) is calculated from the interfacial resistance ($R_{interface}$) via $ASR_{interface}=R_{interface}*A/2$ where A is the area of the electrodes in contact with the separator and the factor of 2 accounts for 2 interfaces, assuming the cell is symmetric.

As used herein, the phrase "positive electrode" refers to the electrode in a secondary battery towards which positive ions, e.g., $Li^+$, conduct during discharge of the battery. As used herein, the phrase "negative electrode" refers to the electrode in a secondary battery from where positive ions, e.g., $Li^+$, conduct during discharge of the battery. In a battery comprised of a Li-metal electrode and a conversion chemistry electrode (i.e., active material; e.g., $NiF_x$), the electrode having the conversion chemistry materials is referred to as the positive electrode. In some common usages, cathode is used in place of positive electrode, and anode is used in place of negative electrode. When a Li-secondary battery is charged, Li ions conduct from the positive electrode (e.g., $NiF_x$) towards the negative electrode (Li-metal). When a Li-secondary battery is discharged, Li ions conduct towards the positive electrode (e.g., $NiF_x$; i.e., cathode) and from the negative electrode (e.g., Li-metal; i.e., anode).

As used herein, the terms "separator" refers to a solid electrolyte which conducts $Li^+$ ions, is substantially insulating to electrons, and is suitable for use as a physical barrier or spacer between the positive and negative electrodes in an electrochemical cell or a rechargeable battery. A separator, as used herein, is substantially insulating to electrons when the separator's lithium ion conductivity is at least $10^3$ times, and typically $10^6$ times, greater than the separator's electron conductivity. Unless explicitly specified to the contrary, a separator as used herein is stable when in contact with lithium metal.

As used herein, the phrase "$Li^+$ ion-conducting separator" refers to an electrolyte which conducts $Li^+$ ions, is substantially insulating to electrons (e.g., the lithium ion conductivity is at least $10^3$ times, and often $10^6$ times, greater than the electron conductivity), and which acts as a physical barrier or spacer between the positive and negative electrodes in an electrochemical cell.

As used herein, the phrases "solid separator," "solid electrolyte," "solid-state separator," and "solid-state electrolyte" refer to Li+ ion-conducting separators that are solids at room temperature and include at least 50 vol % ceramic material.

As used herein, the term "surface" refers to a material, or portion of a material, that is near or at an interface between two different phases, chemicals, or states of matter. A surface is the area of contact between two different phases or states of matter (e.g., solid-gas, liquid-gas, or solid-liquid). For example, the interface of two solids which are in direct contact with each other is a surface. For example, a thin film garnet separator when exposed to air has a surface described by the periphery or outside portion of the separator which contacts the air. For rectangular-shaped separators, there is a top and a bottom surface which both individually have higher total geometric surface areas than each of the four side surfaces individually. In this rectangular-shaped separator example, there are four side surfaces which each have geometric surface areas less than either of the top and bottom surfaces. For a disc-shaped separator, there is a top and a bottom surface which both individually have higher geometric surface areas than the circumference-side of the disc-shaped separator. Geometric surface area is calculated for a square or rectangular shaped-surface by multiplying length of the surface by the width of the surface. Geometric surface area is calculated for disc-shaped surface by multiplying $\pi$ by the squared radius of the disc, i.e., $\pi r^2$ wherein r is the radius of the disc surface. Geometric surface area is calculated for the side of a disc by multiplying the disc circumference by the width of the side of the disc. When used as an electrolyte in an electrochemical cell, either the top or bottom surface is the surface of the separator which directly contacts the negative electrode (e.g., Li metal), the positive electrode (i.e. cathode or catholyte in the cathode), and/or a layer or adhesive bonding agent disposed between the separator and the positive electrode. A surface is defined by an area that has larger, or more extended, x- and y-axis physical dimensions than it does z-axis physical dimensions, wherein the z-axis dimension is perpendicular to the surface. The depth, roughness or thickness of a surface can be of a molecular order (0.1 to 10 nanometers) of magnitude or up to 1, 2, 3, 4, or 5 µm.

As used herein, the term "top and bottom surfaces" refer to the two surfaces that have the largest total geometric surface area for a material having more than two surfaces. For example, a rectangle has six surfaces—four side surfaces and one top and one bottom surface. In such a rectangle, there is one top and one bottom surface which are parallel to each other. In a rectangle, there are four side surfaces which are perpendicular to both the top and bottom surfaces. In a rectangle, the top and bottom surfaces individually have a larger total geometric surface area than the total geometric surface area of each of the four side surfaces individually.

As used herein, the phrase "fluorinated" refers to the presence of a chemical species that includes fluorine or fluoride.

As used herein, the phrase "fluorinated surface" refers to a surface to which fluoride is bonded or incorporated as determined by XPS or NMR. Unless specified explicitly otherwise, the fluorinated surface feature is determined by XPS.

As used herein, the phrase "oxyfluorinated" refers to the presence of a chemical species that includes oxygen and fluorine or oxygen and fluoride.

As used herein, the phrase "oxyfluorinated surface" refers to a surface to which oxygen and fluorine is bonded or incorporated as determined by XPS or NMR. Unless specified explicitly otherwise, the oxyfluorinated surface feature is determined by XPS.

As used herein, the phrase "substantially free of" refers to the presences of a chemical species below the XPS detectable limit. For example, a lithium-stuffed garnet that is substantially free of $Li_2CO_3$ on its surface has $Li_2CO_3$ on the surface in an amount less than 1 atomic % measured by XPS. As used herein, the phrase "trace amounts of contaminants," refers to the presences of a chemical species below the XPS detectable limit.

As used herein, the phrase "dinitrile" or "dinitrile solvent" refers to a linear hydrocarbon chain where both ends of the chain are terminated with a cyano (i.e., —C≡N) group. Example dinitrile solvents are characterized by Formula (I):

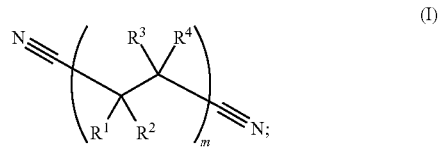

wherein:
$R^1$, $R^2$, $R^3$, and $R^4$ are, independently in each instance, selected from —CN, —NO$_2$, —CO$_2$, —SO$_4$, —H, —SO$_3$, —SO$_2$, —CH$_2$—SO$_3$, —CHF—SO$_3$, —CF$_2$—SO$_3$, —F, —Cl, —Br, and —I; and wherein subscript m is an integer from 1 to 1000.

Some exemplary nitrile and dinitrile solvents include, but are not limited to, adiponitrile (hexanedinitrile), acetonitrile, benzonitrile, butanedinitrile (succinonitrile), butyronitrile, decanenitrile, ethoxyacetonitrile, fluoroacetonitrile, glutaronitrile, hexanenitrile, heptanenitrile, heptanedinitrile, iso-butyronitrile, malononitrile (propanedinitrile), malonodinitrile, methoxyacetonitrile, nitroacetonitrile, nonanenitrile, nonanedinitrile, octanedinitrile (suberodinitrile), octanenitrile, propanenitrile, pentanenitrile, pentanedinitrile, sebaconitrile (decanedinitrile), succinonitrile, and combinations thereof. In some examples, the combinations are miscible combinations.

As used herein, the phrase "organic sulfur-including solvent" refers to a solvent selected from ethyl methyl sulfone, dimethyl sulfone, sulfolane, allyl methyl sulfone, butadiene sulfone, butyl sulfone, methyl methanesulfonate, and dimethyl sulfate.

As used herein, the phrase "bonding layer" refers to an ionically conductive layer between two other layers, e.g., between the cathode and the solid separator. Exemplary bonding layers include the gel electrolytes, and related separator bonding agents, set forth in US Patent Application Publication No. 2017-0331092, which published Nov. 16, 2017, the entire contents of which are herein incorporated by reference in its entirety for all purposes.

As used herein, the term "HOMO" or "Highest Occupied Molecular Orbital" refers to the energy of the electron occupying the highest occupied molecular orbital, as referenced to the vacuum energy. As used herein, the term "LUMO" refers to "Lowest Unoccupied Molecular Orbital." HOMO and LUMO energy levels are calculated by DFT calculations referenced to the vacuum level. Unless otherwise specified, the DFT calculations use a B3LYP functional for exchange and correlation and a 6-311++g** basis set.

As used herein, the phrase "stability window" refers to the voltage range within which a material exhibits no reaction which materially or significantly degrades the material's function in an electrochemical cell. It may be measured in an electrochemical cell by measuring cell resistance and Coulombic efficiency during charge/discharge cycling. For voltages within the stability window (i.e. the working electrode vs reference electrode within the stability window), the increase of cell resistance is low. For example, this resistance increase may be less than 1% per 100 cycles. For example, the material is stable at 4V v. Li. For another example, the material is stable at 4V or greater v. Li. For another example, the material is stable at 4V, 4.1V, 4.2V, 4.3V, 4.4V, 4.5V, 4.6V, 4.7V, 4.8V, 4.9V. 5V, 5.1V, or 5.2V v. Li. For example, the material is stable at 5.2V or greater v. Li.

As used herein, the term "a high voltage-stable catholyte" refers to a catholyte which does not react at high voltage (4.2 V or higher versus Li metal) in a way that materially or significantly degrades the ionic conductivity of the catholyte when held at high voltage at room temperature for one week. Herein, a material or significant degradation in ionic conductivity is a reduction in ionic conductivity by an order of magnitude or more. For example, if the catholyte has an ionic conductivity of 10E-3 S/cm, and when charged to 4.2V or higher the catholyte has an ionic conductivity of 10E-4 S/cm, then the catholyte is not stable at 4.2V or higher since its ionic conductivity materially and significantly degraded at that voltage." As used herein, high voltage means 4V or larger versus a lithium metal (i.e., v. Li) reference electrode (which is at 0V). High voltage may also refer to higher voltage, e.g., 4.2, 4.3, 4.4, 4.5, 4.6, 4.7, 4.8. 4.9, 5.0 V or higher.

As used herein, "stable at 4V or greater v. Li" refers to a material that does not react at high voltage 4V or greater with respect to a lithium metal anode in a way that materially or significantly degrades the ionic conductivity. As used herein, "stable at 4V, 4.1V, 4.2V, 4.3V, 4.4V, 4.5V, 4.6V, 4.7V, 4.8V, 4.9V, 5.0V, 5.1V, or 5.2V v. Li," refers to a material that does not react at the recited voltage with respect to a lithium metal anode in a way that materially or significantly degrades the ionic conductivity.

As used herein, the term "chemically compatible" means that two or more materials or chemicals are chemically compatible with each other if the materials can be physically exposed to each other and the materials do not react in a way which materially or significantly degrades the electrochemical performance. Herein, electrochemical performance refers to either ionic conductivity or area-specific resistance (ASR). A material or significant degradation in ionic conductivity is a degradation by an order of magnitude or more. A material or significant degradation in ASR is a degradation by a factor of 2 or more when held at room temperature for one week.

As used herein, the term "LiBETI" refers to lithium bis(perfluoroethanesulfonyl)imide.

As used herein, the term "LiTFSI" refers to lithium bis(trifluoromethane)sulfonimide.

As used herein, the term "LiFSI" refers lithium bis (fluorosulfonyl)imide.

As used herein, the term "LIBOB" refers to lithium bis(oxalato)borate.

As used herein, the term "XPS" refers to X-ray photoelectron spectroscopy which is a surface-sensitive quantitative spectroscopic technique that measures the elemental composition at the parts per thousand range, empirical formula, chemical state and electronic state of the elements that exist within a material.

As used herein, the term "LLZO" refers to a lithium-lanthanum-zirconium-oxygen-containing compound. If the compound is crystallized into the garnet crystal structure, then the LLZO is a lithium-stuffed garnet, as defined above.

As used herein, the term "GITT" refers to the Galvanostatic Intermittent Titration Technique.

As used herein, the term "EIS" refers to Electrochemical Impedance Spectroscopy.

As used herein, the term "ECS" refers to a mixture of ethylene carbonate and sulfolane. Herein, sulfolane refers to tetrahydrothiophene 1,1-dioxide, having the cyclic sulfone structure shown below:

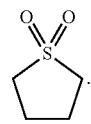

As used herein, "EDS" refers to energy dispersive spectroscopy.

As used herein, the term "SCN" refers to succinonitrile.

As used herein, the term "lithium salt" refers to a lithium-containing compound that is a solid at room temperature that at least partially dissociates when immersed in a solvent such as EMC. Lithium salts may include but are not limited to $LiPF_6$, LiBOB, LiTFSi, LiFSI, $LiAsF_6$, $LiClO_4$, LiI, LiBETI, or $LiBF_4$.

As used herein, the term "carbonate solvent" refers to a class of solvents containing a carbonate group $C(=O)(O^-)$. Carbonate solvents include but are not limited to ethylene carbonate, dimethyl carbonate, propylene carbonate, diethyl carbonate, ethyl methyl carbonate, dimethyl ethylene carbonate, isobutylene carbonate, nitroethyl carbonate, Monofluoroethylene carbonate, fluoromethyl ethylene carbonate, 1,2-butylene carbonate, methyl propyl carbonate, isopropyl methyl carbonate, etc.

As used herein, area-specific resistance (ASR) is measured by electrochemical cycling using Arbin or Biologic unless otherwise specified to the contrary.

As used herein, ionic conductivity is measured by electrical impedance spectroscopy methods.

As used herein, a "strong Lewis Acid," refers to a Lewis acid that is able to competitively bind with F, OH, HF, $PF_6$, and/or $H_2O$, or their anions, e.g., $H^+$, better than $H^+$. Lewis acids are known in the art as chemical species which can accept electrons from a donor compound or species. A typical Lewis acid is the cation $H^+$. Example strong Lewis acids include, but are not limited to, lithium bis(perfluoroethanesulfonyl)imide (LIBETI), bis(trifluoromethane)sulfonimide (LiTFSI), $LiBF_4$, $LiPF_6$, $LiAsF_6$, and lithium bis (fluorosulfonyl)imide (LiFSI).

III. Electrochemical Cells

In one embodiment, set forth herein is a electrochemical cell that includes a positive electrode, an negative electrode, and a solid-state electrolyte therebetween. The positive electrode includes a catholyte, which includes a lithium salt; a first solvent selected from the group consisting of sulfolane, 1,3-propane sultone, sulfolene, thiophene, and combinations thereof; a second solvent; and a strong Lewis acid additive. The solid-state electrolyte includes lithium-stuffed garnet; and the negative electrode includes lithium metal.

In some examples, including any of the foregoing, the a first solvent selected from sulfolane. In some examples, including any of the foregoing, the a first solvent selected from 1,3-propane sultone. In some examples, including any of the foregoing, the a first solvent selected from sulfolene. In some examples, including any of the foregoing, the a first solvent selected from thiophene.

In some examples, including any of the foregoing, the solid-state electrolyte is a thin film.

In some examples, including any of the foregoing, the solid-state electrolyte is a sintered lithium-stuffed garnet thin film.

In some examples, including any of the foregoing, the lithium salt is selected from the group consisting of $LiPF_6$, lithium bis(perfluoroethanesulfonyl)imide (LIBETI), bis(trifluoromethane)sulfonimide lithium salt (LiTFSI), $LiBF_4$, $LiAsF_6$, lithium bis(fluorosulfonyl)imide (LiFSI), and combinations thereof.

In some examples, including any of the foregoing, the lithium salt is selected from $LiPF_6$. In some examples, including any of the foregoing, the lithium salt is selected from lithium bis(perfluoroethanesulfonyl)imide (LIBETI). In some examples, including any of the foregoing, the lithium salt is selected from bis(trifluoromethane)sulfonimide (LiTFSI). In some examples, including any of the foregoing, the lithium salt is selected from $LiBF_4$. In some examples, including any of the foregoing, the lithium salt is selected from $LiAsF_6$. In some examples, including any of the foregoing, the lithium salt is selected from lithium bis(fluorosulfonyl)imide (LiFSI).

In some examples, including any of the foregoing, the lithium salt is present at a concentration of 0.5 M to 2.0 M.

In some examples, including any of the foregoing, the lithium salt is present at a concentration of 0.5 M to 1.5 M.

In some examples, including any of the foregoing, the lithium salt is present at a concentration of 1.0M to 1.4 M.

In some examples, including any of the foregoing, the lithium salt is present at a concentration of 0.5 M, 0.55 M, 0.6 M, 0.65 M, 0.7 M, 0.75 M, 0.8 M, 0.85 M, 0.9 M, 0.95 M, or 1.5 M.

In some examples, including any of the foregoing, the lithium salt is present at a concentration of about 0.5 M, about 0.55 M, about 0.6 M, about 0.65 M, about 0.7 M, about 0.75 M, about 0.8 M, about 0.85 M, about 0.9 M, about 0.95 M, or about 1.5 M.

In some examples, including any of the foregoing, the concentration of lithium salt in the solution is about 0.5 M to about 1.5 M. In some examples, including any of the foregoing, the concentration is about 0.5 M, about 0.55 M, about 0.6 M, about 0.65 M, about 0.7 M, about 0.75 M, about 0.8 M, about 0.85 M, about 0.9 M, about 0.95 M, about 1.0 M, about 1.05, about 1.10, about 1.15, about 1.2, about 1.25, about 1.30, about 1.35, about 1.4, about 1.45, or about 1.5 M.

In some examples, including any of the foregoing, the concentration of lithium salt in the solution is about 0.5 M to about 1.5 M. In some examples, including any of the foregoing, the concentration is 0.5 M, 0.55 M, 0.6 M, 0.65 M, 0.7 M, 0.75 M, 0.8 M, 0.85 M, 0.9 M, 0.95 M, 1.0 M, 1.05, 1.10, 1.15, 1.2, 1.25, 1.30, 1.35, 1.4, 1.45, or 1.5 M. In some examples, including any of the foregoing, the concentration of lithium salt in the solution is 0.5 M. In some examples, including any of the foregoing, the concentration of lithium salt in the solution is 0.55 M. In some examples, including any of the foregoing, the concentration of lithium salt in the solution is 0.6 M. In some examples, including any of the foregoing, the concentration of lithium salt in the solution is 0.65 M. In some examples, including any of the foregoing, the concentration of lithium salt in the solution is 0.7 M. In some examples, including any of the foregoing, the concentration of lithium salt in the solution is 0.75 M. In some examples, including any of the foregoing, the concentration of lithium salt in the solution is 0.8 M. In some examples, including any of the foregoing, the concentration of lithium salt in the solution is 0.85 M. In some examples, including any of the foregoing, the concentration of lithium salt in the solution is 0.9 M. In some examples, including any of the foregoing, the concentration of lithium salt in the solution is 0.95 M. In some examples, including any of the foregoing, the concentration of lithium salt in the solution is 1.5 M. In some examples, including any of the foregoing, the concentration of lithium salt in the solution is about 0.5 M. In some examples, including any of the foregoing, the concentration of lithium salt in the solution is about 0.55 M. In some examples, including any of the foregoing, the concentration of lithium salt in the solution is about 0.6 M. In some examples, including any of the foregoing, the concentration of lithium salt in the solution is about 0.65 M. In some examples, including any of the foregoing, the concentration of lithium salt in the solution is about 0.7 M. In some examples, including any of the foregoing, the concentration of lithium salt in the solution is about 0.75 M. In some examples, including any of the foregoing, the concentration of lithium salt in the solution is about 0.8 M. In some examples, including any of the foregoing, the concentration of lithium salt in the solution is about 0.85 M. In some examples, including any of the foregoing, the concentration of lithium salt in the solution is about 0.9 M. In some examples, including any of the foregoing, the concentration of lithium salt in the solution is about 0.95 M. In some examples, including any of the foregoing, the concentration of lithium salt in the solution is about 1.5 M. In some examples, including any of the foregoing, the first solvent is sulfolane.

In some examples, including any of the foregoing, the lithium salt is present at a concentration of 0.5 M, 0.55 M, 0.6 M, 0.65 M, 0.7 M, 0.75 M, 0.8 M, 0.85 M, 0.9 M, 0.95 M, or 1.5 M.

In some examples, including any of the foregoing, the concentration of lithium salt in the solution is 0.5 M to 1.5 M. In some examples, including any of the foregoing, the concentration is 0.5 M, 0.55 M, 0.6 M, 0.65 M, 0.7 M, 0.75 M, 0.8 M, 0.85 M, 0.9 M, 0.95 M, 1.0 M, 1.05, 1.10, 1.15, 1.2, 1.25, 1.30, 1.35, 1.4, 1.45, or 1.5 M.

In some examples, including any of the foregoing, the concentration of lithium salt in the solution is 0.5 M to 1.5 M. In some examples, including any of the foregoing, the concentration is 0.5 M, 0.55 M, 0.6 M, 0.65 M, 0.7 M, 0.75 M, 0.8 M, 0.85 M, 0.9 M, 0.95 M, 1.0 M, 1.05, 1.10, 1.15, 1.2, 1.25, 1.30, 1.35, 1.4, 1.45, or 1.5 M. In some examples, including any of the foregoing, the concentration of lithium salt in the solution is 0.5 M. In some examples, including any of the foregoing, the concentration of lithium salt in the solution is 0.55 M. In some examples, including any of the foregoing, the concentration of lithium salt in the solution is 0.6 M. In some examples, including any of the foregoing, the concentration of lithium salt in the solution is 0.65 M. In some examples, including any of the foregoing, the concentration of lithium salt in the solution is 0.7 M. In some examples, including any of the foregoing, the concentration of lithium salt in the solution is 0.75 M. In some examples, including any of the foregoing, the concentration of lithium salt in the solution is 0.8 M. In some examples, including any of the foregoing, the concentration of lithium salt in the solution is 0.85 M. In some examples, including any of the foregoing, the concentration of lithium salt in the solution is 0.9 M. In some examples, including any of the foregoing, the concentration of lithium salt in the solution is 0.95 M. In some examples, including any of the foregoing, the concentration of lithium salt in the solution is 1.5 M. In some examples, including any of the foregoing, the concentration of lithium salt in the solution is 0.5 M. In some examples, including any of the foregoing, the concentration of lithium salt in the solution is 0.55 M. In some examples, including any of the foregoing, the concentration of lithium salt in the solution is 0.6 M. In some examples, including any of the foregoing, the concentration of lithium salt in the solution is 0.65 M. In some examples, including any of the foregoing, the concentration of lithium salt in the solution is 0.7 M. In some examples, including any of the foregoing, the concentration of lithium salt in the solution is 0.75 M. In some examples, including any of the foregoing, the concentration of lithium salt in the solution is 0.8 M. In some examples, including any of the foregoing, the concentration of lithium salt in the solution is 0.85 M. In some examples, including any of the foregoing, the concentration of lithium salt in the solution is 0.9 M. In some examples, including any of the foregoing, the concentration of lithium salt in the solution is 0.95 M. In some examples, including any of the foregoing, the concentration of lithium salt in the solution is 1.5 M. In some examples, including any of the foregoing, the first solvent is sulfolane.

In some examples, including any of the foregoing, the second solvent is selected from dimethyl carbonate (DMC), ethyl-methyl carbonate (EMC), propylmethyl carbonate, nitroethyl carbonate, propylene carbonate (PC), diethyl carbonate (DEC), methyl propyl carbonate (MPC), 2,5-dioxahexanedioic acid dimethyl ester, tetrahydrofuran (THF), γ-butyrolactone (GBL), gamma butyl-lactone, fluoroethylene carbonate (FEC), fluoromethyl ethylene carbonate (FMEC), trifluoroethyl methyl carbonate (F-EMC), fluorinated 3-(1,1,2,2-tetrafluoroethoxy)-1,1,2,2-tetrafluoropropane/1,1,2,2-tetrafluoro-3-(1,1,2,2-tetrafluoroethoxy)propane (F-EPE), fluorinated cyclic carbonate (F-AEC), dioxolane, prop-1-ene-1,3-sultone (PES), sulfolane, acetonitrile (ACN), succinonitrile (SCN), pimelonitrile, suberonitrile, propionitrile, propanedinitrile, glutaronitrile (GLN), adiponitrile (ADN), hexanedinitrile, pentanedinitrile, acetophenone, isophorone, benzonitrile, ethyl propionate, methyl propionate, methylene methanedisulfonate, dimethyl sulfate, dimethyl sulfoxide (DMSO), ethyl acetate, methyl butyrate, dimethyl ether (DME), diethyl ether, dioxolane, methyl benzoate, 2-methyl-5-oxooxolane-2-carbonitrile, and combinations thereof. In some examples, the combinations are miscible combinations.

In some examples, including any of the foregoing, the second solvent is selected from ethylene carbonate, dimethyl carbonate (DMC), ethyl-methyl carbonate (EMC), propylene carbonate (PC), diethyl carbonate (DEC), fluoroethylene carbonate (FEC), prop-1-ene-1,3-sultone (PES), sulfolane, acetonitrile (ACN), succinonitrile (SCN), glutaronitrile (GLN), adiponitrile (ADN), and combinations thereof. In some examples, the combinations of solvents are those combinations which are miscible.

In some examples, including any of the foregoing, the second solvent is selected from ethylene carbonate.

In some examples, including any of the foregoing, the catholyte has a viscosity of less than 15 mPa·s at 20° C.

In some examples, including any of the foregoing, the catholyte has a water content less than 200 ppm, or less than 150 ppm, or less than 100 ppm, or less than 60 ppm, or less than 50 ppm, or less than 40 ppm, or less than 30 ppm, or less than 20 ppm, or less than 10 ppm.

In some examples, including any of the foregoing, the electrochemical cell further includes a third solvent selected from a linear sulfone.

In some examples, including any of the foregoing, the linear sulfone is present at 0 vol % to 15 vol %.

In some examples, including any of the foregoing, the linear sulfone is present at 5 vol % to 10 vol %.

In some examples, including any of the foregoing, the linear sulfone is selected from the group consisting of ethyl methyl sulfone, dimethyl sulfone, dibutyl sulfone, allyl methyl sulfone, ethyl sulfone, dipropyl sulfone, ethyl phenyl sulfone, diethyl sulfate, dimethyl sulfate, and combinations thereof. In some examples, the combinations of solvents are those combinations which are miscible.

In some examples, including any of the foregoing, the linear sulfone is selected from the group consist of dibutylsulfone, dipropylsulfone, and combinations thereof.

In some examples, including any of the foregoing, the catholyte is a eutectic mixture of solvents.

In some examples, including any of the foregoing, the eutectic mixture melts at less than 30° C.

In some examples, including any of the foregoing, sulfolane is the solvent present in the catholyte in the largest volume percent.

In some examples, including any of the foregoing, the ratio of the second solvent to the first solvent is from 30:70 vol/vol (v/v) to 50:50 v/v.

In some examples, including any of the foregoing, the ratio of the second solvent to the first solvent is either 50:50 v/v or 45:55 v/v.

In some examples, including any of the foregoing, the ratio of the second solvent to the first solvent is either about 50:50 v/v or about 45:55 v/v.

In some examples, including any of the foregoing, the first solvent is sulfolane, wherein, the second solvent is EC, and wherein the ratio of EC:sulfolane is from 30:70 v/v to 50:50 v/v.

In some examples, the ratio of EC:sulfolane, is 45:55 vol %. In some examples, the ratio—EC:sulfolane—may range from 3:7 to 5:5 v/v, but can be 45:55 vol %.

In some examples, including any of the foregoing, the first solvent is sulfolane, wherein, the second solvent is EC, and wherein the ratio of EC:sulfolane is either 50:50 or 45:55 v/v.

In some examples, including any of the foregoing, the strong Lewis acid additive competitively binds with F, OH, HF, $PF_6$, and/or $H_2O$. In some examples, including any of the foregoing, the strong Lewis acid additive competitively binds with F, OH, HF, $PF_6$, and/or $H_2O$ stronger than it binds to $LiPF_6$.

In some examples, including any of the foregoing, the strong Lewis acid additive competitively binds with F, OH, HF, $PF_6$ and $H_2O$. In some examples, including any of the foregoing, the strong Lewis acid additive competitively binds with F, OH, HF, $PF_6$, and $H_2O$ stronger than it binds to $LiPF_6$.

In some examples, including any of the foregoing, the strong Lewis acid additive competitively binds with an anion decomposition product of $PF_6$. In some examples, including any of the foregoing, the strong Lewis acid additive competitively binds with F, OH, HF, $PF_6$, and/or $H_2O$ stronger than it binds to $LiPF_6$.

In some examples, including any of the foregoing, the strong Lewis acid additive competitively binds with the surface of lithium-stuffed garnet.

In some examples, including any of the foregoing, the strong Lewis Acid binds to the surface of lithium-stuffed garnet stronger than it binds to a lithium salt selected from the group consisting of lithium bis(perfluoroethanesulfonyl) imide (LIBETI), bis(trifluoromethane)sulfonimide lithium salt (LiTFSI), LiBF$_4$, LiPF$_6$, LiAsF$_6$, and lithium bis(fluorosulfonyl)imide (LiFSI).

In some examples, including any of the foregoing, the strong Lewis acid additive is a F− getter from HF. A F− getter refers to a species which sequesters, or reacts with or bonds with, F− in the presence of HF. A getter may also be referred to as a scavenger. For example, a F− getter refers to a species which scavenges F− in the presence of HF. Example F− getters are disclosed in HAN et al., "Distinct Reaction Characteristics of Electrolyte Additives for High-Voltage Lithium-Ion Batteries: Tris(trimethylsilyl) Phosphite, Borate, and Phosphate," Electrochimica Acta 215 (2016) 455-465 and QI et al., "Lifetime limit of tris(trimethylsilyl) phosphite as electrolyte additive for high voltage lithium ion batteries," *RSC Adv.*, 2016, 6, 38342-38349, 10.1039/C6RA06555D. This exemplified F− getters in these publications are not exhaustive of all possible F− getters.

In some examples, including any of the foregoing, the strong Lewis acid additive is an OH− getter from H$_2$O. A OH− getter refers to a species which sequesters, or reacts with or bonds with, OH− in the presence of H$_2$O. A getter may also be referred to as a scavenger. For example, a OH− getter refers to a species which scavenges OH− in the presence of H$_2$O. Example OH− getters are disclosed in HAN et al., "Distinct Reaction Characteristics of Electrolyte Additives for High-Voltage Lithium-Ion Batteries: Tris(trimethylsilyl) Phosphite, Borate, and Phosphate," Electrochimica Acta 215 (2016) 455-465 and QI et al., "Lifetime limit of tris(trimethylsilyl) phosphite as electrolyte additive for high voltage lithium ion batteries," *RSC Adv.*, 2016, 6, 38342-38349, 10.1039/C6RA06555D. This exemplified OH− getters in these publications are not exhaustive of all possible OH− getters.

In some examples, including any of the foregoing, the strong Lewis acid additive is a trivalent phosphite, phosphate, or borate compound.

In some examples, including any of the foregoing, the strong Lewis acid additive is selected from the group consisting of tris(trimethysilyl) phosphite (TTSPi), tris(trimethysilyl) phosphate (TTSP), trimethoxyboroxine (C$_3$H$_9$B$_3$O$_6$, TMOBX), vinylene carbonate (VC), vinyl ethylene carbonate (VEC), methylene methane disulfonate (MMDS), prop-1-ene-1,3 sultone (PES), fluoroethylene carbonate (FEC), LiTFSi, LiBOB, 1,3-propane sultone (PS), succinonitrile, methylene methanedisulfonate (MMDS), trimethylene sulfate (TMS), triallyl phosphate (TAP), tris (trimethylsilyl) borate, (TMSB) or tris(pentafluorophenyl) borane (TPFPB), and combinations thereof. In some examples, the combinations of solvents are those combinations which are miscible.

In some examples, including any of the foregoing, the strong Lewis acid additive is TTSPi and/or TTSP.

In some examples, including any of the foregoing, the strong Lewis acid additive is selected from the group consisting TTSPi and TTSP.

In some examples, including any of the foregoing, the strong Lewis acid additive is a combination of TMOBX and vinylene carbonate.

In some examples, including any of the foregoing, the strong Lewis acid additive is VC.

In some examples, including any of the foregoing, the strong Lewis acid additive is a combination of VC and MMDS.

In some examples, including any of the foregoing, the strong Lewis acid additive is a combination of VC and/or PES.

In some examples, including any of the foregoing, the strong Lewis acid additive is a combination of PES, MDS, and TTSP.

In some examples, including any of the foregoing, the strong Lewis acid additive includes 2 wt. % PES.

In some examples, including any of the foregoing, the strong Lewis acid additive includes 1 wt % MMDS and 1 wt % TTSPi.

In some examples, including any of the foregoing, the catholyte includes 1.4M LiPF$_6$, 45 v/v EC, 50 v/v sulfolane, and 5 v/v dibutylsulfone.

In some examples, including any of the foregoing, the strong Lewis acid is present at 0.2 wt % to 5 wt %, where the wt % is based on the total net mass of the salt plus solvent mixture.

In some examples, including any of the foregoing, the lithium-stuffed garnet is characterized by the chemical formula Li$_x$La$_3$Zr$_2$O$_2$+yAl$_2$O$_3$, wherein x is from 5.8 to 7.0, and y is 0.1, 0.2, 0.3, 0.4, 0.5, 0.6, 0.7, 0.8, 0.9, or 1.0.

In some examples, including any of the foregoing, the lithium-stuffed garnet is characterized by a formula selected from the group consisting of Li$_A$La$_B$M'$_C$M"$_D$Zr$_E$O$_F$, Li$_A$La$_B$M'$_C$M"$_D$Ta$_E$O$_F$, and Li$_A$La$_B$M'$_C$M"$_D$Nb$_E$O$_F$, wherein 4<A<8.5, 1.5<B<4, 0<C<2, 0≤D<2; 0<E<2, 10<F<14, and wherein M' and M" are each, independently, selected from the group consisting of Al, Mo, W, Nb, Ga, Sb, Ca, Ba, Sr, Ce, Hf, Rb, and Ta.

In some examples, including any of the foregoing, the lithium-stuffed garnet is characterized by the formula Li$_A$La$_B$M'$_C$M"$_D$Zr$_E$O$_F$, wherein 4<A<8.5, 1.5<B<4, 0≤C≤2, 0≤D≤3; 0≤E≤2, 10<F<14, and wherein M' and M" are each, independently, selected from the group consisting of Al, Mo, W, Nb, Ga, Sb, Ca, Ba, Sr, Ce, Hf, Rb, and Ta.

In some examples, including any of the foregoing, the lithium-stuffed garnet is characterized by a formula selected from the group consisting of Li$_a$La$_b$Zr$_c$Al$_d$Me"$_e$O$_f$ wherein 5<a<7.7; 2<b<4; 0<c<2.5; 0<d<2; 0≤e<2, 10<f<14, and wherein Me" is a metal selected from the group consisting of Nb, Ta, V, W, Mo, and Sb.

In some examples, including any of the foregoing, the lithium-stuffed garnet is characterized by a formula selected from the group consisting of Li$_a$La$_b$Zr$_c$Al$_d$O$_f$ wherein 5<a<7.7; 2<b<4; 0<c<2.5; 0<d<2; 10<f<14.

In some examples, including any of the foregoing, the lithium-stuffed garnet is characterized by a formula selected from the group consisting of Li$_x$La$_3$Zr$_2$O$_{12}$·0.35Al$_2$O$_3$ wherein 4<x<8.5.

In some examples, including any of the foregoing, the lithium-stuffed garnet is characterized by a formula selected from the group consisting of Li$_x$La$_3$Zr$_2$O$_{12}$·0.5Al$_2$O$_3$ wherein 4<x<8.5.

In some examples, including any of the foregoing, the lithium-stuffed garnet is characterized by a formula selected from the group consisting of Li$_x$La$_3$Zr$_2$O$_{12}$·0.65Al$_2$O$_3$ wherein 4<x<8.5.

In some examples, including any of the foregoing, the lithium-stuffed garnet is characterized by a formula selected from the group consisting of Li$_x$La$_3$Zr$_2$O$_{12}$·Al$_2$O$_3$ wherein 4<x<8.5.

In some examples, including any of the foregoing, the electrochemical cell includes a catholyte selected from any one of the following: (a) a solution of 45 vol % ethylene carbonate and 55 vol % sulfolane, and 1.0 M LiPF$_6$; (b) 45 vol % ethylene carbonate and 55 vol % sulfolane, and 1.4 M LiPF$_6$; (c) 45 vol % ethylene carbonate and 55 vol % sulfolane, and 1.5 M LiPF$_6$; (d) ethylene carbonate:sulfolane, and 1.0 M LiPF$_6$; wherein the ratio of ethylene carbonate:sulfolane ranges from 3:7 to 5:5 vol/vol; (e) 45 vol % ethylene carbonate and 55 vol % sulfolane, and 1.4 M LiPF$_6$; (f) ethylene carbonate:sulfolane, and 1.5 M LiPF$_6$; wherein the ratio of ethylene carbonate:sulfolane ranges from 3:7 to 5:5 vol/vol; 45 vol % ethylene carbonate and 55 vol % sulfolane, and 1.5 M LiPF$_6$; (g) 5 vol % dibutyl or dipropyl sulfone; 45 vol % EC; 50 vol % sulfolane; 1.0 M LiPF$_6$ and 2 wt % TTSPi; (h) 5 vol % dibutyl or dipropyl sulfone; 45 vol % EC; 50 vol % sulfolane; 1.4M LiPF$_6$ and 2 wt % TTSPi; (i) 5 vol % dibutyl or dipropyl sulfone; 45 vol % EC; 50 vol % sulfolane; 1.5 M LiPF$_6$ and 2 wt % TTSPi; (j) 45 vol % ethylene carbonate and 55 vol % sulfolane, and 1 M LiPF$_6$ and 0.3 weight percent (wt %) tris(trimethysilyl) phosphite (TTSPi); (k) 5 volume percent (vol %) dipropyl sulfone with 45 vol % ethylene carbonate and 50 vol % sulfolane, and 1 M LiPF$_6$ and 0.3 weight percent (wt %) TTSPi; (l) 45 vol % ethylene carbonate and 55 vol % sulfolane, and 1M LiPF$_6$ and 2 weight percent (wt %) tris(trimethysilyl) phosphite (TTSPi); (m) 5 volume percent (vol %) dipropyl sulfone with 45 vol % ethylene carbonate and 50 vol % sulfolane, and 1 M LiPF$_6$ and 2 weight percent (wt %) TTSPi.

In some examples, including any of the foregoing, the electrochemical cell includes a catholyte selected from any one of the following: (a) a solution of 40-60 vol % ethylene carbonate and 40-60 vol % sulfolane, and 0.5 M-2.0 M LiPF$_6$; (b) 40-60 vol % ethylene carbonate and 40-60 vol % sulfolane, and 0.5-2.0 M LiPF$_6$; (c) 40-60 vol % ethylene carbonate and 40-60 vol % sulfolane, and 0.5-2.0 M LiPF$_6$; (d) ethylene carbonate:sulfolane, and 0.5-2.0 M LiPF$_6$; wherein the ratio of ethylene carbonate:sulfolane ranges from 3:7 to 5:5 vol/vol; (e) 40-60 vol % ethylene carbonate and 40-60 vol % sulfolane, and 0.5-2.0 M LiPF$_6$; (f) ethylene carbonate:sulfolane, and 0.5-2.0 M LiPF$_6$; wherein the ratio of ethylene carbonate:sulfolane ranges from 3:7 to 5:5 vol/vol; 40-60 vol % ethylene carbonate and 40-60 vol % sulfolane, and 0.5-2.0 M LiPF$_6$; (g) 3-8 vol % dibutyl or dipropyl sulfone; 40-60 vol % EC; 50 vol % sulfolane; 0.5-2.0 M LiPF$_6$ and 1-4 wt % TTSPi; (h) 3-7 vol % dibutyl or dipropyl sulfone; 40-60 vol % EC; 40-60 vol % sulfolane; 0.5-2.0M LiPF$_6$ and 1-4 wt % TTSPi; (i) 4-6 vol % dibutyl or dipropyl sulfone; 40-60 vol % EC; 40-60 vol % sulfolane; 0.5-2.0 M LiPF$_6$ and 1-3 wt % TTSPi; (j) 40-60 vol % ethylene carbonate and 40-60 vol % sulfolane, and 1 M LiPF$_6$ and 0.3 weight percent (wt %) tris(trimethysilyl) phosphite (TTSPi); (k) 4-6 volume percent (vol %) dipropyl sulfone with 40-60 vol % ethylene carbonate and 40-60 vol % sulfolane, and 0.5-2.0 M LiPF$_6$ and 0.1-0.6 weight percent (wt %) TTSPi; (l) 40-60 vol % ethylene carbonate and 40-60 vol % sulfolane, and 0.5-2.0 M LiPF$_6$ and 1-5 weight percent (wt %) tris(trimethysilyl) phosphite (TTSPi); (m) 4-6 volume percent (vol %) dipropyl sulfone with 40-60 vol % ethylene carbonate and 40-60 vol % sulfolane, and 0.5-2.0 M LiPF$_6$ and 1-3 weight percent (wt %) TTSPi.

In some examples, including any of the foregoing, the electrochemical cell includes a catholyte selected from any one of the following: (a) a solution of 45 vol % ethylene carbonate and 55 vol % sulfolane, and 1.0 M LiPF$_6$; (b) 45 vol % ethylene carbonate and 55 vol % sulfolane, and 1.4 M LiPF$_6$; (c) 45 vol % ethylene carbonate and 55 vol % sulfolane, and 1.5 M LiPF$_6$; (d) ethylene carbonate:sulfolane, and 1.0 M LiPF$_6$; wherein the ratio of ethylene carbonate:sulfolane ranges from 3:7 to 5:5 vol/vol; (e) 45 vol % ethylene carbonate and 55 vol % sulfolane, and 1.4 M LiPF$_6$; (f) ethylene carbonate:sulfolane, and 1.5 M LiPF$_6$; wherein the ratio of ethylene carbonate:sulfolane ranges from 3:7 to 5:5 vol/vol; 45 vol % ethylene carbonate and 55 vol % sulfolane, and 1.5 M LiPF$_6$; (g) 5 vol % dibutyl or dipropyl sulfone; 45 vol % EC; 50 vol % sulfolane; 1.0 M LiPF$_6$ and 2 wt % TTSPi; (h) 5 vol % dibutyl or dipropyl sulfone; 45 vol % EC; 50 vol % sulfolane; 1.4M LiPF$_6$ and 2 wt % TTSPi; (i) 5 vol % dibutyl or dipropyl sulfone; 45 vol % EC; 50 vol % sulfolane; 1.5 M LiPF$_6$ and 2 wt % TTSPi; (j) 45 vol % ethylene carbonate and 55 vol % sulfolane, and 1 M LiPF$_6$ and 0.3 weight percent (wt %) tris(trimethysilyl) phosphite (TTSPi); (k) 5 vol % dipropyl sulfone with 45 vol % ethylene carbonate and 50 vol % sulfolane, and 1 M LiPF$_6$ and 0.3 weight percent (wt %) TTSPi; (l) 45 vol % ethylene carbonate and 55 vol % sulfolane, and 1M LiPF$_6$ and 2 weight percent (wt %) tris(trimethysilyl) phosphite (TTSPi); (m) 5 volume percent (vol %) dipropyl sulfone with 45 vol % ethylene carbonate and 50 vol % sulfolane, and 1 M LiPF$_6$ and 2 weight percent (wt %) TTSPi.

In some examples, including any of the foregoing, the electrochemical cell includes a catholyte comprising a solution of 40-60 vol % ethylene carbonate and 40-60 vol % sulfolane, and 0.5 M-2.0 M LiPF$_6$.

In some examples, including any of the foregoing, the electrochemical cell includes a catholyte comprising a solution of 40-60 vol % ethylene carbonate and 40-60 vol % sulfolane, and 0.5-2.0 M LiPF$_6$.

In some examples, including any of the foregoing, the electrochemical cell includes a catholyte comprising a solution of 40-60 vol % ethylene carbonate and 40-60 vol % sulfolane, and 0.5-2.0 M LiPF$_6$.

In some examples, including any of the foregoing, the electrochemical cell includes a catholyte comprising a solution of ethylene carbonate:sulfolane, and 0.5-2.0 M LiPF$_6$; wherein the ratio of ethylene carbonate:sulfolane ranges from 3:7 to 5:5 vol/vol.

In some examples, including any of the foregoing, the electrochemical cell includes a catholyte comprising a solution of 40-60 vol % ethylene carbonate and 40-60 vol % sulfolane, and 0.5-2.0 M LiPF$_6$.

In some examples, including any of the foregoing, the electrochemical cell includes a catholyte comprising a solution of ethylene carbonate:sulfolane, and 0.5-2.0 M LiPF$_6$; wherein the ratio of ethylene carbonate:sulfolane ranges from 3:7 to 5:5 vol/vol; 40-60 vol % ethylene carbonate and 40-60 vol % sulfolane, and 0.5-2.0 M LiPF$_6$.

In some examples, including any of the foregoing, the electrochemical cell includes a catholyte comprising a solution of 3-8 vol % dibutyl or dipropyl sulfone; 40-60 vol % EC; 50 vol % sulfolane; 0.5-2.0 M LiPF$_6$ and 1-4 wt % TTSPi.

In some examples, including any of the foregoing, the electrochemical cell includes a catholyte comprising a solution of 3-7 vol % dibutyl or dipropyl sulfone; 40-60 vol % EC; 40-60 vol % sulfolane; 0.5-2.0M LiPF$_6$ and 1-4 wt % TTSPi.

In some examples, including any of the foregoing, the electrochemical cell includes a catholyte comprising a solution of 4-6 vol % dibutyl or dipropyl sulfone; 40-60 vol % EC; 40-60 vol % sulfolane; 0.5-2.0 M LiPF$_6$ and 1-3 wt % TTSPi.

In some examples, including any of the foregoing, the electrochemical cell includes a catholyte comprising a solution of 40-60 vol % ethylene carbonate and 40-60 vol % sulfolane, and 1 M LiPF$_6$ and 0.3 weight percent (wt %) tris(trimethysilyl) phosphite (TTSPi).

In some examples, including any of the foregoing, the electrochemical cell includes a catholyte comprising a solution of 4-6 volume percent (vol %) dipropyl sulfone with 40-60 vol % ethylene carbonate and 40-60 vol % sulfolane, and 0.5-2.0 M $LiPF_6$ and 0.1-0.6 weight percent (wt %) TTSPi.

In some examples, including any of the foregoing, the electrochemical cell includes a catholyte comprising a solution of 40-60 vol % ethylene carbonate and 40-60 vol % sulfolane, and 0.5-2.0 M $LiPF_6$ and 1-5 weight percent (wt %) tris(trimethysilyl) phosphite (TTSPi).

In some examples, including any of the foregoing, the electrochemical cell includes a catholyte comprising a solution of 4-6 volume percent (vol %) dipropyl sulfone with 40-60 vol % ethylene carbonate and 40-60 vol % sulfolane, and 0.5-2.0 M $LiPF_6$ and 1-3 weight percent (wt %) TTSPi.

IV. Lithium-Stuffed Garnet Electrolyte Separators

In some examples, set forth herein is a lithium-stuffed garnet electrolyte with a surface layer of a strong Lewis acid.

In some examples, set forth herein is a lithium-stuffed garnet solid-state electrolyte having at least one surface passivated with a strong Lewis Acid.

In some examples, set forth herein is a lithium-stuffed garnet electrolyte with a surface layer substantially as shown in any one of FIGS. 7-17.

V. Process for Making Electrochemical Cells

A process for making an electrochemical cell, including: providing a positive electrode infiltrated with a catholyte, the catholyte including: a lithium salt; a first solvent selected from the group consisting of sulfolane, 1,3-propane sultone, sulfolene, thiophene, and combinations thereof; a second solvent; and a strong Lewis acid additive; providing a sintered lithium-stuffed garnet solid-state separator; and contacting the sintered lithium-stuffed garnet solid-state separator to the positive electrode.

In some examples, including any of the foregoing, the contacting is between one side of the sintered lithium-stuffed garnet thin film or pellet and one side of the positive electrode.

In some examples, including any of the foregoing, the process includes providing a negative electrode which includes lithium metal.

In some examples, including any of the foregoing, the solid-state electrolyte is a thin film.

In some examples, including any of the foregoing, the solid-state electrolyte is a sintered lithium-stuffed garnet thin film.

In some examples, including any of the foregoing, the lithium salt is selected from the group consisting of $LiPF_6$, lithium bis(perfluoroethanesulfonyl)imide (LIBETI), bis(trifluoromethane)sulfonimide lithium salt (LiTFSI), $LiBF_4$, $LiAsF_6$, lithium bis(fluorosulfonyl)imide (LiFSI), and combinations thereof.

In some examples, including any of the foregoing, the lithium salt is present at a concentration of 0.5 M to 2.0 M. In some examples, including any of the foregoing, the lithium salt is present at a concentration of 0.5 M to 1.5 M. In some examples, including any of the foregoing, the lithium salt is present at a concentration of 1.0 M to 1.4 M. In some examples, including any of the foregoing, the lithium salt is present at a concentration of 0.5 M, 0.55 M, 0.6 M, 0.65 M, 0.7 M, 0.75 M, 0.8 M, 0.85 M, 0.9 M, 0.95 M, or 1.5 M. In some examples, including any of the foregoing, the lithium salt is present at a concentration of 0.5 M to 2.0 M. In some examples, including any of the foregoing, the lithium salt is present at a concentration of 0.5 M to 1.5 M. In some examples, including any of the foregoing, the lithium salt is present at a concentration of 1.0M to 1.4 M. In some examples, including any of the foregoing, the lithium salt is present at a concentration of 0.5 M, 0.55 M, 0.6 M, 0.65 M, 0.7 M, 0.75 M, 0.8 M, 0.85 M, 0.9 M, 0.95 M, or 1.5 M.

In some examples, the lithium salt is selected from the group consisting of $LiPF_6$, lithium bis(perfluoroethanesulfonyl)imide (LIBETI), bis(trifluoromethane)sulfonimide lithium salt (LiTFSI), $LiBF_4$, $LiAsF_6$, lithium bis(fluorosulfonyl)imide (LiFSI), at a concentration of 0.5 M to 2.0 M.

In some examples, including any of the foregoing, the lithium salt is present at a concentration of about 0.5 M, about 0.55 M, about 0.6 M, about 0.65 M, about 0.7 M, about 0.75 M, about 0.8 M, about 0.85 M, about 0.9 M, about 0.95 M, or about 1.5 M.

In some examples, including any of the foregoing, the concentration of lithium salt in the solution is about 0.5 M to about 1.5 M. In some examples, including any of the foregoing, the concentration is about 0.5 M, about 0.55 M, about 0.6 M, about 0.65 M, about 0.7 M, about 0.75 M, about 0.8 M, about 0.85 M, about 0.9 M, about 0.95 M, about 1.0 M, about 1.05, about 1.10, about 1.15, about 1.2, about 1.25, about 1.30, about 1.35, about 1.4, about 1.45, or about 1.5 M. In some examples, including any of the foregoing, the concentration of lithium salt in the solution is about 0.5 M to about 1.5 M. In some examples, including any of the foregoing, the concentration is 0.5 M, 0.55 M, 0.6 M, 0.65 M, 0.7 M, 0.75 M, 0.8 M, 0.85 M, 0.9 M, 0.95 M, 1.0 M, 1.05, 1.10, 1.15, 1.2, 1.25, 1.30, 1.35, 1.4, 1.45, or 1.5 M.

In some examples, including any of the foregoing, the concentration of lithium salt in the solution is 0.5 M to 1.5 M. In some examples, including any of the foregoing, the concentration is 0.5 M, 0.55 M, 0.6 M, 0.65 M, 0.7 M, 0.75 M, 0.8 M, 0.85 M, 0.9 M, 0.95 M, 1.0 M, 1.05, 1.10, 1.15, 1.2, 1.25, 1.30, 1.35, 1.4, 1.45, or 1.5 M. In some examples, including any of the foregoing, the concentration of lithium salt in the solution is 0.5 M to 1.5 M. In some examples, including any of the foregoing, the concentration is 0.5 M, 0.55 M, 0.6 M, 0.65 M, 0.7 M, 0.75 M, 0.8 M, 0.85 M, 0.9 M, 0.95 M, 1.0 M, 1.05, 1.10, 1.15, 1.2, 1.25, 1.30, 1.35, 1.4, 1.45, or 1.5 M.

In some examples, including any of the foregoing, the concentration of lithium salt in the solution is 0.5 M. In some examples, including any of the foregoing, the concentration of lithium salt in the solution is 0.55 M. In some examples, including any of the foregoing, the concentration of lithium salt in the solution is 0.6 M. In some examples, including any of the foregoing, the concentration of lithium salt in the solution is 0.65 M. In some examples, including any of the foregoing, the concentration of lithium salt in the solution is 0.7 M. In some examples, including any of the foregoing, the concentration of lithium salt in the solution is 0.75 M. In some examples, including any of the foregoing, the concentration of lithium salt in the solution is 0.8 M. In some examples, including any of the foregoing, the concentration of lithium salt in the solution is 0.85 M. In some examples, including any of the foregoing, the concentration of lithium salt in the solution is 0.9 M. In some examples, including any of the foregoing, the concentration of lithium salt in the solution is 0.95 M. In some examples, including any of the foregoing, the concentration of lithium salt in the solution is 1.5 M. In some examples, including any of the foregoing, the concentration of lithium salt in the solution is about 0.5 M. In some examples, including any of the foregoing, the concentration of lithium salt in the solution is about 0.55 M. In some examples, including any of the foregoing, the concentration of lithium salt in the solution is about 0.6 M. In some examples, including any of the foregoing, the concentration of lithium salt in the solution is about 0.65 M. In some examples, including any of the foregoing, the concentration of lithium salt in the solution is about 0.7 M. In some examples, including any of the foregoing, the concentration of lithium salt in the solution is about 0.75 M. In some examples, including any of the foregoing, the concentration of lithium salt in the solution is about 0.8 M. In some examples, including any of the foregoing, the concentration of lithium salt in the solution is about 0.85 M. In some examples, including any of the foregoing, the concentration of lithium salt in the solution is about 0.9 M. In some examples, including any of the foregoing, the concentration of lithium salt in the solution is about 0.95 M. In some examples, including any of the foregoing, the concentration of lithium salt in the solution is about 1.5 M. In some examples, including any of the foregoing, the first solvent is sulfolane.

In some examples, including any of the foregoing, the concentration of lithium salt in the solution is 0.5 M. In some examples, including any of the foregoing, the concentration of lithium salt in the solution is 0.55 M. In some examples, including any of the foregoing, the concentration of lithium salt in the solution is 0.6 M. In some examples, including any of the foregoing, the concentration of lithium salt in the solution is 0.65 M. In some examples, including any of the foregoing, the concentration of lithium salt in the solution is 0.7 M. In some examples, including any of the foregoing, the concentration of lithium salt in the solution is 0.75 M. In some examples, including any of the foregoing, the concentration of lithium salt in the solution is 0.8 M. In some examples, including any of the foregoing, the concentration of lithium salt in the solution is 0.85 M. In some examples, including any of the foregoing, the concentration of lithium salt in the solution is 0.9 M. In some examples, including any of the foregoing, the concentration of lithium salt in the solution is 0.95 M. In some examples, including any of the foregoing, the concentration of lithium salt in the solution is 1.5 M. In some examples, including any of the foregoing, the concentration of lithium salt in the solution is 0.5 M. In some examples, including any of the foregoing, the concentration of lithium salt in the solution is 0.55 M. In some examples, including any of the foregoing, the concentration of lithium salt in the solution is 0.6 M. In some examples, including any of the foregoing, the concentration of lithium salt in the solution is 0.65 M. In some examples, including any of the foregoing, the concentration of lithium salt in the solution is 0.7 M. In some examples, including any of the foregoing, the concentration of lithium salt in the solution is 0.75 M. In some examples, including any of the foregoing, the concentration of lithium salt in the solution is 0.8 M. In some examples, including any of the foregoing, the concentration of lithium salt in the solution is 0.85 M. In some examples, including any of the foregoing, the concentration of lithium salt in the solution is 0.9 M. In some examples, including any of the foregoing, the concentration of lithium salt in the solution is 0.95 M. In some examples, including any of the foregoing, the concentration of lithium salt in the solution is 1.5 M. In some examples, including any of the foregoing, the first solvent is sulfolane.

In some examples, including any of the foregoing, the second solvent is selected from dimethyl carbonate (DMC), ethyl-methyl carbonate (EMC), propylmethyl carbonate, nitroethyl carbonate, propylene carbonate (PC), diethyl carbonate (DEC), methyl propyl carbonate (MPC), 2,5-dioxahexanedioic acid dimethyl ester, tetrahydrofuran (THF), γ-butyrolactone (GBL), gamma butyl-lactone, fluoroethylene carbonate (FEC), fluoromethyl ethylene carbonate (FMEC), trifluoroethyl methyl carbonate (F-EMC), fluorinated 3-(1,1,2,2-tetrafluoroethoxy)-1,1,2,2-tetrafluoropropane/1,1,2,2-tetrafluoro-3-(1,1,2,2-tetrafluoroethoxy)propane (F-EPE), fluorinated cyclic carbonate (F-AEC), dioxolane, prop-1-ene-1,3-sultone (PES), sulfolane, acetonitrile (ACN), succinonitrile (SCN), pimelonitrile, suberonitrile, propionitrile, propanedinitrile, glutaronitrile (GLN), adiponitrile (ADN), hexanedinitrile, pentanedinitrile, acetophenone, isophorone, benzonitrile, ethyl propionate, methyl propionate, methylene methanedisulfonate, dimethyl sulfate, dimethyl sulfoxide (DMSO), ethyl acetate, methyl butyrate, dimethyl ether (DME), diethyl ether, dioxolane, methyl benzoate, 2-methyl-5-oxooxolane-2-carbonitrile, and combinations thereof. In some examples, the combinations are those combinations which are miscible.

In some examples, including any of the foregoing, the second solvent is selected from dimethyl carbonate (DMC). In some examples, including any of the foregoing, the second solvent is selected from ethyl-methyl carbonate (EMC). In some examples, including any of the foregoing, the second solvent is selected from propylmethyl carbonate. In some examples, including any of the foregoing, the second solvent is selected from nitroethyl carbonate. In some examples, including any of the foregoing, the second solvent is selected from propylene carbonate (PC). In some examples, including any of the foregoing, the second solvent is selected from diethyl carbonate (DEC). In some examples, including any of the foregoing, the second solvent is selected from methyl propyl carbonate (MPC). In some examples, including any of the foregoing, the second solvent is selected from 2,5-dioxahexanedioic acid dimethyl ester, tetrahydrofuran (THF). In some examples, including any of the foregoing, the second solvent is selected from γ-butyrolactone (GBL). In some examples, including any of the foregoing, the second solvent is selected from gamma butyl-lactone. In some examples, including any of the foregoing, the second solvent is selected from fluoroethylene carbonate (FEC). In some examples, including any of the foregoing, the second solvent is selected from fluoromethyl ethylene carbonate (FMEC). In some examples, including any of the foregoing, the second solvent is selected from trifluoroethyl methyl carbonate (F-EMC). In some examples, including any of the foregoing, the second solvent is selected from fluorinated 3-(1,1,2,2-tetrafluoroethoxy)-1,1,2,2-tetrafluoropropane/1,1,2,2-tetrafluoro-3-(1,1,2,2-tetrafluoroethoxy)propane (F-EPE). In some examples, including any of the foregoing, the second solvent is selected from fluorinated cyclic carbonate (F-AEC). In some examples, including any of the foregoing, the second solvent is selected from dioxolane. In some examples, including any of the foregoing, the second solvent is selected from prop-1-ene-1,3-sultone (PES). In some examples, including any of the foregoing, the second solvent is selected from sulfolane. In some examples, including any of the foregoing, the second solvent is selected from acetonitrile (ACN). In some examples, including any of the foregoing, the second solvent is selected from succinonitrile (SCN). In some examples, including any of the foregoing, the second solvent is selected from pimelonitrile. In some examples, including any of the foregoing, the second solvent is selected from suberonitrile. In some examples, including any of the foregoing, the second solvent is selected from propionitrile. In some examples, including any of the foregoing, the second solvent is selected from propanedinitrile. In some examples, including any of the foregoing, the second solvent is selected from glutaronitrile (GLN). In some examples, including any of the foregoing, the second solvent is selected from adiponitrile (ADN). In some examples, including any of the foregoing, the second solvent is selected from hexanedinitrile. In some examples, including any of the foregoing, the second solvent is selected from pentanedinitrile. In some examples, including any of the foregoing, the second solvent is selected from acetophenone. In some examples, including any of the foregoing, the second solvent is selected from isophorone. In some examples, including any of the foregoing, the second solvent is selected from benzonitrile. In some examples, including any of the foregoing, the second solvent is selected from ethyl propionate. In some examples, including any of the foregoing, the second solvent is selected from methyl propionate. In some examples, including any of the foregoing, the second solvent is selected from methylene methanedisulfonate. In some examples, including any of the foregoing, the second solvent is selected from dimethyl sulfate. In some examples, including any of the foregoing, the second solvent is selected from dimethyl sulfoxide (DMSO). In some examples, including any of the foregoing, the second solvent is selected from ethyl acetate. In some examples, including any of the foregoing, the second solvent is selected from methyl butyrate. In some examples, including any of the foregoing, the second solvent is selected from dimethyl ether (DME). In some examples, including any of the foregoing, the second solvent is selected from diethyl ether. In some examples, including any of the foregoing, the second solvent is selected from dioxolane. In some examples, including any of the foregoing, the second solvent is selected from methyl benzoate. In some examples, including any of the foregoing, the second solvent is selected from 2-methyl-5-oxooxolane-2-carbonitrile. In some examples, the combinations are those combinations which are miscible.

In some examples, including any of the foregoing, the second solvent is selected from ethylene carbonate, dimethyl carbonate (DMC), ethyl-methyl carbonate (EMC), propylene carbonate (PC), diethyl carbonate (DEC), fluoroethylene carbonate (FEC), prop-1-ene-1,3-sultone (PES), sulfolane, acetonitrile (ACN), succinonitrile (SCN), glutaronitrile (GLN), adiponitrile (ADN), and combinations thereof.

In some examples, including any of the foregoing, the second solvent is selected from ethylene carbonate.

In some examples, including any of the foregoing, the catholyte has a viscosity of less than 15 mPa-s at 20° C.

In some examples, including any of the foregoing, the catholyte has a water content less than 200 ppm, or less than 150 ppm, or less than 100 ppm, or less than 60 ppm, or less than 50 ppm, or less than 40 ppm, or less than 30 ppm, or less than 20 ppm, or less than 10 ppm.

In some examples, including any of the foregoing, the process further includes a third solvent selected from a linear sulfone.

In some examples, including any of the foregoing, the linear sulfone is present at 0 vol % to 15 vol %.

In some examples, including any of the foregoing, the linear sulfone is present at 5 vol % to 10 vol %.

In some examples, including any of the foregoing, the linear sulfone is selected from the group consisting of ethyl methyl sulfone, dimethyl sulfone, dibutyl sulfone, allyl methyl sulfone, ethyl sulfone, dipropyl sulfone, ethyl phenyl sulfone, diethyl sulfate, dimethyl sulfate, and combinations thereof.

In some examples, including any of the foregoing, the linear sulfone is selected from the group consist of dibutylsulfone, dipropylsulfone, and combinations thereof.

In some examples, including any of the foregoing, the catholyte is a eutectic mixture of solvents.

In some examples, including any of the foregoing, the eutectic mixture melts at less than 30° C.

In some examples, including any of the foregoing, the sulfolane is the solvent present in the catholyte in the largest volume percent.

In some examples, including any of the foregoing, the ratio of the second solvent to the first solvent is from 30:70 v/v to 50:50 v/v.

In some examples, including any of the foregoing, the ratio of the second solvent to the first solvent is either 50:50 or 45:55 v/v.

In some examples, including any of the foregoing, the first solvent is sulfolane, wherein, the second solvent is EC, and wherein the ratio of EC:sulfolane is from 30:70 v/v to 50:50 v/v.

In some examples, including any of the foregoing, the first solvent is sulfolane, wherein, the second solvent is EC, and wherein the ratio of EC:sulfolane is either 50:50 or 45:55 v/v.

In some examples, including any of the foregoing, the strong Lewis acid additive competitively binds with F, OH, HF, and/or $H_2O$.

In some examples, including any of the foregoing, the strong Lewis acid additive competitively binds with F, OH, HF, and $H_2O$.

In some examples, including any of the foregoing, the strong Lewis acid additive competitively binds with the surface of lithium-stuffed garnet.

In some examples, including any of the foregoing, the strong Lewis Acid binds to the surface of lithium-stuffed garnet stronger than it binds to a lithium salt selected from the group consisting of lithium bis(perfluoroethanesulfonyl) imide (LIBETI), bis(trifluoromethane)sulfonimide lithium salt (LiTFSI), $LiBF_4$, $LiAsF_6$, and lithium bis(fluorosulfonyl)imide (LiFSI).

In some examples, including any of the foregoing, the strong Lewis acid additive is a $F^-$ getter from HF.

In some examples, including any of the foregoing, the strong Lewis acid additive is an $OH^-$ getter from $H_2O$.

In some examples, including any of the foregoing, the strong Lewis acid additive is a trivalent phosphite, phosphate, or borate compound.

In some examples, including any of the foregoing, the strong Lewis acid additive is selected from the group consisting of tris(trimethysilyl) phosphite (TTSPi), tris(trimethysilyl) phosphate (TTSP), trimethoxyboroxine ($C_3H_9B_3O_6$, TMOBX), vinylene carbonate (VC), vinyl ethylene carbonate (VEC), methylene methane disulfonate (MMDS), prop-1-ene-1,3 sultone (PES), fluoroethylene carbonate (FEC), LiTFSi, LiBOB, 1,3-propane sultone (PS), succinonitrile, methylene methanedisulfonate (MMDS), trimethylene sulfate (TMS), triallyl phosphate (TAP), tris (trimethylsilyl) borate, (TMSB) or tris(pentafluorophenyl) borane (TPFPB), and combinations thereof.

In some examples, including any of the foregoing, the strong Lewis acid additive is selected from the group consisting of tris(trimethysilyl) phosphite (TTSPi). tris(trimethysilyl) phosphate (TTSP).

In some examples, including any of the foregoing, the strong Lewis acid additive is selected from trimethoxyboroxine ($C_3H_9B_3O_6$).

In some examples, including any of the foregoing, the strong Lewis acid additive is selected from TMOBX.

In some examples, including any of the foregoing, the strong Lewis acid additive is selected from vinylene carbonate (VC).

In some examples, including any of the foregoing, the strong Lewis acid additive is selected from vinyl ethylene carbonate (VEC). In some examples, including any of the foregoing, the strong Lewis acid additive is selected from methylene methane disulfonate (MMDS). In some examples, including any of the foregoing, the strong Lewis acid additive is selected from prop-1-ene-1. In some examples, including any of the foregoing, the strong Lewis acid additive is selected from 3 sultone (PES). In some examples, including any of the foregoing, the strong Lewis acid additive is selected from fluoroethylene carbonate (FEC). In some examples, including any of the foregoing, the strong Lewis acid additive is selected from LiTFSi. In some examples, including any of the foregoing, the strong Lewis acid additive is selected from LiBOB. In some examples, including any of the foregoing, the strong Lewis acid additive is selected from 1,3-propane sultone (PS). In some examples, including any of the foregoing, the strong Lewis acid additive is selected from succinonitrile. In some examples, including any of the foregoing, the strong Lewis acid additive is selected from methylene methanedisulfonate (MMDS). In some examples, including any of the foregoing, the strong Lewis acid additive is selected from trimethylene sulfate (TMS). In some examples, including any of the foregoing, the strong Lewis acid additive is selected from triallyl phosphate (TAP). In some examples, including any of the foregoing, the strong Lewis acid additive is selected from tris(trimethylsilyl) borate. In some examples, including any of the foregoing, the strong Lewis acid additive is selected from (TMSB) or tris(pentafluorophenyl)borane (TPFPB).

In some examples, including any of the foregoing, the strong Lewis acid additive is TTSPi and/or TTSP.

In some examples, including any of the foregoing, the strong Lewis acid additive is selected from the group consisting TTSPi and TTSP.

In some examples, including any of the foregoing, the strong Lewis acid additive is a combination of TMOBX and vinylene carbonate.

In some examples, including any of the foregoing, the strong Lewis acid additive is VC.

In some examples, including any of the foregoing, the strong Lewis acid additive is a combination of VC and MMDS.

In some examples, including any of the foregoing, the strong Lewis acid additive is a combination of VC and/or PES.

In some examples, including any of the foregoing, the strong Lewis acid additive is a combination of PES, MDS, and TTSP.

In some examples, including any of the foregoing, the strong Lewis acid additive includes 2 wt. % PES.

In some examples, including any of the foregoing, the strong Lewis acid additive includes 1 wt % MMDS and 1 wt % TTSPi.

In some examples, including any of the foregoing, the catholyte includes 1.4M LiPF6, 45 v/v EC, 50 v/v sulfolane, and 5 v/v dibutylsulfone.

In some examples, including any of the foregoing, the Lewis acid is present at 0.2 wt % to 5 wt %, where the wt % is based on the total net mass of the salt plus solvent mixture.

In some examples, including any of the foregoing, the lithium-stuffed garnet is characterized by the chemical formula $Li_xLa_3Zr_2O_{12}+yAl_2O_3$, wherein x is from 5.8 to 7.0, and y is 0.1, 0.2, 0.3, 0.4, 0.5, 0.6, 0.7, 0.8, 0.9, or 1.0.

In some examples, including any of the foregoing, the lithium-stuffed garnet is characterized by a formula selected from the group consisting of $Li_ALa_BM'_CM''_DZr_EO_F$, $Li_4La_BM'_CM''_DTa_EO_F$, and $Li_4La_BM'_CM''_DNb_EO_F$, wherein $4<A<8.5$, $1.5<B<4$, $0 \leq C<2$, $0 \leq D<2$; $0<E<2$, $10<F<14$, and wherein M' and M" are each, independently, selected from the group consisting of Al, Mo, W, Nb, Ga, Sb, Ca, Ba, Sr, Ce, Hf, Rb, and Ta. In some examples, M' and M" are the same element selected from the from the group consisting of Al, Mo, W, Nb, Sb, Ca, Ba, Sr, Ce, Hf, Rb, and Ta. However, unless stated explicitly to the contrary, M' and M" are not the same element.

In some examples, including any of the foregoing, the lithium-stuffed garnet is characterized by a formula selected from the group consisting of $Li_aLa_bZr_cAl_dMe''_eO_f$ wherein $5<a<7.7$; $2<b<4$; $0<c<2.5$; $0<d<2$; $0 \leq e<2$, $10<f<14$, and wherein Me" is a metal selected from the group consisting of Nb, Ta, V, W, Mo, and Sb.

In some examples, including any of the foregoing, the lithium-stuffed garnet is characterized by a formula selected from the group consisting of $Li_aLa_bZr_cAl_dO_f$ wherein $5<a<7.7$; $2<b<4$; $0<c<2.5$; $0<d<2$; $10<f<14$.

In some examples, including any of the foregoing, the lithium-stuffed garnet is characterized by a formula selected from the group consisting of $Li_xLa_3Zr_2O_{12} \cdot 0.35Al_2O_3$ wherein $4<x<8.5$.

In some examples, including any of the foregoing, the lithium-stuffed garnet is characterized by a formula selected from the group consisting of $Li_xLa_3Zr_2O_{12} \cdot 0.5Al_2O_3$ wherein $4<x<8.5$.

In some examples, including any of the foregoing, the lithium-stuffed garnet is characterized by a formula selected from the group consisting of $Li_xLa_3Zr_2O_{12} \cdot 0.65Al_2O_3$ wherein $4<x<8.5$.

In some examples, including any of the foregoing, the lithium-stuffed garnet is characterized by a formula selected from the group consisting of $Li_xLa_3Zr_2O_{12} \cdot Al_2O_3$ wherein $4<x<8.5$.

VI. Processes for Making Positive Electrode Catholytes

In some examples, set forth herein is a process for making a catholyte. The process includes mixing a lithium salt; a first solvent selected from the group consisting of sulfolane, 1,3-propane sultone, sulfolene, thiophene, and combinations thereof; a second solvent; and a strong Lewis acid additive.

In some examples, this catholyte is used to soak a positive electrode before it contacts a lithium-stuffed garnet solid-state separator.

In some examples, including any of the foregoing, the lithium salt is selected from the group consisting of $LiPF_6$, lithium bis(perfluoroethanesulfonyl)imide (LIBETI), bis(trifluoromethane)sulfonimide lithium salt (LiTFSI), $LiBF_4$, $LiAsF_6$, lithium bis(fluorosulfonyl)imide (LiFSI), and combinations thereof.

In some examples, including any of the foregoing, the lithium salt is $LiPF_6$.

In some examples, including any of the foregoing, the lithium salt is lithium bis(perfluoroethanesulfonyl)imide (LIBETI).

In some examples, including any of the foregoing, the lithium salt is bis(trifluoromethane)sulfonimide lithium salt (LiTFSI).

In some examples, including any of the foregoing, the lithium salt is $LiBF_4$.

In some examples, including any of the foregoing, the lithium salt is $LiAsF_6$.

In some examples, including any of the foregoing, the lithium salt is lithium bis(fluorosulfonyl)imide (LiFSI).

In some examples, including any of the foregoing, the lithium salt is $LiBF_4$ or $LiPF_6$.

In some examples, including any of the foregoing, the lithium salt is $LiBF_4$ and $LiPF_6$.

In some examples, including any of the foregoing, the lithium salt is present at a concentration of 0.5 M to 2.0 M.

In some examples, including any of the foregoing, the lithium salt is present at a concentration of 0.5 M to 1.5 M.

In some examples, including any of the foregoing, the lithium salt is present at a concentration of 1.0M to 1.4 M.

In some examples, including any of the foregoing, the lithium salt is present at a concentration of 0.5 M, 0.55 M, 0.6 M, 0.65 M, 0.7 M, 0.75 M, 0.8 M, 0.85 M, 0.9 M, 0.95 M, or 1.5 M. In some examples, including any of the foregoing, the lithium salt is present at a concentration of 0.5 M to 2.0 M. In some examples, including any of the foregoing, the lithium salt is present at a concentration of 0.5 M to 1.5 M. In some examples, including any of the foregoing, the lithium salt is present at a concentration of 1.0M to 1.4 M. In some examples, including any of the foregoing, the lithium salt is present at a concentration of 0.5 M, 0.55 M, 0.6 M, 0.65 M, 0.7 M, 0.75 M, 0.8 M, 0.85 M, 0.9 M, 0.95 M, or 1.5 M. In some examples, including any of the foregoing, the lithium salt is present at a concentration of about 0.5 M, about 0.55 M, about 0.6 M, about 0.65 M, about 0.7 M, about 0.75 M, about 0.8 M, about 0.85 M, about 0.9 M, about 0.95 M, or about 1.5 M. In some examples, including any of the foregoing, the concentration of lithium salt in the solution is about 0.5 M to about 1.5 M. In some examples, including any of the foregoing, the concentration is about 0.5 M, about 0.55 M, about 0.6 M, about 0.65 M, about 0.7 M, about 0.75 M, about 0.8 M, about 0.85 M, about 0.9 M, about 0.95 M, about 1.0 M, about 1.05, about 1.10, about 1.15, about 1.2, about 1.25, about 1.30, about 1.35, about 1.4, about 1.45, or about 1.5 M. In some examples, including any of the foregoing, the concentration of lithium salt in the solution is about 0.5 M to about 1.5 M. In some examples, including any of the foregoing, the concentration is 0.5 M, 0.55 M, 0.6 M, 0.65 M, 0.7 M, 0.75 M, 0.8 M, 0.85 M, 0.9 M, 0.95 M, 1.0 M, 1.05, 1.10, 1.15, 1.2, 1.25, 1.30, 1.35, 1.4, 1.45, or 1.5 M. In some examples, including any of the foregoing, the concentration is 0.5 M. In some examples, including any of the foregoing, the concentration is 0.55 M. In some examples, including any of the foregoing, the concentration is 0.6 M. In some examples, including any of the foregoing, the concentration is 0.65 M. In some examples, including any of the foregoing, the concentration is 0.7 M. In some examples, including any of the foregoing, the concentration is 0.75 M. In some examples, including any of the foregoing, the concentration is 0.8 M. In some examples, including any of the foregoing, the concentration is 0.85 M. In some examples, including any of the foregoing, the concentration is 0.9 M. In some examples, including any of the foregoing, the concentration is 0.95 M. In some examples, including any of the foregoing, the concentration is 1.5 M. In some examples, including any of the foregoing, the concentration is about 0.5 M. In some examples, including any of the foregoing, the concentration is about 0.55 M. In some examples, including any of the foregoing, the concentration is about 0.6 M. In some examples, including any of the foregoing, the concentration is about 0.65 M. In some examples, including any of the foregoing, the concentration is about 0.7 M. In some examples, including any of the foregoing, the concentration is about 0.75 M. In some examples, including any of the foregoing, the concentration is about 0.8 M. In some examples, including any of the foregoing, the concentration is about 0.85 M. In some examples, including any of the foregoing, the concentration is about 0.9 M. In some examples, including any of the foregoing, the concentration is about 0.95 M. In some examples, including any of the foregoing, the concentration is about 1.5 M. In some examples, including any of the foregoing, the first solvent is sulfolane.

In some examples, including any of the foregoing, the lithium salt is present at a concentration of 0.5 M, 0.55 M, 0.6 M, 0.65 M, 0.7 M, 0.75 M, 0.8 M, 0.85 M, 0.9 M, 0.95 M, or 1.5 M. In some examples, including any of the foregoing, the lithium salt is present at a concentration of 0.5 M to 2.0 M. In some examples, including any of the foregoing, the lithium salt is present at a concentration of 0.5 M to 1.5 M. In some examples, including any of the foregoing, the lithium salt is present at a concentration of 1.0M to 1.4 M. In some examples, including any of the foregoing, the lithium salt is present at a concentration of 0.5 M, 0.55 M, 0.6 M, 0.65 M, 0.7 M, 0.75 M, 0.8 M, 0.85 M, 0.9 M, 0.95 M, or 1.5 M. In some examples, including any of the foregoing, the lithium salt is present at a concentration of 0.5 M, 0.55 M, 0.6 M, 0.65 M, 0.7 M, 0.75 M, 0.8 M, 0.85 M, 0.9 M, 0.95 M, or 1.5 M. In some examples, including any of the foregoing, the concentration of lithium salt in the solution is 0.5 M to 1.5 M. In some examples, including any of the foregoing, the concentration is 0.5 M, 0.55 M, 0.6 M, 0.65 M, 0.7 M, 0.75 M, 0.8 M, 0.85 M, 0.9 M, 0.95 M, 1.0 M, 1.05, 1.10, 1.15, 1.2, 1.25, 1.30, 1.35, 1.4, 1.45, or 1.5 M. In some examples, including any of the foregoing, the concentration of lithium salt in the solution is 0.5 M to 1.5 M. In some examples, including any of the foregoing, the concentration is 0.5 M, 0.55 M, 0.6 M, 0.65 M, 0.7 M, 0.75 M, 0.8 M, 0.85 M, 0.9 M, 0.95 M, 1.0 M, 1.05, 1.10, 1.15, 1.2, 1.25, 1.30, 1.35, 1.4, 1.45, or 1.5 M. In some examples, including any of the foregoing, the concentration is 0.5 M. In some examples, including any of the foregoing, the concentration is 0.55 M. In some examples, including any of the foregoing, the concentration is 0.6 M. In some examples, including any of the foregoing, the concentration is 0.65 M. In some examples, including any of the foregoing, the concentration is 0.7 M. In some examples, including any of the foregoing, the concentration is 0.75 M. In some examples, including any of the foregoing, the concentration is 0.8 M. In some examples, including any of the foregoing, the concentration is 0.85 M. In some examples, including any of the foregoing, the concentration is 0.9 M. In some examples, including any of the foregoing, the concentration is 0.95 M. In some examples, including any of the foregoing, the concentration is 1.5 M. In some examples, including any of the foregoing, the concentration is 0.5 M. In some examples, including any of the foregoing, the concentration is 0.55 M. In some examples, including any of the foregoing, the concentration is 0.6 M. In some examples, including any of the foregoing, the concentration is 0.65 M. In some examples, including any of the foregoing, the concentration is 0.7 M. In some examples, including any of the foregoing, the concentration is 0.75 M. In some examples, including any of the foregoing, the concentration is 0.8 M. In some examples, including any of the foregoing, the concentration is 0.85 M. In some examples, including any of the foregoing, the concentration is 0.9 M. In some examples, including any of the foregoing, the concentration is 0.95 M. In some examples, including any of the foregoing, the concentration is 1.5 M. In some examples, including any of the foregoing, the first solvent is sulfolane.

In some examples, including any of the foregoing, the second solvent is selected from dimethyl carbonate (DMC), ethyl-methyl carbonate (EMC), propylmethyl carbonate, nitroethyl carbonate, propylene carbonate (PC), diethyl carbonate (DEC), methyl propyl carbonate (MPC), 2,5-dioxahexanedioic acid dimethyl ester, tetrahydrofuran (THF), γ-butyrolactone (GBL), gamma butyl-lactone, fluoroethylene carbonate (FEC), fluoromethyl ethylene carbonate (FMEC), trifluoroethyl methyl carbonate (F-EMC), fluorinated 3-(1,1,2,2-tetrafluoroethoxy)-1,1,2,2-tetrafluoropropane/1,1,2,2-tetrafluoro-3-(1,1,2,2-tetrafluoroethoxy)propane (F-EPE), fluorinated cyclic carbonate (F-AEC), dioxolane, prop-1-ene-1,3-sultone (PES), sulfolane, acetonitrile (ACN), succinonitrile (SCN), pimelonitrile, suberonitrile, propionitrile, propanedinitrile, glutaronitrile (GLN), adiponitrile (ADN), hexanedinitrile, pentanedinitrile, acetophenone, isophorone, benzonitrile, ethyl propionate, methyl propionate, methylene methanedisulfonate, dimethyl sulfate, dimethyl sulfoxide (DMSO), ethyl acetate, methyl butyrate, dimethyl ether (DME), diethyl ether, dioxolane, methyl benzoate, 2-methyl-5-oxooxolane-2-carbonitrile, and combinations thereof. In some examples, the combinations are those which are miscible.

In some examples, including any of the foregoing, the second solvent is selected from ethylene carbonate, dimethyl carbonate (DMC), ethyl-methyl carbonate (EMC), propylene carbonate (PC), diethyl carbonate (DEC), fluoroethylene carbonate (FEC), prop-1-ene-1,3-sultone (PES), sulfolane, acetonitrile (ACN), succinonitrile (SCN), glutaronitrile (GLN), adiponitrile (ADN), and combinations thereof.

In some examples, including any of the foregoing, the second solvent is selected from ethylene carbonate.

In some examples, including any of the foregoing, the catholyte has a viscosity of less than 15 mPa-s at 20° C.

In some examples, including any of the foregoing, the catholyte has a water content less than 200 ppm, or less than 150 ppm, or less than 100 ppm, or less than 60 ppm, or less than 50 ppm, or less than 40 ppm, or less than 30 ppm, or less than 20 ppm, or less than 10 ppm.

In some examples, including any of the foregoing, the process further includes a third solvent selected from a linear sulfone.

In some examples, including any of the foregoing, the linear sulfone is present at 0 to 15 vol %.

In some examples, including any of the foregoing, the linear sulfone is present at 5 to 10 vol %.

In some examples, including any of the foregoing, the linear sulfone is selected from the group consisting of ethyl methyl sulfone, dimethyl sulfone, dibutyl sulfone, allyl methyl sulfone, ethyl sulfone, dipropyl sulfone, ethyl phenyl sulfone, diethyl sulfate, dimethyl sulfate, and combinations thereof.

In some examples, including any of the foregoing, the linear sulfone is selected from the group consist of dibutylsulfone, dipropylsulfone, and combinations thereof.

In some examples, including any of the foregoing, the catholyte is a eutectic mixture of solvents.

In some examples, including any of the foregoing, the eutectic mixture melts at less than 35° C. In some examples, including any of the foregoing, the eutectic mixture melts at less than 34° C. In some examples, including any of the foregoing, the eutectic mixture melts at less than 33° C. In some examples, including any of the foregoing, the eutectic mixture melts at less than 32° C. In some examples, including any of the foregoing, the eutectic mixture melts at less than 31° C. In some examples, including any of the foregoing, the eutectic mixture melts at less than 30° C. In some examples, including any of the foregoing, the eutectic mixture melts at less than 29° C. In some examples, including any of the foregoing, the eutectic mixture melts at less than 28° C. In some examples, including any of the foregoing, the eutectic mixture melts at less than 27° C. In some examples, including any of the foregoing, the eutectic mixture melts at less than 26° C. In some examples, including any of the foregoing, the eutectic mixture melts at less than 25° C. In some examples, including any of the foregoing, the eutectic mixture melts at less than 24° C. In some examples, including any of the foregoing, the eutectic mixture melts at less than 23° C. In some examples, including any of the foregoing, the eutectic mixture melts at less than 22° C. In some examples, including any of the foregoing, the eutectic mixture melts at less than 21° C. In some examples, including any of the foregoing, the eutectic mixture melts at less than 20° C. In some examples, including any of the foregoing, the eutectic mixture melts at less than 19° C. In some examples, including any of the foregoing, the eutectic mixture melts at less than 18° C. In some examples, including any of the foregoing, the eutectic mixture melts at less than 17° C. In some examples, including any of the foregoing, the eutectic mixture melts at less than 16° C. In some examples, including any of the foregoing, the eutectic mixture melts at less than 15° C. In some examples, including any of the foregoing, the eutectic mixture melts at less than 14° C. In some examples, including any of the foregoing, the eutectic mixture melts at less than 13° C. In some examples, including any of the foregoing, the eutectic mixture melts at less than 12° C. In some examples, including any of the foregoing, the eutectic mixture melts at less than 11° C. In some examples, including any of the foregoing, the eutectic mixture melts at less than 10° C. In some examples, including any of the foregoing, the eutectic mixture melts at less than 9° C. In some examples, including any of the foregoing, the eutectic mixture melts at less than 8° C. In some examples, including any of the foregoing, the eutectic mixture melts at less than 7° C. In some examples, including any of the foregoing, the eutectic mixture melts at less than 6° C. In some examples, including any of the foregoing, the eutectic mixture melts at less than 5° C. In some examples, including any of the foregoing, the eutectic mixture melts at less than 4° C. In some examples, including any of the foregoing, the eutectic mixture melts at less than 3° C. In some examples, including any of the foregoing, the eutectic mixture melts at less than 2° C. In some examples, including any of the foregoing, the eutectic mixture melts at less than 1° C. In some examples, including any of the foregoing, the eutectic mixture melts at less than 0° C. In some examples, the eutectic mixture melts at greater than 34° C. In some examples, the eutectic mixture melts at greater than 33° C. In some examples, the eutectic mixture melts at greater than 32° C. In some examples, the eutectic mixture melts at greater than 31° C. In some examples, the eutectic mixture melts at greater than 30° C. In some examples, the eutectic mixture melts at greater than 29° C. In some examples, the eutectic mixture melts at greater than 28° C. In some examples, the eutectic mixture melts at greater than 27° C. In some examples, the eutectic mixture melts at greater than 26° C. In some examples, the eutectic mixture melts at greater than 25° C. In some examples, the eutectic mixture melts at greater than 24° C. In some examples, the eutectic mixture melts at greater than 23° C. In some examples, the eutectic mixture melts at greater than 22° C. In some examples, the eutectic mixture melts at greater than 21° C. In some examples, the eutectic mixture melts at greater than 20° C. In some examples, the eutectic mixture melts at greater than 19° C. In some examples, the eutectic mixture melts at greater than 18° C. In some examples, the eutectic mixture melts at greater than 17° C. In some examples, the eutectic mixture melts at greater than 16° C. In some examples, the eutectic mixture melts at greater than 15° C. In some examples, the eutectic mixture melts at greater than 14° C. In some examples, the eutectic mixture melts at greater than 13° C. In some examples, the eutectic mixture melts at greater than 12° C. In some examples, the eutectic mixture melts at greater than 11° C. In some examples, the eutectic mixture melts at greater than 10° C. In some examples, the eutectic mixture melts at greater than 9° C. In some examples, the eutectic mixture melts at greater than 8° C. In some examples, the eutectic mixture melts at greater than 7° C. In some examples, the eutectic mixture melts at greater than 6° C. In some examples, the eutectic mixture melts at greater than 5° C. In some examples, the eutectic mixture melts at greater than 4° C. In some examples, the eutectic mixture melts at greater than 3° C. In some examples, the eutectic mixture melts at greater than 2° C. In some examples, the eutectic mixture melts at greater than 1° C. In some examples, the eutectic mixture melts at greater than 0° C. In some examples, the eutectic mixture melts at a temperature between the temperatures recited in this paragraph.

In some examples, including any of the foregoing, the sulfolane is the solvent present in the catholyte in the largest volume percent.

In some examples, including any of the foregoing, the ratio of the second solvent to the first solvent is from 30:70 v/v to 50:50 v/v.

In some examples, including any of the foregoing, the ratio of the second solvent to the first solvent is either 50:50 v/v or 45:55 v/v.

In some examples, including any of the foregoing, the first solvent is sulfolane, wherein, the second solvent is EC, and wherein the ratio of EC:sulfolane is from 30:70 v/v to 50:50 v/v.

In some examples, including any of the foregoing, the first solvent is sulfolane, wherein, the second solvent is EC, and wherein the ratio of EC:sulfolane is either 50:50 v/v or 45:55 v/v.

In some examples, including any of the foregoing, the strong Lewis acid additive competitively binds with F, OH, HF, and/or $H_2O$.

In some examples, including any of the foregoing, the strong Lewis acid additive competitively binds with F, OH, HF, and $H_2O$.

In some examples, including any of the foregoing, the strong Lewis acid additive competitively binds with the surface of lithium-stuffed garnet.

In some examples, including any of the foregoing, the strong Lewis Acid binds to the surface of lithium-stuffed garnet stronger than it binds to a lithium salt selected from the group consisting of lithium bis(perfluoroethanesulfonyl) imide (LIBETI), bis(trifluoromethane)sulfonimide lithium salt (LiTFSI), $LiBF_4$, $LiAsF_6$, and lithium bis(fluorosulfonyl)imide (LiFSI).

In some examples, including any of the foregoing, the strong Lewis acid additive is a F– getter from HF.

In some examples, including any of the foregoing, the strong Lewis acid additive is an OH– getter from $H_2O$.

In some examples, including any of the foregoing, the strong Lewis acid additive is a trivalent phosphite, phosphate, or borate compound.

In some examples, including any of the foregoing, the strong Lewis acid additive is selected from the group consisting of tris(trimethysilyl) phosphite (TTSPi), tris(trimethysilyl) phosphate (TTSP), trimethoxyboroxine ($C_3H_9B_3O_6$, TMOBX), vinylene carbonate (VC), vinyl ethylene carbonate (VEC), methylene methane disulfonate (MMDS), prop-1-ene-1,3 sultone (PES), fluoroethylene carbonate (FEC), LiTFSi, LiBOB, 1,3-propane sultone (PS), succinonitrile, methylene methanedisulfonate (MMDS), trimethylene sulfate (TMS), triallyl phosphate (TAP), tris(trimethylsilyl) borate, (TMSB) or tris(pentafluorophenyl) borane (TPFPB), and combinations thereof.

In some examples, including any of the foregoing, the strong Lewis acid additive is TTSPi and/or TTSP.

In some examples, including any of the foregoing, the strong Lewis acid additive is selected from the group consisting TTSPi and TTSP.

In some examples, including any of the foregoing, the strong Lewis acid additive is a combination of TMOBX and vinylene carbonate.

In some examples, including any of the foregoing, the strong Lewis acid additive is VC.

In some examples, including any of the foregoing, the strong Lewis acid additive is a combination of VC and MMDS.

In some examples, including any of the foregoing, the strong Lewis acid additive is a combination of VC and/or PES.

In some examples, including any of the foregoing, the strong Lewis acid additive is a combination of PES, MDS, and TTSP.

In some examples, including any of the foregoing, the strong Lewis acid additive includes 2 wt. % PES In some examples, including any of the foregoing, the strong Lewis acid additive includes 1 wt % MMDS and 1 wt % TTSPi.

In some examples, TTSPi is present in the catholyte solution at about 0.5 wt % to about 4 wt %, about 0.5 wt % to about 3 wt %, about 0.5 wt % to about 2 wt %, or about 0.5 wt % to about 1 wt %. In some examples, TTSPi is present in the catholyte solution at about 1 wt % to about 2 wt %.

In some examples, MMDS is present in the catholyte solution at about 0.5 wt % to about 4 wt %, about 0.5 wt % to about 3 wt %, about 0.5 wt % to about 2 wt %, or about 0.5 wt % to about 1 wt %. In some examples, MMDS is present in the catholyte solution at about 1 wt % to about 2 wt %.

In some examples, including any of the foregoing, the catholyte comprises about 0.5 wt % to about 4 wt % MMDS, and 0.5 wt % to about 4 wt % TTSPi. In some examples, including any of the foregoing, the catholyte comprises about 0.5 wt % to about 2 wt % MMDS, and 0.5 wt % to about 2 wt % TTSPi. In some examples, including any of the foregoing, the catholyte comprises about 0.5 wt % to about 1 wt % MMDS, and 0.5 wt % to about 1 wt % TTSPi.

In some examples, the catholyte comprises MMDS and TTSPi in about a 1:1 wt % ratio. In some examples, the catholyte comprises MMDS and TTSPi in about a 10:1 wt % ratio to about a 1:10 wt % ratio.

In some examples, including any of the foregoing, the catholyte includes 1.4 M LiPF$_6$, 45 v/v EC, 50 v/v sulfolane, and 5 v/v dibutylsulfone.

In some examples, including any of the foregoing, the Lewis acid is present at 0.2 wt % to 5 wt %, where the wt % is based on the total net mass of the salt plus solvent mixture In some examples, including any of the foregoing, the second solvent is ethylene carbonate (EC). In some examples, including any of the foregoing, the second solvent is diethylene carbonate. In some examples, including any of the foregoing, the second solvent is dimethyl carbonate (DMC). In some examples, including any of the foregoing, the second solvent is ethyl-methyl carbonate (EMC). In some examples, including any of the foregoing, the second solvent is propylmethyl carbonate. In some examples, including any of the foregoing, the second solvent is nitroethyl carbonate. In some examples, including any of the foregoing, the second solvent is propylene carbonate (PC). In some examples, including any of the foregoing, the second solvent is diethyl carbonate (DEC). In some examples, including any of the foregoing, the second solvent is methyl propyl carbonate (MPC). In some examples, including any of the foregoing, the second solvent is 2,5-dioxahexanedioic acid dimethyl ester. In some examples, including any of the foregoing, the second solvent is tetrahydrofuran (THF). In some examples, including any of the foregoing, the second solvent is γ-butyrolactone (GBL). In some examples, including any of the foregoing, the second solvent is fluoroethylene carbonate (FEC). In some examples, including any of the foregoing, the second solvent is fluoromethyl ethylene carbonate (FMEC). In some examples, including any of the foregoing, the second solvent is trifluoroethyl methyl carbonate (F-EMC). In some examples, including any of the foregoing, the second solvent is fluorinated 3-(1,1,2,2-tetrafluoroethoxy)-1,1,2,2-tetrafluoropropane/1,1,2,2-tetrafluoro-3-(1,1,2,2-tetrafluoroethoxy)propane (F-EPE). In some examples, including any of the foregoing, the second solvent is fluorinated cyclic carbonate (F-AEC). In some examples, including any of the foregoing, the second solvent is dioxolane. In some examples, including any of the foregoing, the second solvent is prop-1-ene-1,3-sultone (PES). In some examples, including any of the foregoing, the second solvent is sulfolane. In some examples, including any of the foregoing, the second solvent is acetonitrile (ACN). In some examples, including any of the foregoing, the second solvent is succinonitrile (SCN). In some examples, including any of the foregoing, the second solvent is pimelonitrile. In some examples, including any of the foregoing, the second solvent is suberonitrile. In some examples, including any of the foregoing, the second solvent is propionitrile. In some examples, including any of the foregoing, the second solvent is propanedinitrile. In some examples, including any of the foregoing, the second solvent is glutaronitrile (GLN). In some examples, including any of the foregoing, the second solvent is adiponitrile (ADN). In some examples, including any of the foregoing, the second solvent is hexanedinitrile. In some examples, including any of the foregoing, the second solvent is pentanedinitrile. In some examples, including any of the foregoing, the second solvent is acetophenone. In some examples, including any of the foregoing, the second solvent is isophorone. In some examples, including any of the foregoing, the second solvent is benzonitrile. In some examples, including any of the foregoing, the second solvent is ethyl propionate. In some examples, including any of the foregoing, the second solvent is methyl propionate. In some examples, including any of the foregoing, the second solvent is methylene methanedisulfonate. In some examples, including any of the foregoing, the second solvent is dimethyl sulfate. dimethyl sulfoxide (DMSO), In some examples, including any of the foregoing, the second solvent is ethyl acetate. In some examples, including any of the foregoing, the second solvent is methyl butyrate. In some examples, including any of the foregoing, the second solvent is dimethyl ether (DME). In some examples, including any of the foregoing, the second solvent is diethyl ether. In some examples, including any of the foregoing, the second solvent is dioxolane. In some examples, including any of the foregoing, the second solvent is gamma butyl-lactone In some examples, including any of the foregoing, the second solvent is methyl benzoate. In some examples, including any of the foregoing, the second solvent is 2-methyl-5-oxooxolane-2-carbonitrile. In some examples, including any of the foregoing, the second solvent is selected from the group consisting of succinonitrile (SCN), glutaronitile (GLN), sulfolane, ethylene carbonate (EC), ethyl-methyl carbonate (EMC), and combinations thereof.

In some examples, including any of the foregoing, the catholyte comprises any solution or electrolyte disclosed in U.S. Patent Application Publication No. US20170331092A1, which published Nov. 16, 2017, titled as Solid electrolyte separator bonding agent, the entire content of the application is incorporated by reference in its entirety for all purposes.

In some examples, including any of the foregoing, the catholyte has a water content less than 200 ppm, or less than 150 ppm, or less than 100 ppm, or less than 60 ppm, or less than 50 ppm, or less than 40 ppm, or less than 30 ppm, or less than 20 ppm, or less than 10 ppm. The water content of the solvent or the full electrolyte mixture moisture is measured by Karl Fischer coulometric titration, using a Mettler Toledo C20. The catholyte "Coulomat CG-K" and the anolyte "Hydranal AK" are used in the titration and the electrolyte is directly injected into the system for moisture analysis.

In some examples, including any of the foregoing, the catholyte includes a solution selected from those disclosed in U.S. Patent Application Publication No. US20170331092A1, which published Nov. 16, 2017, titled as SOLID ELECTROLYTE SEPARATOR BONDING AGENT, the entire content of the application is incorporated by reference in its entirety for all purposes.

In some examples, including any of the foregoing, the temperature of the process is about 20° C. In some examples, including any of the foregoing, the temperature of the process is about 25° C. In some examples, including any of the foregoing, the temperature of the process is about 30° C. In some examples, including any of the foregoing, the temperature of the process is about 35° C. In some examples, including any of the foregoing, the temperature of the process is about 40° C. In some examples, including any of the foregoing, the temperature of the process is about 45° C. In some examples, including any of the foregoing, the temperature of the process is about 50° C. In some examples, including any of the foregoing, the temperature of the process is about 55° C. In some examples, including any of the foregoing, the temperature of the process is about 60° C. In some examples, including any of the foregoing, the temperature of the process is selected from the group consisting of 20° C., 25° C., and 30° C. In some embodiments, the at least a surface of a sintered thin film garnet is soaked in the electrolyte solution at a temperature that ranges from about 20 to about 60° C. In some embodiments, the temperature ranges from 20 to 25° C., 20 to 30° C., 20 to 35° C., 20 to 40° C., 20 to 45° C., 20 to 50° C., 25 to 30° C., 25 to 35° C., 25 to 40° C., 30 to 35° C., 30 to 40° C., 35 to 40° C., 35 to 45° C., 35 to 50° C., or 40 to 50° C.

In some embodiments, the temperature is selected from the group consisting of about 20° C., about 25° C., about 30° C., about 35° C., about 40° C., about 45° C., about 50° C., and about 55° C.

In some embodiments, the temperature is selected from the group consisting of 20° C., 25° C., 30° C., 35° C., 40° C., 45° C., 50° C., and 55° C.

In some embodiments, the temperature is 35° C., 40° C., 45° C., 50° C., 55° C., or 60° C.

In some embodiments, the temperature is 60° C.

In some examples, including any of the foregoing, the temperature is 60° C.

In some examples, including any of the foregoing, the top surface or bottom surface, or both, are fluorinated and comprise trace amounts of contaminants. In some examples, the trace amount of contaminant is less than 1.0 wt %, 0.9 wt %, 0.8 wt %, 0.7 wt %, 0.6 wt %, 0.5 wt %, 0.4 wt %, 0.3 wt %, 0.2 wt %, or 0.1 wt %.

VII. Method of Using a Catholyte or Electrochemical Cell Set Forth Herein

In some examples, set forth herein is a method of using an electrochemical cell, set forth herein, including holding the electrochemical cell at a voltage of 3.9 V (v. Li) or greater.

In some examples, the voltage is less than 5V (v. Li). In some examples, the voltage is less than 4.9V (v. Li). In some examples, the voltage is less than 4.8V (v. Li). In some examples, the voltage is less than 4.7V (v. Li). In some examples, the voltage is less than 4.6V (v. Li). In some examples, the voltage is less than 4.5V (v. Li). In some examples, the voltage is less than 4.3V (v. Li). In some examples, the voltage is less than 4.2V (v. Li). In some examples, the voltage is less than 4.1V (v. Li). In some examples, the voltage is less than 4V (v. Li). In some examples, the voltage is held for at least 1 hour, at least 1 day, at least 30 days, or at least 1 year.

In some examples, including any of the foregoing, the electrochemical cell is at a 100% state-of-charge. In some examples, including any of the foregoing, the electrochemical cell is at a 90% state-of-charge. In some examples, including any of the foregoing, the electrochemical cell is at a 80% state-of-charge. In some examples, including any of the foregoing, the electrochemical cell is at a 70% state-of-charge. In some examples, including any of the foregoing, the electrochemical cell is at a 60% state-of-charge. In some examples, including any of the foregoing, the electrochemical cell is at a 50% state-of-charge.

In some examples, including any of the foregoing, the electrochemical cell is at a 100% state-of-charge.

In some examples, including any of the foregoing, the ASR of the electrochemical cell is stable to within 10% for at least 1 day.

In some examples, including any of the foregoing, the ASR of the electrochemical cell is stable to within 10% for at least 30 days.

In some examples, including any of the foregoing, the interfacial lithium-stuffed garnet/positive electrode ASR of the electrochemical cell is stable to within 10% for at least 1 day.

In some examples, including any of the foregoing, the interfacial lithium-stuffed garnet/positive electrode ASR of the electrochemical cell is stable to within 10% for at least 30 days.

In some examples, including any of the foregoing, the method includes charging and discharging the electrochemical cell between 0 and 4.5 V.

In some examples, set forth herein is a method of using an electrochemical cell set forth herein, including holding the electrochemical cell at a voltage of 3.9 V (v. Li) or greater.

In some examples, including any of the foregoing, the voltage is less than 5V (v. Li).

In some examples, including any of the foregoing, the method further includes charging and discharging the electrochemical cell between 0 and 4.5 V.

In some examples, including any of the foregoing, set forth herein is a method including, providing a catholyte or electrochemical cell set forth herein and holding the catholyte or electrochemical cell at high voltage for an extended period of time.

In some examples, including any of the foregoing, the high voltage is a voltage higher than 4 V (v. Li). In some examples, including any of the foregoing, the high voltage is a voltage higher than 4.1 V (v. Li). In some examples, including any of the foregoing, the high voltage is a voltage higher than 4.2 V (v. Li). In some examples, including any of the foregoing, the high voltage is a voltage higher than 4.3 V (v. Li). In some examples, including any of the foregoing, the high voltage is a voltage higher than 4.4 V (v. Li). In some examples, including any of the foregoing, the high voltage is a voltage higher than 4.5 V (v. Li). In some examples, including any of the foregoing, the high voltage is a voltage less than 5 V (v. Li).

In some examples, including any of the foregoing, the interface between a lithium-stuffed garnet separator and a positive electrode does not show an appreciable increase in ASR during the extended period of time. In some examples, including any of the foregoing, an appreciable increase in ASR is an increase in ASR of 50% or more. In some examples, including any of the foregoing, an appreciable increase in ASR is an increase in ASR of 40% or more. In some examples, including any of the foregoing, an appreciable increase in ASR is an increase in ASR of 30% or more. In some examples, including any of the foregoing, an appreciable increase in ASR is an increase in ASR of 20% or more. In some examples, including any of the foregoing, an appreciable increase in ASR is an increase in ASR of 10% or more. In some examples, including any of the foregoing, an appreciable increase in ASR is an increase in ASR of 9% or more. In some examples, including any of the foregoing, an appreciable increase in ASR is an increase in ASR of 8% or more. In some examples, including any of the foregoing, an appreciable increase in ASR is an increase in ASR of 7% or more. In some examples, including any of the foregoing, an appreciable increase in ASR is an increase in ASR of 6% or more. In some examples, including any of the foregoing, an appreciable increase in ASR is an increase in ASR of 5% or more. In some examples, including any of the foregoing, an appreciable increase in ASR is an increase in ASR of 4% or more. In some examples, including any of the foregoing, an appreciable increase in ASR is an increase in ASR of 3% or more. In some examples, including any of the foregoing, an appreciable increase in ASR is an increase in ASR of 2% or more. In some examples, including any of the foregoing, an appreciable increase in ASR is an increase in ASR of 1% or more.

In some examples, including any of the foregoing, the extended period of time is at least 1 minute.

In some examples, including any of the foregoing, the extended period of time is at least 60 minutes. In some examples, including any of the foregoing, the extended period of time is at least 1 hour. In some examples, including any of the foregoing, the extended period of time is at least 1 day. In some examples, including any of the foregoing, the extended period of time is at least 1 week. In some examples, including any of the foregoing, the extended period of time is at least 1 month. In some examples, including any of the foregoing, the extended period of time is at least 1 year. In some examples, including any of the foregoing, the extended period of time is less than 10 years.

In some examples, including any of the foregoing, the ASR of the lithium-stuffed garnet separator does not vary by more than 10% over a surface area of at least 10 mm$^2$.

In some examples, including any of the foregoing, the ASR of the lithium-stuffed garnet separator does not vary by more than 10% as a function of time for at least 1 day.

In some examples, including any of the foregoing, the ASR of the lithium-stuffed garnet separator does not vary by more than 10% as a function of time for at least 365 day.

In some examples, including any of the foregoing, the ASR of the lithium-stuffed garnet separator does not increase by more than 10%.

In some examples, including any of the foregoing, the area specific resistance (ASR) less than 1000 cm$^2$ at 45° C. In some examples, the ASR is less than 90, 80, 70, 60, 50, 40, 30, 20, or 10 $\Omega$cm$^2$ at 45° C.

In some examples, including any of the foregoing, the ASR is less than 30 $\Omega$cm$^2$ at 45° C. In some examples, the ASR is less than 10 $\Omega$cm$^2$ at 45° C. In some examples, the ASR is less than 5 $\Omega$cm$^2$ at 45° C. In some examples, the ASR is less than 30 $\Omega$cm$^2$ at 25° C. In some examples, the ASR is less than 10 $\Omega$cm$^2$ at 25° C.

Figure 2:
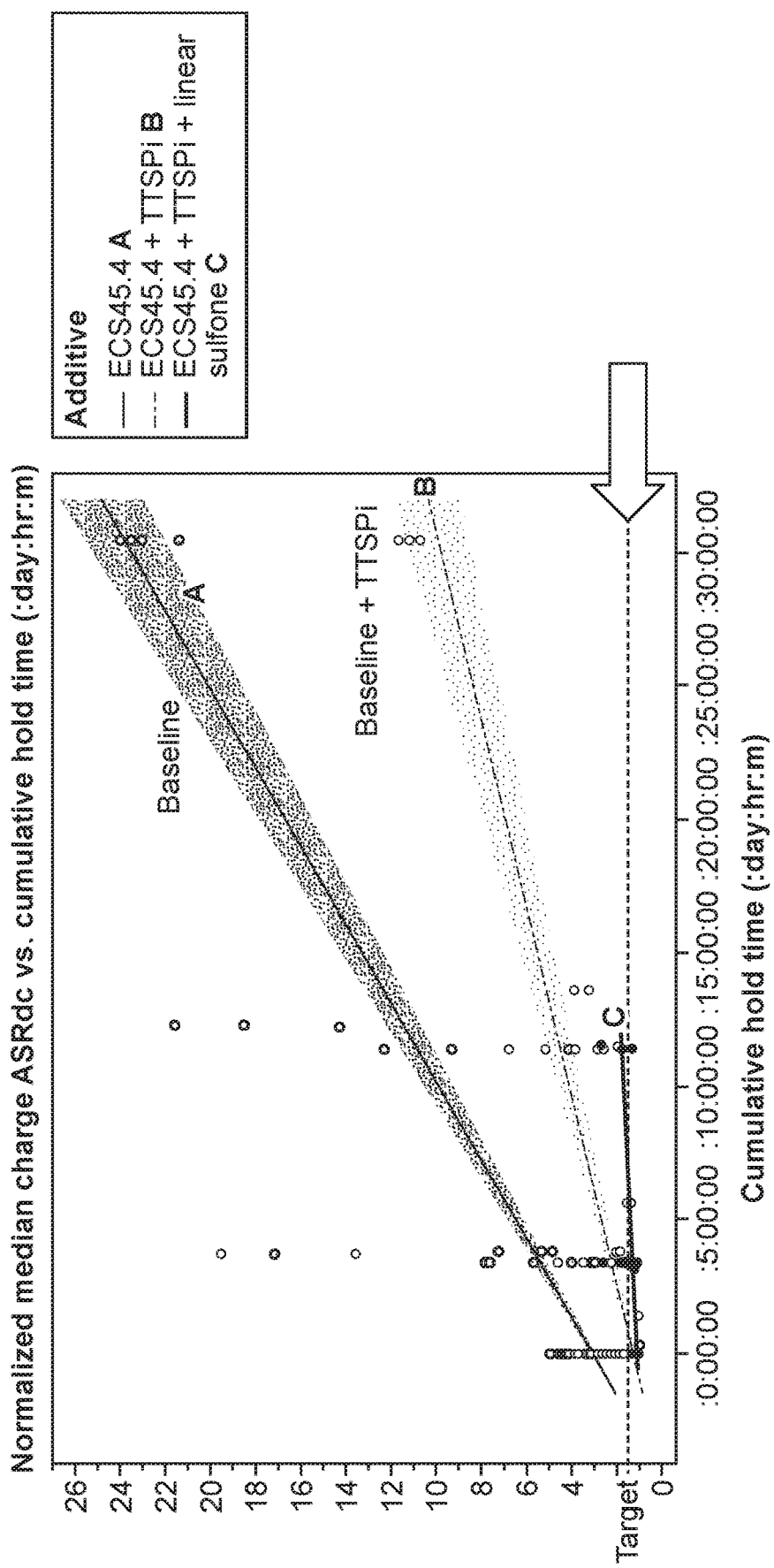
FIG. 2 shows a plot of normalized median charge area-specific resistance (ASR) as a function of cumulative hold time for a series of full electrochemical pouch cells having lithium-stuffed garnet solid-state separators and three catholyte solutions, as described in Example 2.
Figure 5:
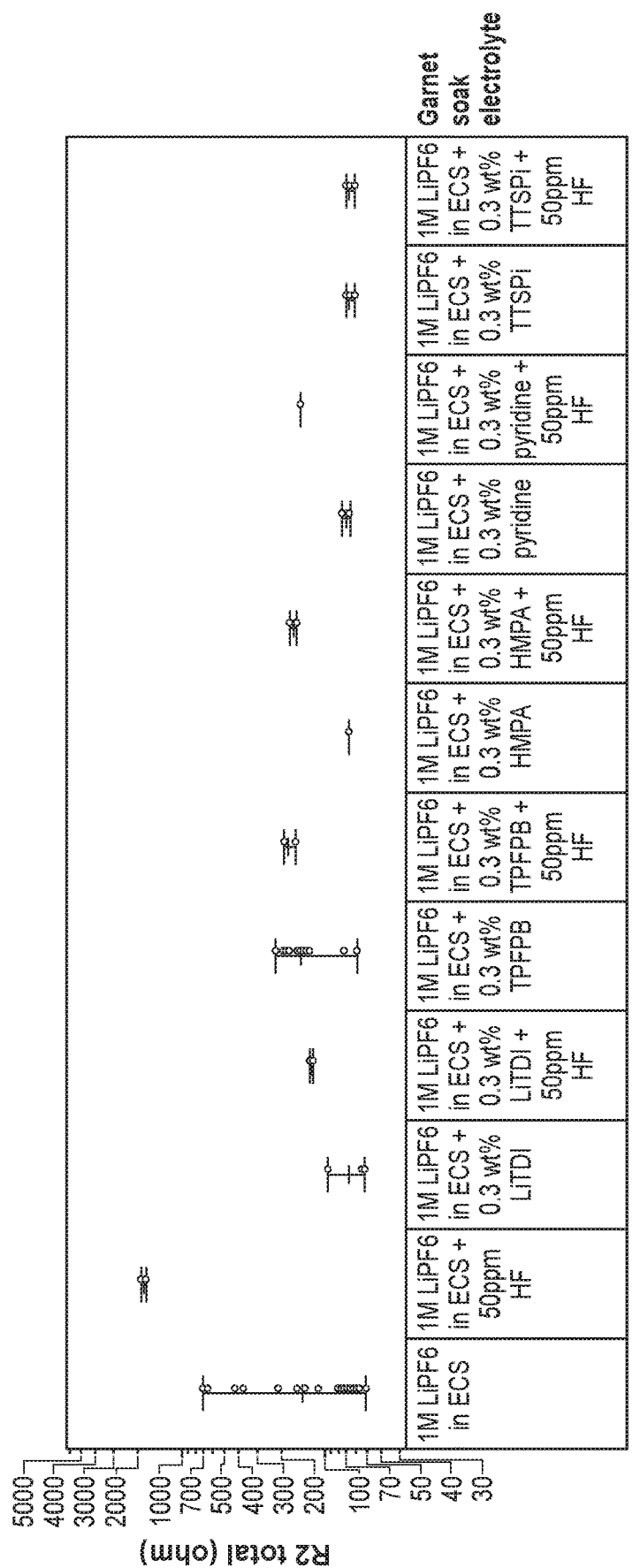
FIG. 5 shows the ASR resulting when lithium-stuffed garnet solid-state separators are exposed to catholytes having or not having additives that prevent and/or reduce fluoride concentrations and fluorination reactions.

In some examples, including any of the foregoing, the ASR stability is as shown in FIG. 2 or FIG. 5. In some examples, the ASR is less than 10 $\Omega$cm$^2$ at 25° C.

VIII. Devices and Vehicles

In some examples, set forth herein is an electrochemical device including an electrolyte set forth herein.

In some examples, set forth herein is an electrochemical device including a catholyte set forth herein.

In some examples, set forth herein is an electrochemical device including a sintered lithium-stuffed garnet thin film set forth herein.

In some examples, set forth herein is an electric vehicle including an electrochemical device set forth herein.

In some examples, set forth herein is an electric vehicle including an electrochemical device which includes a sintered lithium-stuffed garnet thin film set forth herein.

In some examples, set forth herein is an electric vehicle which includes a sintered lithium-stuffed garnet thin film set forth herein.

EDS chemical analysis presented in the Examples, herein, shows the changes in surface chemistry of the lithium-stuffed garnet are consistent with surface fluorination and progressive loss of carbonate, when additives are not present and the electrochemical cell is charged above 4.2V.

In some examples, herein, in additional to eliminating HF from the catholyte, the addition of TTSPi (tris-trimethylsilylphosphite) stabilizes and protects the surface of lithium-stuffed garnet solid-state separators against degradation (oxidation) above 4.2V. For example, catholytes with up to 2 wt % TTSPI (1.4M LiPF$_6$ in ECS) are more stable after 3 day and 7 day potentiostatic holds at 4.3V, 45° C., when compared to ECS electrolyte without TTSPi. The catholyte garnet interfacial impedance increases by ~1 $\Omega$*cm$^2$ per day at this condition, compared to ~5 $\Omega$*cm$^2$ per day without the TTSPi additive.

Embodiments

1. An electrochemical cell comprising, a positive electrode, a negative electrode, and a solid-state electrolyte therebetween;
   wherein the positive electrode comprises a catholyte comprising:
   a lithium salt;
   a first solvent selected from the group consisting of sulfolane, 1,3-propane sultone, sulfolene, thiophene, and combinations thereof;
   a second solvent; and
   a strong Lewis acid;
   wherein the -state electrolyte comprises lithium-stuffed garnet; and
   wherein the negative electrode comprises lithium metal.

2. The electrochemical cell of embodiment 1, wherein the solid-state electrolyte is a thin film.

3. The electrochemical cell of embodiments 1 or 2, wherein the solid-state electrolyte is a sintered lithium-stuffed garnet thin film.

4. The electrochemical cell of any one of embodiments 1-3, wherein the lithium salt is selected from the group consisting of LiPF$_6$, lithium bis(perfluoroethanesulfonyl) imide (LIBETI), bis(trifluoromethane)sulfonimide (LiTFSI), LiBF$_4$, LiAsF$_6$, lithium bis(fluorosulfonyl)imide (LiFSI), and combinations thereof.

5. The electrochemical cell of any one of embodiments 1-4, wherein the lithium salt is present at a concentration of about 0.5 M to about 2.0 M.

6. The electrochemical cell of any one of embodiments 1-5, wherein the lithium salt is present at a concentration of about 0.5 M to about 1.5 M.

7. The electrochemical cell of any one of embodiments 1-6, wherein the lithium salt is present at a concentration of about 1.0 M to about 1.4 M.

8. The electrochemical cell of any one of embodiments 1-6, wherein the lithium salt is present at a concentration of about 0.5 M, about 0.55 M, about 0.6 M, about 0.65 M, about 0.7 M, about 0.75 M, about 0.8 M, about 0.85 M, about 0.9 M, about 0.95 M, or about 1.5 M.

9. The electrochemical cell of any one of embodiments 1-8, wherein the first solvent is sulfolane.

10. The electrochemical cell of any one of embodiments 1-9, wherein the second solvent is selected from dimethyl carbonate (DMC), ethyl-methyl carbonate (EMC), propyl-methyl carbonate, nitroethyl carbonate, propylene carbonate (PC), diethyl carbonate (DEC), methyl propyl carbonate (MPC), 2,5-dioxahexanedioic acid dimethyl ester, tetrahydrofuran (THF), γ-butyrolactone (GBL), gamma butyl-lactone, fluoroethylene carbonate (FEC), fluoromethyl ethylene carbonate (FMEC), trifluoroethyl methyl carbonate (F-EMC), fluorinated 3-(1,1,2,2-tetrafluoroethoxy)-1,1,2,2-tetrafluoropropane/1,1,2,2-tetrafluoro-3-(1,1,2,2-tetrafluoroethoxy)propane (F-EPE), fluorinated cyclic carbonate (F-AEC), dioxolane, prop-1-ene-1,3-sultone (PES), sulfolane, acetonitrile (ACN), succinonitrile (SCN), pimelonitrile, suberonitrile, propionitrile, propanedinitrile, glutaronitrile (GLN), adiponitrile (ADN), hexanedinitrile, pentanedinitrile, acetophenone, isophorone, benzonitrile, ethyl propionate, methyl propionate, methylene methanedisulfonate, dimethyl sulfate, dimethyl sulfoxide (DMSO), ethyl acetate, methyl butyrate, dimethyl ether (DME), diethyl ether, dioxolane, methyl benzoate, 2-methyl-5-oxooxolane-2-carbonitrile, and combinations thereof.

11. The electrochemical cell of embodiment 10, wherein the second solvent is selected from ethylene carbonate, dimethyl carbonate (DMC), ethyl-methyl carbonate (EMC), propylene carbonate (PC), diethyl carbonate (DEC), fluoroethylene carbonate (FEC), prop-1-ene-1,3-sultone (PES), sulfolane, acetonitrile (ACN), succinonitrile (SCN), glutaronitrile (GLN), adiponitrile (ADN), and combinations thereof.

12. The electrochemical cell of embodiment 10 or 11, wherein the second solvent is ethylene carbonate.

13. The electrochemical cell of any one of embodiments 1-12, wherein the catholyte has a viscosity of less than 15 mPa-s at 20° C.

14. The electrochemical cell of any one of embodiments 1-14, wherein the catholyte has a water content less than 200 ppm, or less than 150 ppm, or less than 100 ppm, or less than 60 ppm, or less than 50 ppm, or less than 40 ppm, or less than 30 ppm, or less than 20 ppm, or less than 10 ppm.

15. The electrochemical cell of any one of embodiments 1-14, wherein the electrochemical cell further comprises a third solvent selected from a linear sulfone.

16. The electrochemical cell of embodiment 15, wherein the linear sulfone is present at 0 to 15 vol %.

17. The electrochemical cell of embodiment 16, wherein the linear sulfone is present at 5 to 10 vol %.

18. The electrochemical cell of any one of embodiments 15-17, wherein the linear sulfone is selected from the group consisting of ethyl methyl sulfone, dimethyl sulfone, dibutyl sulfone, allyl methyl sulfone, ethyl sulfone, dipropyl sulfone, ethyl phenyl sulfone, diethyl sulfate, dimethyl sulfate, and combinations thereof.

19. The electrochemical cell of embodiment 18, wherein the linear sulfone is selected from the group consist of dibutylsulfone, dipropylsulfone, and combinations thereof.

20. The electrochemical cell any one of embodiments 1-19, wherein sulfolane is the solvent present in the catholyte in the largest volume percent.

21. The electrochemical cell any one of embodiments 1-12, wherein the ratio of the second solvent to the first solvent is from 30:70 vol/vol (v/v) to 50:50 v/v.

22. The electrochemical cell any one of embodiments 1-12, wherein the ratio of the second solvent to the first solvent is either 50:50 v/v or 45:55 v/v.

23. The electrochemical cell of embodiment 21, wherein the first solvent is sulfolane, wherein the second solvent is EC, and wherein the ratio of EC:sulfolane is from 30:70 v/v to 50:50 v/v.

24. The electrochemical cell of embodiment 22, wherein the first solvent is sulfolane, wherein, the second solvent is EC, and wherein the ratio of EC:sulfolane is either 50:50 v/v or 45:55 v/v.

25. The electrochemical cell of any one of embodiments 1-24, wherein the strong Lewis acid competitively binds with F, OH, HF, and/or $H_2O$.

26. The electrochemical cell of any one of embodiments 1-25, wherein the strong Lewis acid competitively binds with F, OH, HF, and $H_2O$.

27. The electrochemical cell of any one of embodiments 1-26, wherein the strong Lewis acid competitively binds with the surface of lithium-stuffed garnet.

28. The electrochemical cell of any one of embodiments 1-27, wherein the strong Lewis Acid binds to the surface of lithium-stuffed garnet stronger than it binds to a lithium salt selected from the group consisting of lithium bis(perfluoroethanesulfonyl)imide (LIBETI), bis(trifluoromethane)sulfonimide (LiTFSI), $LiBF_4$, $LiAsF_6$, and lithium bis(fluorosulfonyl)imide (LiFSI).

29. The electrochemical cell of any one of embodiments 1-28, wherein the strong Lewis acid is a F− getter from HF.

30. The electrochemical cell of any one of embodiments 1-29, wherein the strong Lewis acid is an OH− getter from $H_2O$.

31. The electrochemical cell of any one of embodiments 1-30, wherein the strong Lewis acid is a trivalent phosphite, phosphate, or borate compound.

32. The electrochemical cell of any one of embodiments 1-31, wherein the strong Lewis acid is selected from the group consisting of tris(trimethysilyl) phosphite (TTSPi), tris(trimethysilyl) phosphate (TTSP or TTSPa), trimethoxyboroxine ($C_3H_9B_3O_6$, TMOBX), vinylene carbonate (VC), vinyl ethylene carbonate (VEC), methylene methane disulfonate (MMDS), prop-1-ene-1,3 sultone (PES), fluoroethylene carbonate (FEC), LiTFSi, LiBOB, 1,3-propane sultone (PS), succinonitrile, trimethylene sulfate (TMS), triallyl phosphate (TAP), tris(trimethylsilyl) borate (TMSB), tris (pentafluorophenyl) borane (TPFPB), tris(trimethylsilyl) borate, (TMSB) or tris(pentafluorophenyl)borane (TPFPB), and combinations thereof.

33. The electrochemical cell of embodiment 32, wherein the strong Lewis acid is TTSPi and/or TTSP.

34. The electrochemical cell of embodiment 32, wherein the strong Lewis acid is selected from the group consisting TTSPi and TTSP.

35. The electrochemical cell of embodiment 32, wherein the strong Lewis acid is a combination of TMOBX and vinylene carbonate.

36. The electrochemical cell of embodiment 32, wherein the strong Lewis acid is VC.

37. The electrochemical cell of embodiment 32, wherein the strong Lewis acid is a combination of VC and MMDS.

38. The electrochemical cell of embodiment 32, wherein the strong Lewis acid is a combination of VC and/or PES.

39. The electrochemical cell of embodiment 32, wherein the strong Lewis acid is a combination of PES, MMDS, and TTSP.

40. The electrochemical cell of embodiment 32, wherein the strong Lewis acid comprises 2 wt. % PES.

41. The electrochemical cell of embodiment 1, wherein the strong Lewis acid comprises 1 wt % MMDS and 1 wt % TTSPi.

42. The electrochemical cell of embodiment 1, wherein the catholyte comprises 1.4 M $LiPF_6$, 45 v/v EC, 50 v/v sulfolane, and 5 v/v dibutylsulfone.

43. The electrochemical cell of any one of embodiments 1-42, wherein the Lewis acid is present at 0.2 wt % to 5 wt %, where the wt % is based on the total net mass of the salt plus solvent mixture.

44. The electrochemical cell of any one of embodiments 1-42, wherein the lithium-stuffed garnet is characterized by the chemical formula $Li_xLa_3Zr_2O_{12}+yAl_2O_3$, wherein x is from 5.8 to 7.0, and y is 0.1, 0.2, 0.3, 0.4, 0.5, 0.6, 0.7, 0.8, 0.9, or 1.0.

45. The electrochemical cell of any one of embodiments 1-42, wherein the lithium-stuffed garnet is characterized by a formula selected from the group consisting of $Li_4Li_aBM'_CM''_DZr_EO_F$, $Li_ALa_BM'_CM''_DTa_EO_F$, and $Li_4Li_aBM'_CM''_DNb_EO_F$, wherein $4<A<8.5$, $1.5<B<4$, $0≤C<2$, $0≤D<2$; $0<E<2$, $10<F<14$, and wherein M' and M" are each, independently, selected from the group consisting of Al, Mo, W, Nb, Ga, Sb, Ca, Ba, Sr, Ce, Hf, Rb, and Ta.

46. The electrochemical cell of any one of embodiments 1-42, wherein the lithium-stuffed garnet is characterized by a formula selected from the group consisting of $Li_aLa_bZr_c Al_dMe''_eO_f$ wherein $5<a<7.7$; $2<b<4$; $0<c<2.5$; $0<d<2$; $0\leq e<2$, $10<f<14$, and wherein Me'' is a metal selected from the group consisting of Nb, Ta, V, W, Mo, and Sb.

47. The electrochemical cell of any one of embodiments 1-42, wherein the lithium-stuffed garnet is characterized by a formula selected from the group consisting of $Li_aLa_bZr_c Al_dO_f$ wherein $5<a<7.7$; $2<b<4$; $0<c<2.5$; $0<d<2$; $10<f<14$.

48. The electrochemical cell of any one of embodiments 1-42, wherein the lithium-stuffed garnet is characterized by a formula selected from the group consisting of $Li_xLa_3Zr_2O_{12} \cdot 0.35Al_2O_3$ wherein $4<x<8.5$.

49. The electrochemical cell of any one of embodiments 1-42, wherein the lithium-stuffed garnet is characterized by a formula selected from the group consisting of $Li_xLa_3Zr_2O_{12} \cdot 0.5Al_2O_3$ wherein $4<x<8.5$.

50. The electrochemical cell of any one of embodiments 1-42, wherein the lithium-stuffed garnet is characterized by a formula selected from the group consisting of $Li_xLa_3Zr_2O_{12} \cdot 0.65Al_2O_3$ wherein $4<x<8.5$.

51. The electrochemical cell of any one of embodiments 1-42, wherein the lithium-stuffed garnet is characterized by a formula selected from the group consisting of $Li_xLa_3Zr_2O_{12} \cdot Al_2O_3$ wherein $4<x<8.5$ 52. A lithium-stuffed garnet electrolyte with a surface layer of a strong Lewis acid.

53. A lithium-stuffed garnet solid-state electrolyte having at least one surface passivated with a strong Lewis Acid.

54. A lithium-stuffed garnet electrolyte with a surface layer substantially as shown in, or characterized by, any one of FIGS. 7-17.

55. A process for making an electrochemical cell, comprising:
   providing a positive electrode infiltrated with a catholyte, the catholyte comprising:
      a lithium salt;
      a first solvent selected from the group consisting of sulfolane, 1,3-propane sultone, sulfolene, thiophene, and combinations thereof;
      a second solvent; and
      a strong Lewis acid;
   providing a sintered lithium-stuffed garnet solid-state separator; and
   contacting the sintered lithium-stuffed garnet solid-state separator to the positive electrode.

56. The process of embodiment 55, wherein the contacting is between one side of the sintered lithium-stuffed garnet thin film or pellet and one side of the positive electrode.

57. The process of embodiment 55 or 56, further comprising providing a negative electrode comprises lithium metal.

58. The process of embodiment 56, wherein the solid-state electrolyte is a thin film.

59. The process of embodiment 56, wherein the solid-state electrolyte is a sintered lithium-stuffed garnet thin film.

60. The process of any one of embodiments 55-59, wherein the lithium salt is selected from the group consisting of $LiPF_6$, lithium bis(perfluoroethanesulfonyl)imide (LI-BETI), bis(trifluoromethane)sulfonimide (LiTFSI), $LiBF_4$, $LiAsF_6$, lithium bis(fluorosulfonyl)imide (LiFSI), and combinations thereof.

61. The process of any one of embodiments 55-59, wherein the lithium salt is present at a concentration of about 0.5 M to 2.0 M.

62. The process of any one of embodiments 55-59, wherein the lithium salt is present at a concentration of about 0.5 M to about 1.5 M.

63. The process of any one of embodiments 55-62, wherein the lithium salt is present at a concentration of about 1.0 M to about 1.4 M.

64. The process of any one of embodiments 55-62, wherein the lithium salt is present at a concentration of about 0.5 M, about 0.55 M, about 0.6 M, about 0.65 M, about 0.7 M, about 0.75 M, about 0.8 M, about 0.85 M, about 0.9 M, about 0.95 M, or about 1.5 M.

65. The process of any one of embodiments 55-64, wherein the first solvent is sulfolane.

66. The process of any one of embodiments 55-65, wherein the second solvent is selected from dimethyl carbonate (DMC), ethyl-methyl carbonate (EMC), propylmethyl carbonate, nitroethyl carbonate, propylene carbonate (PC), diethyl carbonate (DEC), methyl propyl carbonate (MPC), 2,5-dioxahexanedioic acid dimethyl ester, tetrahydrofuran (THF), γ-butyrolactone (GBL), gamma butyl-lactone, fluoroethylene carbonate (FEC), fluoromethyl ethylene carbonate (FMEC), trifluoroethyl methyl carbonate (F-EMC), fluorinated 3-(1,1,2,2-tetrafluoroethoxy)-1,1,2,2-tetrafluoropropane/1,1,2,2-tetrafluoro-3-(1,1,2,2-tetrafluoroethoxy)propane (F-EPE), fluorinated cyclic carbonate (F-AEC), dioxolane, prop-1-ene-1,3-sultone (PES), sulfolane, acetonitrile (ACN), succinonitrile (SCN), pimelonitrile, suberonitrile, propionitrile, propanedinitrile, glutaronitrile (GLN), adiponitrile (ADN), hexanedinitrile, pentanedinitrile, acetophenone, isophorone, benzonitrile, ethyl propionate, methyl propionate, methylene methanedisulfonate, dimethyl sulfate, dimethyl sulfoxide (DMSO), ethyl acetate, methyl butyrate, dimethyl ether (DME), diethyl ether, dioxolane, methyl benzoate, 2-methyl-5-oxooxolane-2-carbonitrile, and combinations thereof.

67. The process of embodiment 66, wherein the second solvent is selected from ethylene carbonate, dimethyl carbonate (DMC), ethyl-methyl carbonate (EMC), propylene carbonate (PC), diethyl carbonate (DEC), fluoroethylene carbonate (FEC), prop-1-ene-1,3-sultone (PES), sulfolane, acetonitrile (ACN), succinonitrile (SCN), glutaronitrile (GLN), adiponitrile (ADN), and combinations thereof.

68. The process of embodiment 67, wherein the second solvent is selected from ethylene carbonate.

69. The process of any one of embodiments 55-68, wherein the catholyte has a viscosity of less than 15 mPa-s at 20° C.

70. The process of any one of embodiments 55-69, wherein the catholyte has a water content less than 200 ppm, or less than 150 ppm, or less than 100 ppm, or less than 60 ppm, or less than 50 ppm, or less than 40 ppm, or less than 30 ppm, or less than 20 ppm, or less than 10 ppm.

71. The process of any one of embodiments 55-70, wherein the process further comprises a third solvent selected from a linear sulfone.

72. The process of embodiment 71, wherein the linear sulfone is present at 0 to 15 vol %.

73. The process of embodiment 71 or 72, wherein the linear sulfone is present at 5 to 10 vol %.

74. The process of any one of embodiments 72-73, wherein the linear sulfone is selected from the group consisting of ethyl methyl sulfone, dimethyl sulfone, dibutyl sulfone, allyl methyl sulfone, ethyl sulfone, dipropyl sulfone, ethyl phenyl sulfone, diethyl sulfate, dimethyl sulfate, and combinations thereof.

75. The process of any one of embodiments 72-74, wherein the linear sulfone is selected from the group consist of dibutylsulfone, dipropylsulfone, and combinations thereof.

76. The process any one of embodiments 55-75, wherein sulfolane is the solvent present in the catholyte in the largest volume percent.

77. The process any one of embodiments 55-76, wherein the ratio of the second solvent to the first solvent is from 30:70 v/v to 50:50 v/v.

78. The process any one of embodiments 55-75, wherein the ratio of the second solvent to the first solvent is either 50:50 v/v/ or 45:55 v/v.

79. The process of embodiment 55-78, wherein the first solvent is sulfolane, wherein, the second solvent is EC, and wherein the ratio of EC:sulfolane is from 30:70 v/v to 50:50 v/v.

80. The process of embodiment 79, wherein the first solvent is sulfolane, wherein, the second solvent is EC, and wherein the ratio of EC:sulfolane is either 50:50 or 45:55 v/v.

81. The process of any one of embodiments 55-80, wherein the strong Lewis acid competitively binds with F, OH, HF, and/or $H_2O$.

82. The process of any one of embodiments 55-81, wherein the strong Lewis acid competitively binds with F, OH, HF, and $H_2O$.

83. The process of any one of embodiments 55-82, wherein the strong Lewis acid competitively binds with the surface of lithium-stuffed garnet.

84. The process of any one of embodiments 55-83, wherein the strong Lewis Acid binds to the surface of lithium-stuffed garnet stronger than it binds to a lithium salt selected from the group consisting of lithium bis(perfluoroethanesulfonyl)imide (LIBETI), bis(trifluoromethane)sulfonimide (LiTFSI), $LiBF_4$, $LiAsF_6$, and lithium bis(fluorosulfonyl)imide (LiFSI).

85. The process of any one of embodiments 55-84, wherein the strong Lewis acid is a F− getter from HF.

86. The process of any one of embodiments 55-85, wherein the strong Lewis acid is an OH− getter from $H_2O$.

87. The process of any one of embodiments 55-86, wherein the strong Lewis acid is a trivalent phosphite, phosphate, or borate compound.

88. The process of any one of embodiments 55-87, wherein the strong Lewis acid is selected from the group consisting of tris(trimethysilyl) phosphite (TTSPi), tris(trimethysilyl) phosphate (TTSP), trimethoxyboroxine ($C_3H_9B_3O_6$, TMOBX), vinylene carbonate (VC), vinyl ethylene carbonate (VEC), methylene methane disulfonate (MMDS), prop-1-ene-1,3 sultone (PES), fluoroethylene carbonate (FEC), LiTFSi, LiBOB, 1,3-propane sultone (PS), succinonitrile, trimethylene sulfate (TMS), triallyl phosphate (TAP), tris(trimethylsilyl) borate (TMSB), tris(pentafluorophenyl) borane (TPFPB), and combinations thereof.

89. The process of embodiment 88, wherein the strong Lewis acid is TTSPi and/or TTSP.

90. The process of embodiment 88, wherein the strong Lewis acid is selected from the group consisting TTSPi and TTSP.

91. The process of embodiment 87, wherein the strong Lewis acid is a combination of TMOBX and vinylene carbonate.

92. The process of embodiment 87, wherein the strong Lewis acid is VC.

93. The process of embodiment 87, wherein the strong Lewis acid is a combination of VC and MMDS.

94. The process of embodiment 87, wherein the strong Lewis acid is a combination of VC and/or PES.

95. The process of embodiment 87, wherein the strong Lewis acid is a combination of PES, MMDS, and TTSP.

96. The process of embodiment 87, wherein the strong Lewis acid comprises 2 wt. % PES 97. The process of embodiment 55, wherein the strong Lewis acid comprises 1 wt. % MMDS and 1 wt % TTSPi.

98. The process of embodiment 55, wherein the catholyte comprises 1.4 M $LiPF_6$, 45 v/v EC, 50 v/v sulfolane, and 5 v/v dibutylsulfone.

99. The process of any one of embodiments 55-95, wherein the Lewis acid is present at 0.2 wt % to 5 wt %, where the wt % is based on the total net mass of the salt plus solvent mixture.

100. The process of any one of embodiments 55-95, wherein the lithium-stuffed garnet is characterized by the chemical formula $Li_xLa_3Zr_2O_{12}+yAl_2O_3$, wherein x is from 5.8 to 7.0, and y is 0.1, 0.2, 0.3, 0.4, 0.5, 0.6, 0.7, 0.8, 0.9, or 1.0.

101. The process of any one of embodiments 55-95, wherein the lithium-stuffed garnet is characterized by a formula selected from the group consisting of $Li_4La_BM'_CM''_DZr_EO_F$, $Li_4La_BM'_CM''_DTa_EO_F$, and $Li_4La_BM'_CM''_DNb_EO_F$, wherein $4<A<8.5$, $1.5<B<4$, $0 \leq C<2$, $0 \leq D<2$; $0<E<2$, $10<F<14$, and wherein M' and M'' are each, independently, selected from the group consisting of Al, Mo, W, Nb, Ga, Sb, Ca, Ba, Sr, Ce, Hf, Rb, and Ta.

102. The process of any one of embodiments 55-99, wherein the lithium-stuffed garnet is characterized by a formula selected from the group consisting of $Li_aLa_bZr_cAl_d$-$Me''_eO_f$ wherein $5<a<7.7$; $2<b<4$; $0<c<2.5$; $0<d<2$; $0 \leq e<2$, $10<f<14$, and wherein Me'' is a metal selected from the group consisting of Nb, Ta, V, W, Mo, and Sb.

103. The process of any one of embodiments 55-99, wherein the lithium-stuffed garnet is characterized by a formula selected from the group consisting of $Li_aLa_bZr_cAl_dO_f$ wherein $5<a<7.7$; $2<b<4$; $0<c<2.5$; $0<d<2$; $10<f<14$.

104. The process of any one of embodiments 55-99, wherein the lithium-stuffed garnet is characterized by a formula selected from the group consisting of $Li_xLa_3Zr_2O_{12} \cdot 0.35Al_2O_3$ wherein $4<x<8.5$.

105. The process of any one of embodiments 55-99, wherein the lithium-stuffed garnet is characterized by a formula selected from the group consisting of $Li_xLa_3Zr_2O_{12} \cdot 0.5Al_2O_3$ wherein $4<x<8.5$.

106. The process of any one of embodiments 55-99, wherein the lithium-stuffed garnet is characterized by a formula selected from the group consisting of $Li_xLa_3Zr_2O_{12} \cdot 0.65Al_2O_3$ wherein $4<x<8.5$.

107. The process of any one of embodiments 55-99, wherein the lithium-stuffed garnet is characterized by a formula selected from the group consisting of $Li_xLa_3Zr_2O_{12} \cdot Al_2O_3$ wherein $4<x<8.5$.

108. The lithium-stuffed garnet electrolyte of embodiment 52 or any one of embodiments 1-54, wherein the lithium-stuffed garnet electrolyte is in an electrochemical cell and in contact with a positive electrode having a catholyte in the positive electrode.

109. A method of using an electrochemical cell of any one of embodiments 1-54, comprising holding the electrochemical cell at a voltage of 3.9 V (v. Li) or greater.

110. The method of embodiment 109, wherein the voltage is less than 5V (v. Li).

111. The method of embodiment 109, further comprising charging and discharging the electrochemical cell between 0 and 4.5 V.

112. An electrochemical cell made by the process of embodiments 55-107.

113. A rechargeable battery comprising the electrochemical cell of any one of embodiments 1-54, or 112 or the lithium-stuffed garnet electrolyte of embodiment 108.

114. An electric vehicle comprising the rechargeable battery of embodiment 113.

IX. Examples

Reagents, chemicals, and materials were commercially purchased unless specified otherwise to the contrary. Pouch cell containers were purchased from Showa Denko. The Electrochemical potentiostat used was an Arbin potentiostat. Electrical impedance spectroscopy (EIS) was performed with a Biologic VMP3, VSP, VSP-300, SP-150, or SP-200. Electron microscopy was performed in a FEI Quanta SEM, a Helios 600i, or a Helios 660 FIB-SEM. XRD was performed in a Bruker D8 Advance ECO or a Rigaku MiniFlex 2 with Cu K-α radiation, 6 mm slit width, at a scan time of 76 ms per step or 0.4 seconds per step, and at room temperature. Viscosity is measured by Rheometry on an Anton Parr Modular Compact Rheometer MCR302.

Milling was performed using a Retsch PM 400 Planetary Ball Mill. Mixing was performed using a Fischer Scientific vortex mixer, a Flaktek speed mixer, or a Primix filmix homogenizer. Casting was performed on a TQC drawdown table. Calendering was performed on an IMC calendar. Light scattering was performed on a Horiba, model: Partica, model no: LA-950V2, general term: laser scattering particle size distribution analyzer.

X-ray photoelectron spectroscopy (XPS) measurements were performed on a Thermo Scientific Model K-Alpha 1 XPS instrument. Monochromatic and Al X-ray source with X-ray energy of 1486.6 eV was used with a spot size of 400 m. The base pressure when the measurement was conducted is $2*10^{-9}$ mbar or below.

Example 1: Making and Testing Catholytes

A series of mixtures were prepared and the viscosity of each mixture analyzed.

In one series, ethylene carbonate and sulfolane was mixed in volumetric ratios of 1:9, 3:7, and 5:5, respectively. The viscosity for each sample in this series is shown in the left panel of FIG. 1. At 20° C. and a shear rate of 1000 [1/s], the viscosity of ethylene carbonate:sulfolane solutions range from 5 to 11 mPa-s.

In a second series, sulfolane was mixed with ethyl methyl sulfone in volumetric ratios of 7:3, 8:2, and 9:1, respectively. The viscosity for each sample in this series is shown in the right panel of FIG. 1. At 20° C. and a shear rate of 1000 [1/s], the viscosity of ethyl methyl sulfone:sulfolane solutions were less than 15 mPa-s.

Example 2: Making an Electrochemical Cell Having Catholytes with and without Additives This Example demonstrates a process for making an electrochemical cell.

Electrochemical cells were assembled in Swagelok cells.

Three catholyte solutions (Catholyte Solution A, Catholyte Solution B, and Catholyte Solution C) were prepared. The solutions were first mixed and then the lithium salts and additives were added last. Additives are reported on a per mass basis, with respect to the mass of the catholyte solution into which the additives are added. Solvent components to solutions are reported on a per volume basis, with respect to the total volume of the catholyte solution.

Catholyte Solution A included 45 vol % ethylene carbonate and 55 vol % sulfolane. The catholyte also included 1M $LiPF_6$.

Catholyte Solution B included 45 vol % ethylene carbonate and 55 vol % sulfolane. The catholyte also included 1M $LiPF_6$ and 0.3 weight percent (wt %) tris(trimethysilyl) phosphite (TTSPi).

Catholyte Solution C included 5 volume percent (vol %) dipropyl sulfone with 45 vol % ethylene carbonate and 50 vol % sulfolane. The catholyte also included 1M $LiPF_6$ and 0.3 weight percent (wt %) TTSPi.

A positive electrode was prepared. The positive electrode had 4 mAh*cm² loading on aluminum foil; the active region was 90-120 μm thick and had approximately 70 vol % active material of NMC 622 with particle size $d_{50}$ 6-20 μm. The cathode was calendered and infiltrated with a Catholyte Solutions A, B, or C.

Lithium-stuffed garnet thin film solid-state electrolyte separators were prepared. Certain procedures in US Patent Application Publication No. US20170214084A1, which published May 8, 2018, entitled ANNEALED GARNET ELECTROLYTE SEPARATORS, the entire contents of which are herein incorporated by reference in their entirety for all purposes, were employed. Lithium-Stuffed Garnet Powder was prepared. Calcined lithium-stuffed garnet powder was produced by the following series of steps. First, lithium hydroxide (LiOH), aluminum nitrate [$Al(NO_3)_3 9H_2O$], zirconia ($ZrO_2$), and lanthanum oxide ($La_2O_3$) were massed (i.e., weighed) and mixed into a combination wherein the molar ratio of the constituent elements was $Li_{7.1}Zr_2La_3O_{12}+0.5Al_2O_3$. This combination was mixed and milled, using wet-milling techniques and $ZrO_2$ milling media, until the combination had a $d_{50}$ particle size of 100 nm-5 μm. Also included with the milling media was a Rhodaline™ dispersant. The milled combination of reactants was separated from the milling media after milling. The $d_{50}$ particle size of the milled reactants was assessed. The separated milled reactants was then placed in an alumina crucible and calcined at about nine-hundred degrees Celsius (900° C.) for approximately six (6) hours in an oven with a controlled oxidizing atmosphere in contact with the calcining reactants. The calcination process burned and/or combusted residual solvents as well as the dispersant, binder, and surfactant. The calcination caused the inorganic reactants to react to form the lithium-stuffed garnet. The calcined product was removed from the alumina crucibles after it cooled to room temperature. The product was characterized by a variety of analytical techniques, including x-ray powder diffraction (XRD) and scanning electron microscopy. This product is referred to as calcined lithium-stuffed garnet and has an empirical formula of approximately was $Li_{7.1}Zr_2La_3O_{12}+0.5Al_2O_3$.

The milled and calcined product were then mixed with a plasticizer (S160), a binder (B72). In a second series, an acrylic, polyvinylbuturate (PVB), or polyvinylacetate (PVA) was used. The solvent was a mixture of dimethyl ether/tetrahydrofuran (DME/THF). The organic components constituted 10-20 weight percent of the slurry. The remainder of the slurry was the solid calcined lithium-stuffed garnet having the empirical formula of approximately $Li_{7.1}Zr_2La_3O_{12}+0.5Al_2O_3$.

The slurry mixture was then tape casted to produce 10 µm-200 µm thin films of calcined but unsintered lithium-stuffed garnet in combination with surfactants, binders, plasticizers, and dispersants.

The tape cast thin films were allowed to dry. These dry calcined by unsintered thin films are referred to as green films.

The green films were placed between garnet ceramic setter plates and calcined in an oven filled with an Argon:$H_2O$ mixture (calcination step) followed by an Argon:$H_2$ mixture and heated to 1200° C. for six (6) hours (sintering step). Setter plates were used as substantially set forth in International PCT Patent Publication Application No. WO2016168691A1, which published Oct. 20, 2016, entitled LITHIUM STUFFED GARNET SETTER PLATES FOR SOLID ELECTROLYTE FABRICATION, the entire contents of which are herein incorporated by reference in their entirety for all purposes. The setter plates were made primarily of lithium-stuffed garnet formed into a setter. In some samples, the green films were sintered at 1125° C. for 6 hours in an oven with a controlled atmosphere in contact with the calcining reactants.

Full Cells

Three full cells were made:
a. One positive electrode was soaked in Catholyte Solution A, positioned on top of a lithium-stuffed garnet solid-state separator, and sealed in a pouch cell.
b. One positive electrode was soaked in Catholyte Solution B, positioned on top of a lithium-stuffed garnet solid-state separator, and sealed in a pouch cell.
c. One positive electrode was soaked in Catholyte Solution C, positioned on top of a lithium-stuffed garnet solid-state separator, and sealed in a pouch cell.

Lithium metal negative electrodes were evaporated onto the lithium-stuffed garnet solid-state separator on the side opposite of each positive electrode. A nickel foil negative current collector was attached to the anode.

The electrochemical stack was vacuum sealed inside a pouch cell with tabs leading outside the cell. The cell was placed under pressure. The full cells were sealed inside Mylar, heat-sealed pouch cells.

The electrochemical cells were held at 4.3V (v. Li) with a trickle current for up to 30 days at 45° C. As shown in FIG. 2, the median charge ASR was the lowest for Catholyte Solution C, containing electrolytes with 2 wt % TTSPi and a 5 vol % linear sulfone (dipropyl sulfone) co-solvent. The electrochemical cell without the TTSPi additive (Catholyte Solution A) was observed to have an ASR growth up to 30× the initial ASR. Catholyte Solution B had median charge ASR in between that of Catholyte Solutions A and C.

Example 3: Making Symmetric Electrochemical Cells

Symmetric Cells

Symmetric electrochemical cells were prepared by stacking positive electrodes, soaked in Catholyte Solutions A, B, or C, on top of a lithium-stuffed garnet solid-state separator.

Figure 3:
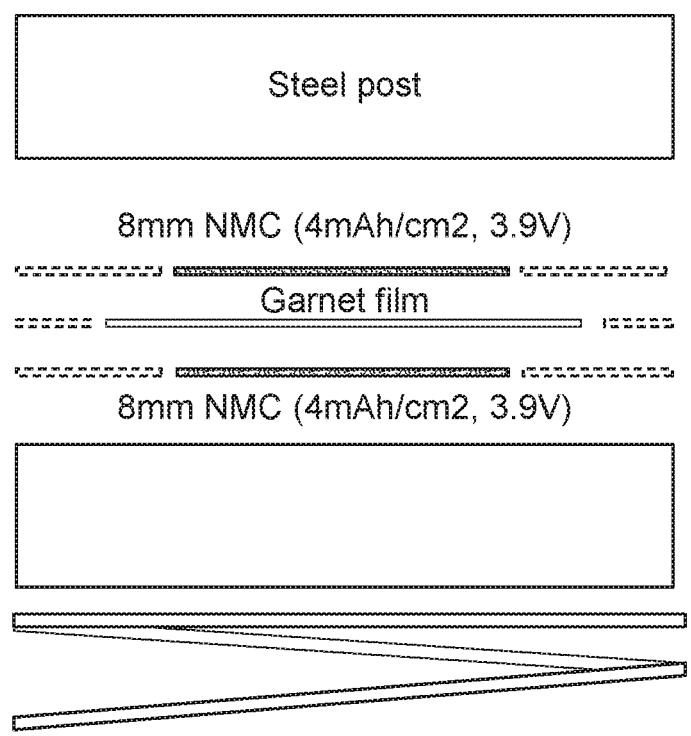
FIG. 3 shows a symmetric electrochemical cell tested in Example 2.

The electrochemical stack was vacuum sealed inside a Swagelok cell with posts leading outside the cell. FIG. 3 shows the configuration in which these symmetric cells were assembled. The cells are also placed under pressure. In this configuration, the impedance of the cathode-electrolyte-garnet interface can be isolated within the Swagelok cell. The symmetric stack of NMC-garnet-NMC allowed for the measurement of the interfacial charge transfer that was deconvoluted from other impedance responses observed in full cells. The positive electrode was charged to 3.9V before building into the stack. 3.9V represents approximately 50% state of charge of the cathode, and allows the examined cell to differentiate the positive electrode charge transfer resistance from the garnet charge transfer.

Figure 4:
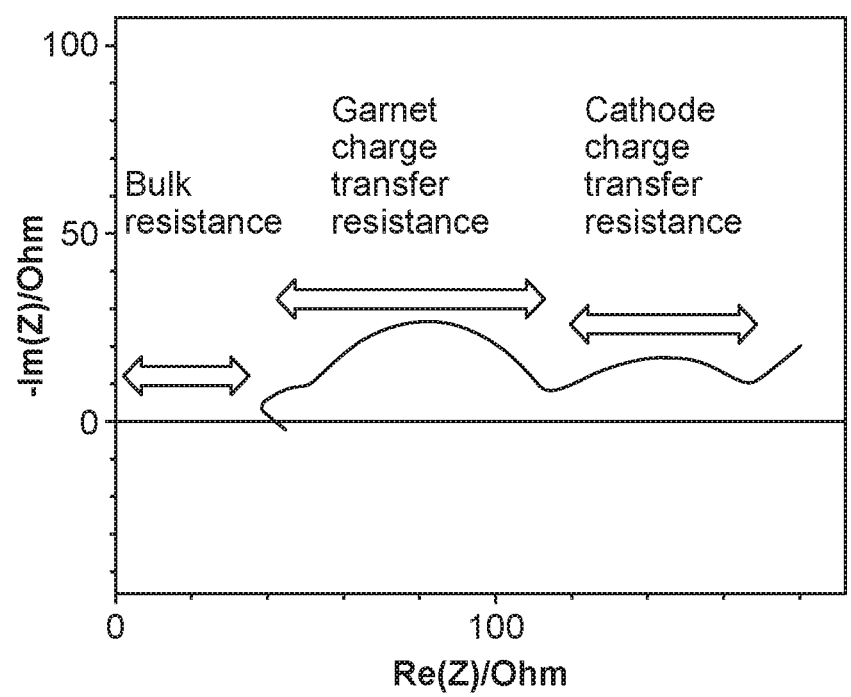
FIG. 4 shows an Electrical Impedance Spectroscopy (EIS) plot, as described in Example 2, from a symmetric Swagelok cell.

Electrical impedance spectroscopy was performed on the electrochemical cells. The results are shown in FIG. 4. The EIS scan of a symmetric Swagelok cell allows for facile measurement of the garnet charge transfer resistance.

FIG. 5 shows ASR results of a series of symmetric electrochemical cells were prepared. The concentration of catholytes in the positive electrode included a series of additives at 0.3 wt %. Certain series of test catholytes included about 50 ppm HF.

Without being bound by theory, it is believed that the major mode of ASR growth is related to increases in the garnet surface charge transfer, as measured by impedance spectroscopy. The TTSPi additive may mitigate a mode of ASR growth caused by surface fluorination of the lithium-stuffed garnet. Fluorine anions may be introduced into the lithium-stuffed garnet by any one or more of the anionic series of $PF_6^-$ decomposition products. The surface species on the lithium-stuffed garnet may include LiF, $AlF_3$, or other metal fluorides derived from the degradation of cell components and which result in high impedance, i.e., ASR growth.

Figure 6:
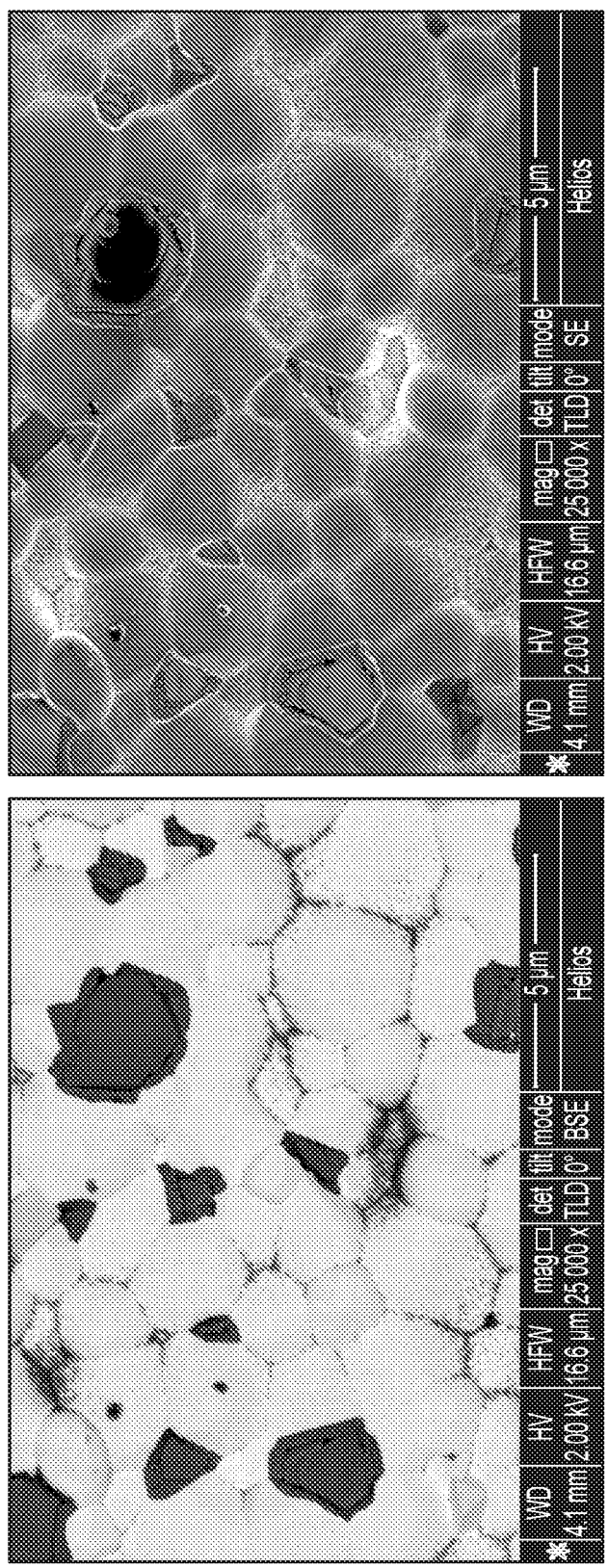
FIG. 6 shows scanning electron microscopy (SEM) images for a lithium-stuffed garnet solid-state separators exposed to catholytes having a high amount of HF, as described in Example 4.

Example 4: Surface Analysis of Lithium-Stuffed Garnet Separators in Electrochemical Cells with Catholytes Having or not Having Additives A lithium-stuffed garnet surface was soaked in an catholyte with elevated levels of HF. The electrolyte was a solution including ECS in a ratio of 3:7 EC:Sulfolane, 1M $LiPF_6$, and an additional 50 ppm of HF. The surface showed evidence of acid etching along grain boundaries, using both secondary electron and backscattering SEM imaging techniques. These SEM results are shown in FIG. 6.

Without wishing to be bound by theory, this etching may be the result of a reaction between HF and the lithium-stuffed garnet and may be responsible for the increase in ASR observed in FIG. 2 when additives are absent and unable to suppress fluorination reactions.

This example shows that fluorination of the surface of lithium-stuffed garnet occurs and may result in detrimental electrochemical performance.

Example 5: Surface Analysis of Lithium-Stuffed Garnet Separators in Electrochemical Cells with Catholytes Having or not Having Additives This example shows surface analysis data for the surface chemistry layer that formed on the lithium-stuffed garnet solid-state separators when exposed to the catholyte solutions having additives. The Example also shows surface analysis data for the damage done on the lithium-stuffed garnet solid-state separators when exposed to the catholyte solutions not having additives and at high voltages.

Electrochemical cells were prepared as in Example 2 except that the cells were assembled in pouch cells and not in Swagelok cells.

The lithium-stuffed garnet solid-state separators were removed from cycled cell after about 20 days, in which the cells were held at 4.3V and 45° C.

Figure 7:
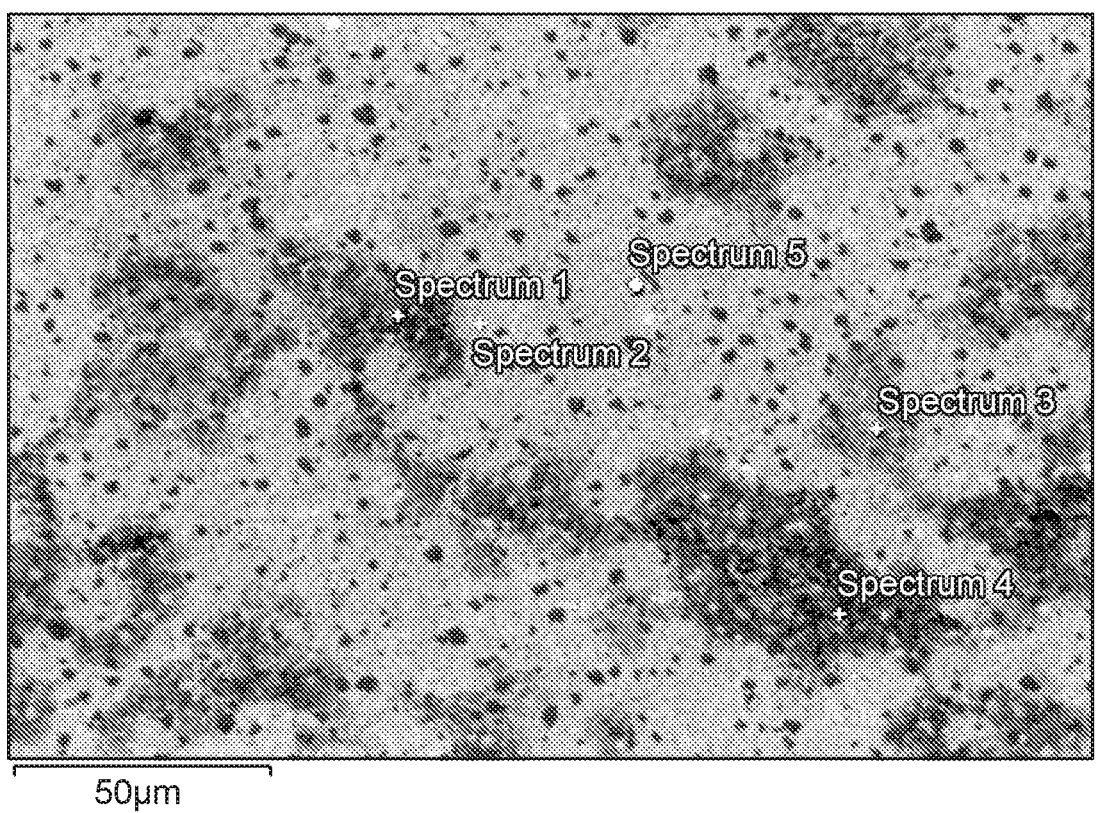
FIG. 7 shows a scanning electron microscopy (SEM) image with energy dispersive elemental analysis (EDS) elemental spatial mapping of a lithium-stuffed garnet solid-state separator, as described in Example 5.
Figure 8:
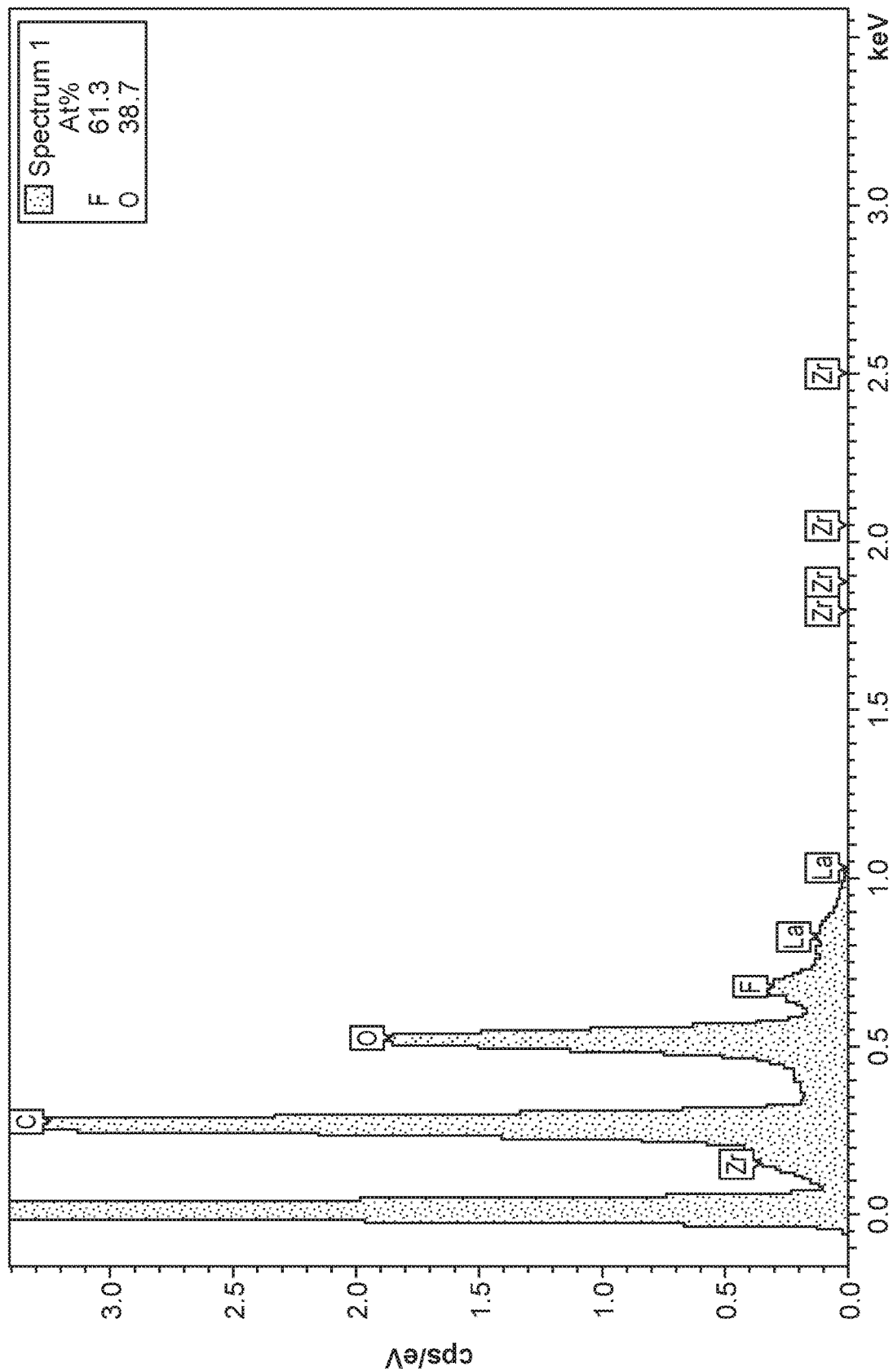
FIG. 8 shows energy dispersive elemental analysis (EDS) of the sample observed in FIG. 7.
Figure 9:
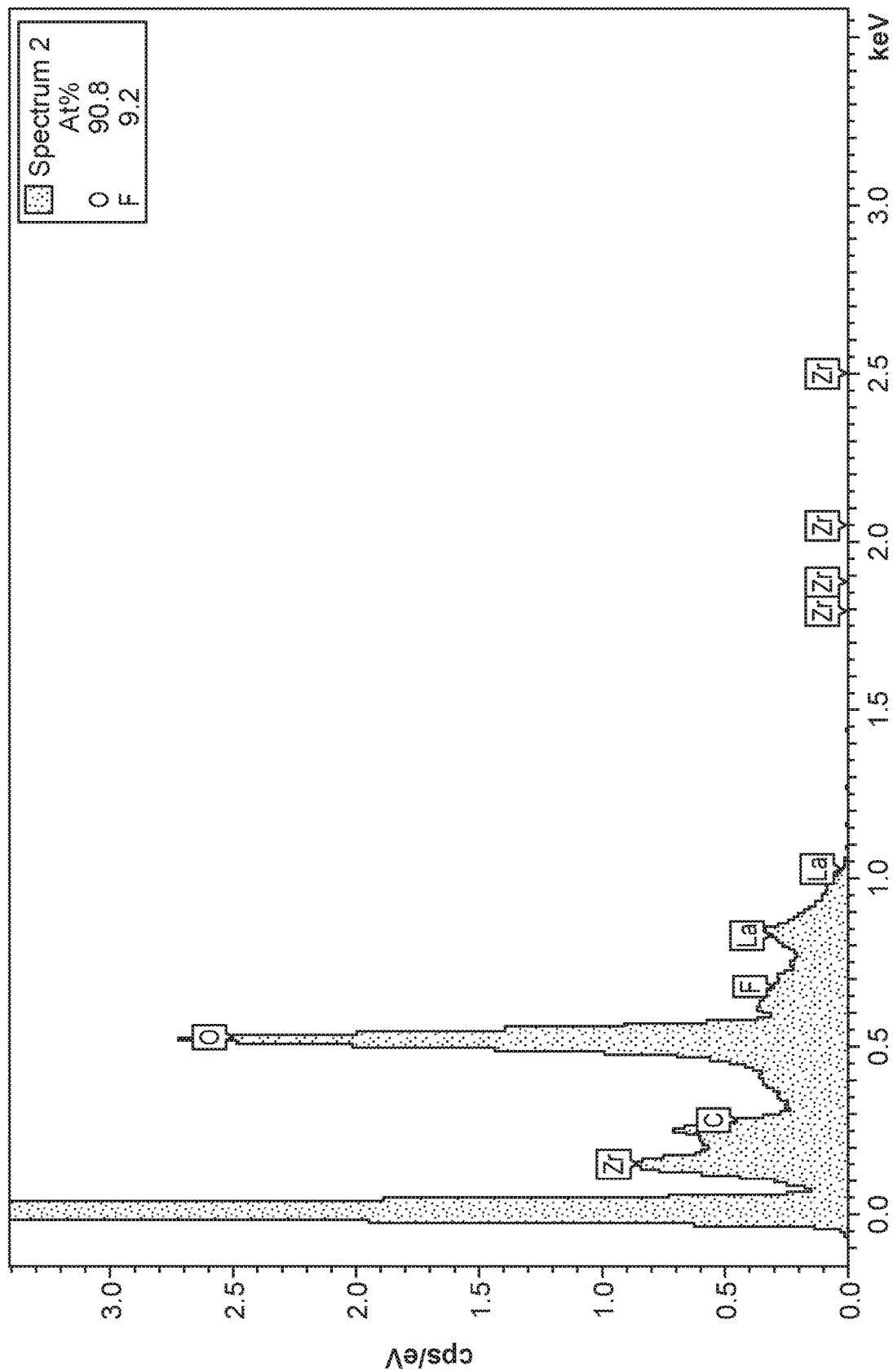
FIG. 9 shows energy dispersive elemental analysis (EDS) of the sample observed in FIG. 7 but at a different location than that analyzed in FIG. 8.

One electrochemical cell included the TTSPi additive. The electrolyte with the TTSPi additive was a solution of ECS in a EC:Sulfolane ratio of 45:55 vol/vol, 1.4 M $LiPF_6$, and 2 wt % TTSPi. This sample is shown in FIG. 7. Regions of high contrast are observed between darker and brighter areas, which indicates differences in thickness of the chemical layer at the garnet film interface.

Images were then collected at low incident electron beam energy of 1 kV to enhance chemical speciation of the interface. The majority of the area is bright (corresponding to the energy-dispersive electron spectra) and contains almost no carbon or fluorine in the surface layer. See FIGS. 8-9. Instead, the spectrum was dominated by the O, La and Zr elements, presumably from the garnet single ion conductor. This confirms that the interface between the liquid and solid electrolytes is very thin in the bright regions. This is likely what allows for fast lithium conduction at this interface. The patchy dark regions are comprised of a carbon rich layer.

Figure 10:
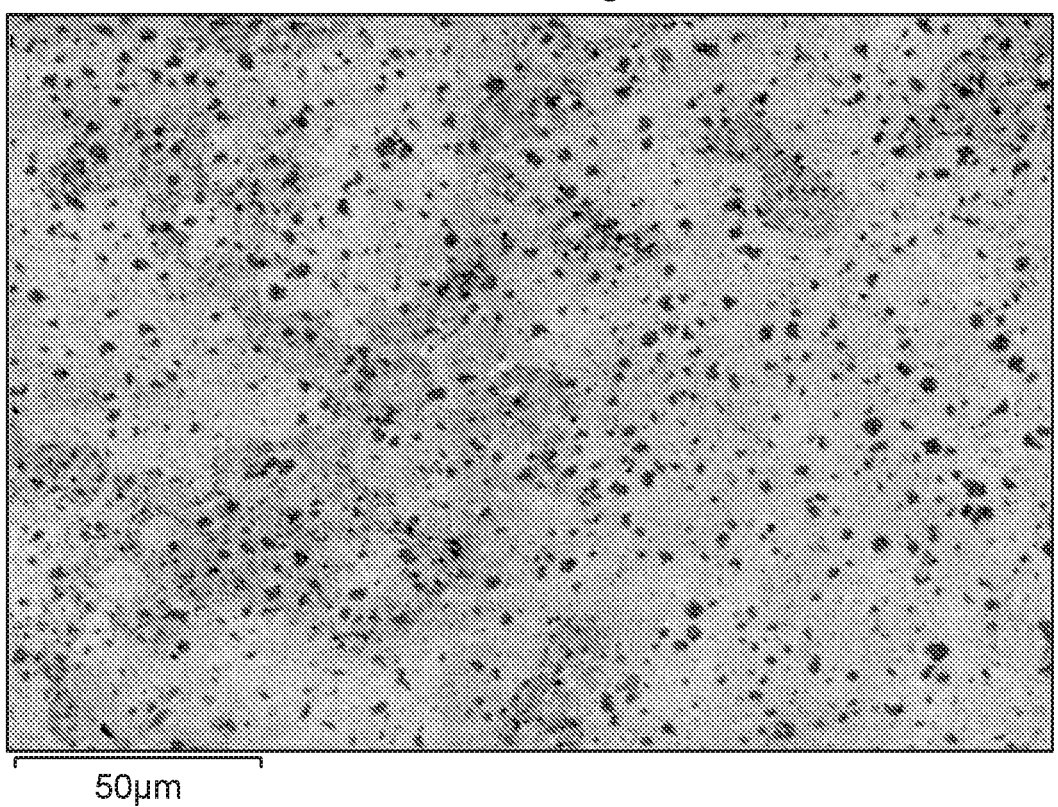
FIG. 10 shows a scanning electron microscopy (SEM) image of a lithium-stuffed garnet solid-state separator, as described in Example 5.
Figure 11:
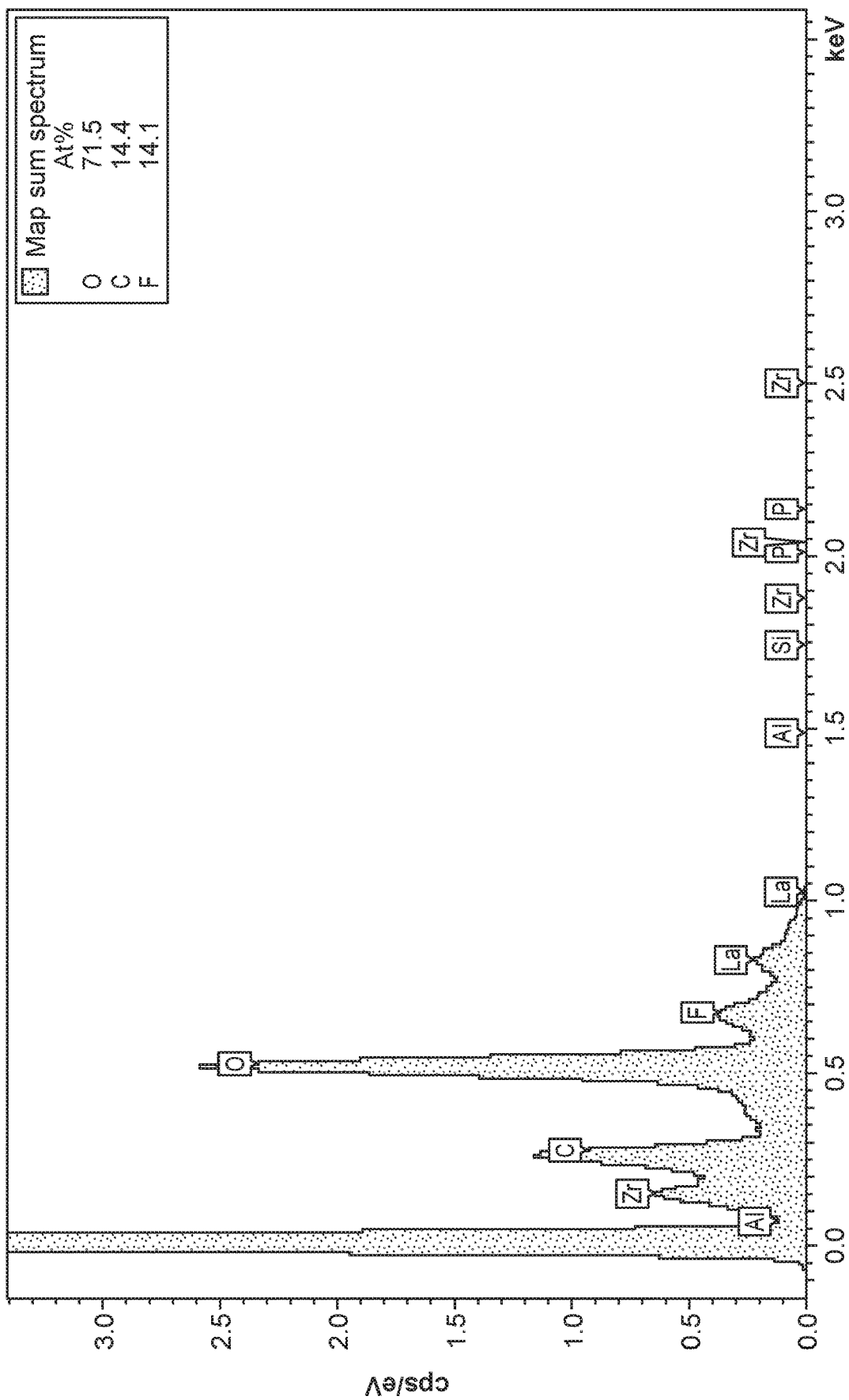
FIG. 11 shows energy dispersive elemental analysis (EDS) of the sample observed in FIG. 10.
Figure 12:
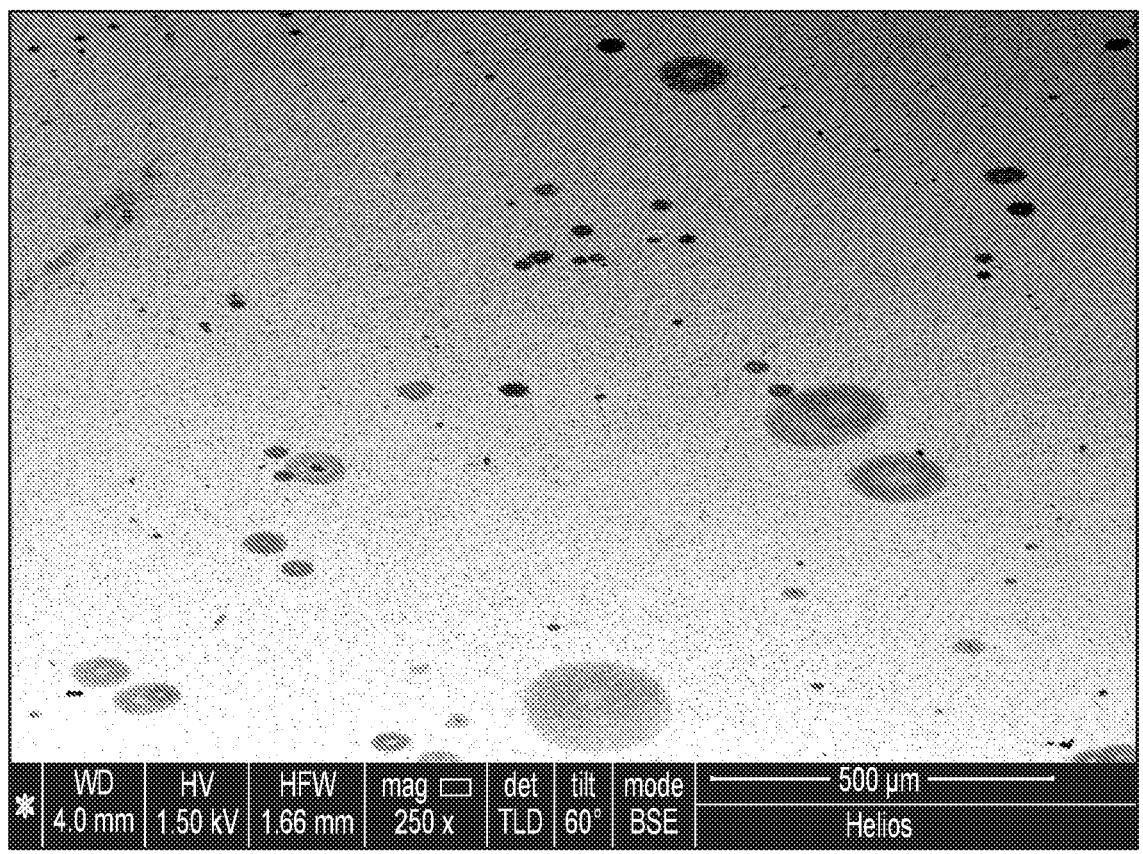
FIG. 12 shows a scanning electron microscopy (SEM) image of a lithium-stuffed garnet solid-state separator, as described in Example 5.
Figure 13:
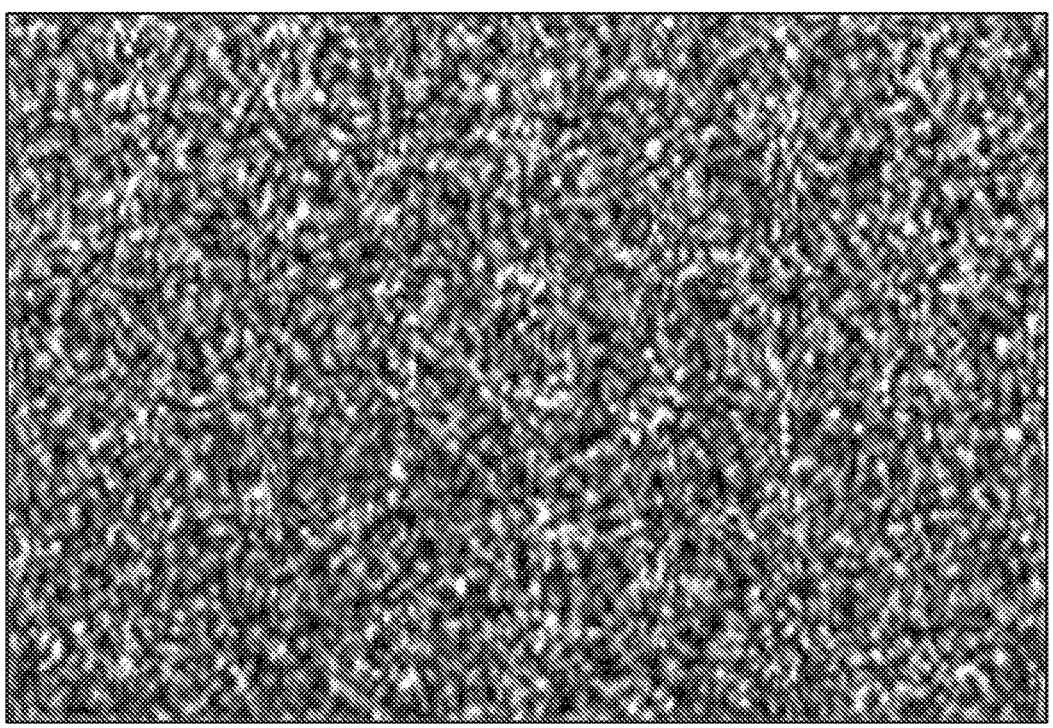
FIG. 13 shows energy dispersive elemental analysis (EDS) of the sample observed in FIG. 12.
Figure 14:
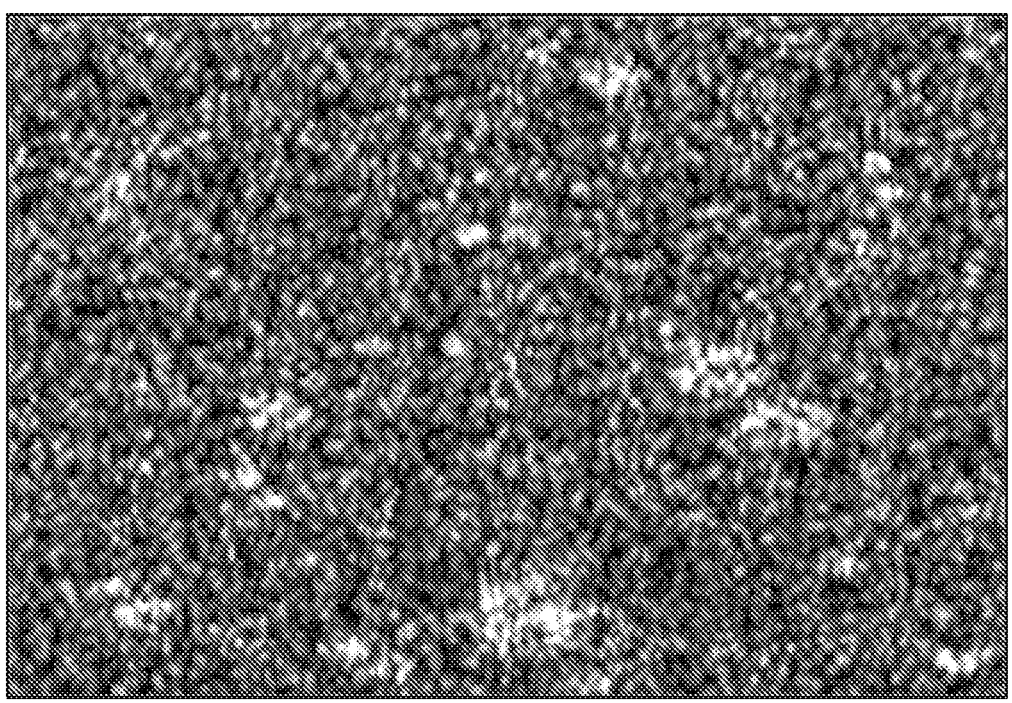
FIG. 14 shows energy dispersive elemental analysis (EDS) of the sample observed in FIG. 12 but at a different location than that analyzed in FIG. 13.
Figure 15:
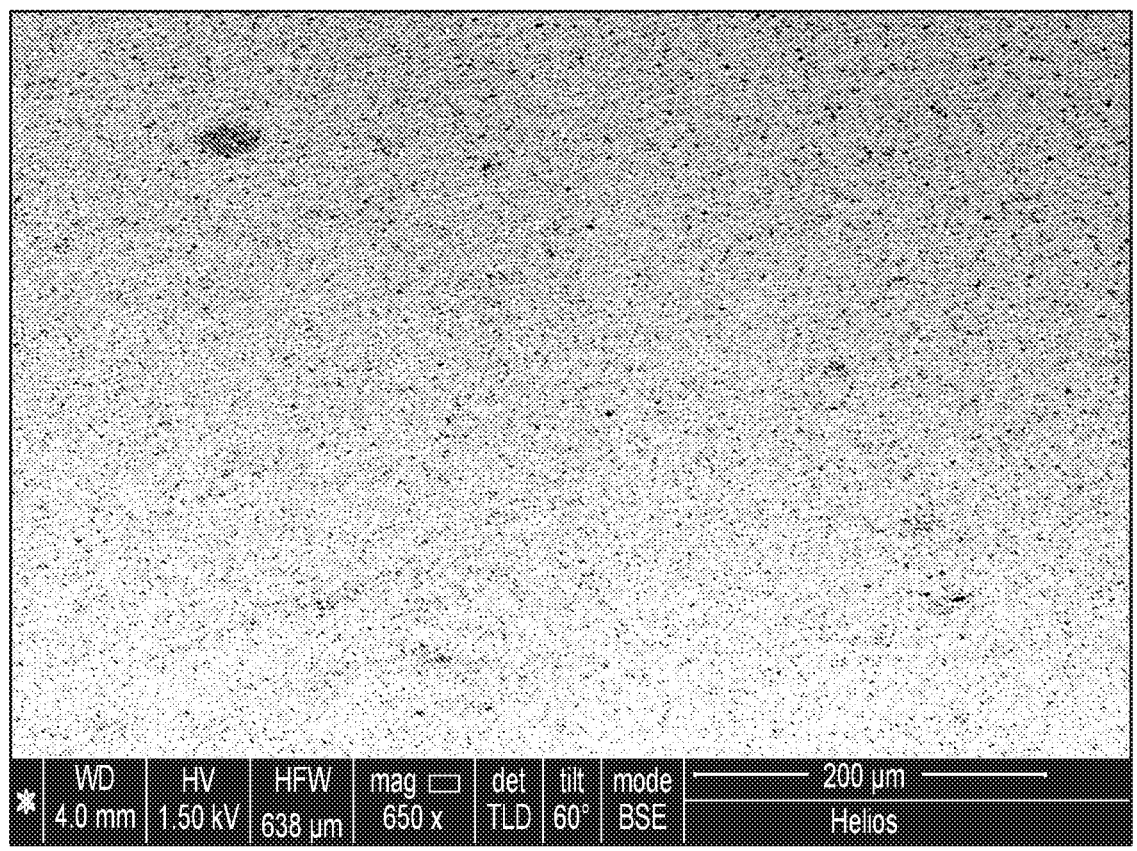
FIG. 15 shows a scanning electron microscopy (SEM) image of a lithium-stuffed garnet solid-state separator, as described in Example 5.
Figure 16:
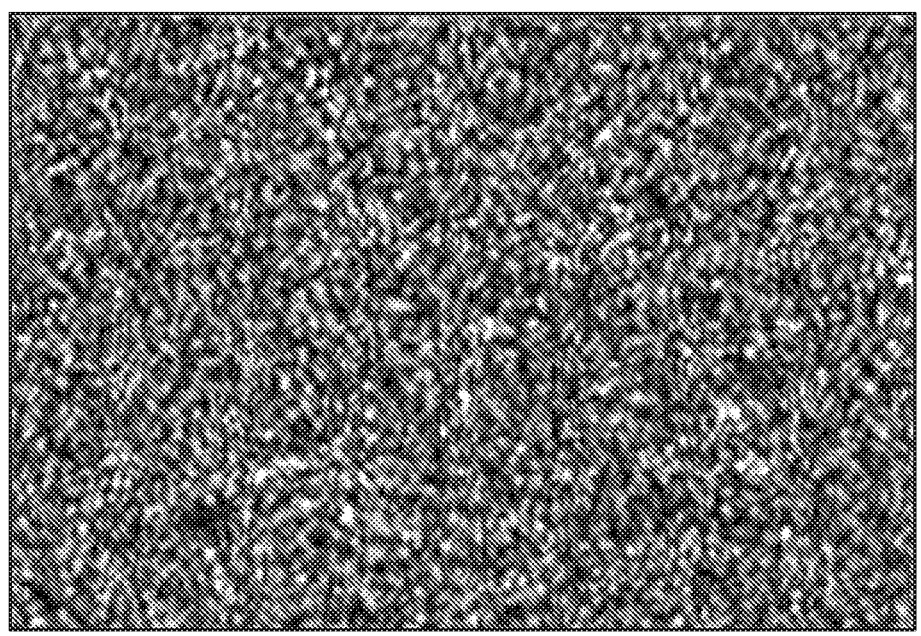
FIG. 16 shows energy dispersive elemental analysis (EDS) of the sample observed in FIG. 15.
Figure 17:
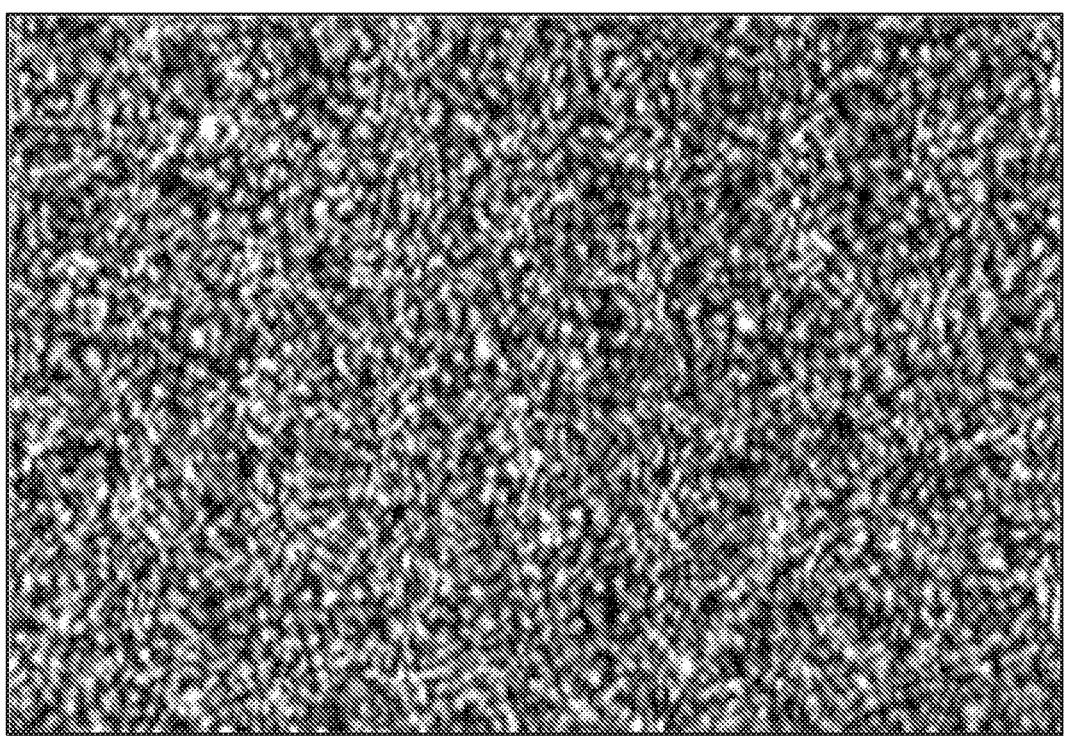
FIG. 17 shows energy dispersive elemental analysis (EDS) of the sample observed in FIG. 15 but at a different location than that analyzed in FIG. 16.

One electrochemical cell did not include the TTSPi additive. This control without additive was a solution of ECS in a EC:Sulfolane ratio of 45:55 vol/vol and 1.4 M LiPF$_6$. FIG. 10 shows an image of this sample. Low contrast between the darker and brighter areas indicates a more uniform chemical composition at the film interface. Images were collected at low incident electron beam energy of 1 kV to enhance chemical speciation of the interface. FIG. 11 shows that the film interface is uniformly rich in carbon and fluoride from the decomposition of electrolyte salt and solvent.

In another round of experiments, lithium-stuffed garnet solid-state separators, from newly prepared electrochemical cells following the steps in Example 2, were removed from cycled cell after about 20 days, in which the cells were held at 4.25 V (v. Li) and 45° C.

The catholyte did not contain any additives to protect the interface from damage at high oxidation potential. The catholyte included 3:7 EC:Sulfolane+1M LiPF$_6$. The white and dark contrast regions correspond to differences in surface layer chemistry homogeneity. See FIG. 12. Images were collected at low incident electron beam energy of 1 kV to enhance chemical speciation of the interface. See FIGS. 13-14.

In another round of experiments, lithium-stuffed garnet solid-state separators, from newly prepared electrochemical cells following the steps in Example 2, were removed from cycled cell after about 20 days, in which the cells were held at 4.05 V (v. Li) and 45° C.

The catholyte did not contain any additives to protect the interface from damage at high oxidation potential. The image does not show dramatic differences in contrast indicating the surface chemistry layer is more homogenous than cells that were charged to higher oxidation potentials. See FIG. 15. Images were collected at low incident electron beam energy of 1 kV to enhance chemical speciation of the interface. See FIGS. 16-17.

The embodiments and examples described above are intended to be merely illustrative and non-limiting. Those skilled in the art will recognize or will be able to ascertain using no more than routine experimentation, numerous equivalents of specific compounds, materials and procedures. All such equivalents are considered to be within the scope and are encompassed by the appended claims.

What is claimed is:

1. An electrochemical cell comprising, a positive electrode, a negative electrode, and a solid-state electrolyte therebetween;
    wherein the positive electrode comprises a catholyte comprising:
        a lithium salt selected from the group consisting of LiPF$_6$, lithium bis(oxalato)borate (LIBOB), lithium bis(perfluoroethanesulfonyl)imide (LiIBETI), lithium bis(trifluoromethane)sulfonimide (LiTFSI), LiBF$_4$, LiAsF$_6$, lithium bis(fluorosulfonyl)imide (LiFSI), and combinations thereof;
        a first solvent selected from the group consisting of sulfolane, 1,3-propane sultone, sulfolene, thiophene, and combinations thereof;
        a second solvent; and
        a strong Lewis acid;
    wherein the lithium salt is present at a concentration of about 0.5 M to about 2.0 M;
    wherein the catholyte has a viscosity of less than 15 mPa-s at 20° C.;
    wherein the catholyte has a water content less than 200 ppm;
    wherein the catholyte is a eutectic mixture of solvents that melts at less than 0° C.;
    wherein the catholyte has a lithium ion conductivity of greater than $10^{-5}$ S/cm at room temperature;
    wherein the solid-state electrolyte comprises a lithium-stuffed garnet thin film with a thickness of 10 nm to 500 um; and
    wherein the negative electrode comprises lithium metal.

2. The electrochemical cell of claim 1, wherein the ratio of the second solvent to the first solvent is from 30:70 vol/vol to 50:50 v/v.

3. The electrochemical cell of claim 1, wherein the strong Lewis acid is a trivalent phosphite, phosphate, or borate compound.

4. The electrochemical cell of claim 3, wherein the strong Lewis acid is selected from the group consisting of TTSPi and TTSP.

5. The electrochemical cell of claim 1, wherein the strong Lewis acid comprises 1 wt % MMDS and 1 wt % TTSPi.

6. The electrochemical cell of claim 1, wherein the strong Lewis acid is present at 0.2 wt % to 5 wt %, where the wt % is based on the total net mass of the salt plus solvent mixture.

7. The electrochemical cell of claim 1, wherein the lithium-stuffed garnet is characterized by a formula selected from the group consisting of $Li_A La_B M'_C M''_D Zr_E O_F$, $Li_A La_B M'_C M''_D Ta_E O_F$, and $Li_A La_B M'_C M''_D Nb_E O_F$, wherein $4<A<8.5$, $1.5<B<4$, $0 \leq C<2$, $0 \leq D<2$; $0<E<2$, $10<F<14$, and wherein M' and M'' are each, independently, selected from the group consisting of Al, Mo, W, Nb, Ga, Sb, Ca, Ba, Sr, Ce, Hf, Rb, and Ta.

8. The electrochemical cell of claim 1, wherein the lithium-stuffed garnet is characterized by a formula selected from the group consisting of $Li_a La_b Zr_c Al_d Me''_e O_f$ wherein $5<a<7.7$; $2<b<4$; $0<c<2.5$; $0<d<2$; $0 \leq e<2$, $10<f<14$, and wherein Me'' is a metal selected from the group consisting of Nb, Ta, V, W, Mo, and Sb.

9. The electrochemical cell of claim 1, wherein the lithium salt is LiPF$_6$.

10. The electrochemical cell of claim 1, wherein the lithium salt is lithium bis(perfluoroethanesulfonyl)imide (LIBETI).

11. The electrochemical cell of claim 1, wherein the lithium salt is lithium bis(trifluoromethane)sulfonimide (LiTFSI).

12. The electrochemical cell of claim 1, wherein the lithium salt is LiBF$_4$.

13. The electrochemical cell of claim 1, wherein the lithium salt is LiAsF$_6$.

14. The electrochemical cell of claim 1, wherein the lithium salt is lithium bis(fluorosulfonyl)imide (LiFSI).

15. A process for making an electrochemical cell, comprising:
- providing a positive electrode infiltrated with a catholyte, the catholyte comprising:
  - a lithium salt selected from the group consisting of $LiPF_6$, lithium bis(oxalato)borate (LIBOB), lithium bis(perfluoroethanesulfonyl)imide (LiBETI), lithium bis(trifluoromethane)sulfonimide (LiTFSI), $LiBF_4$, $LiAsF_6$, lithium bis(fluorosulfonyl)imide (LiFSI), and combinations thereof;
  - a first solvent selected from the group consisting of sulfolane, 1,3-propane sultone, sulfolene, thiophene, and combinations thereof;
  - a second solvent; and
  - a strong Lewis acid;
- wherein the lithium salt is present at a concentration of about 0.5 M to about 2.0 M;
- wherein the catholyte has a viscosity of less than 15 mPa-s at 20° C.;
- wherein the catholyte has a water content less than 200 ppm;
- wherein the catholyte is a eutectic mixture of solvents that melts at less than 0° C.;
- wherein the catholyte has a lithium ion conductivity of greater than $10^{-5}$ S/cm at room temperature;
- providing a sintered lithium-stuffed garnet solid-state separator thin film with a thickness of 10 nm to 500 um; and
- contacting the sintered lithium-stuffed garnet solid-state separator to the positive electrode.

16. A rechargeable battery comprising the electrochemical cell of claim 1.

* * * * *